United States Patent
Xing et al.

(10) Patent No.: US 12,509,447 B2
(45) Date of Patent: Dec. 30, 2025

(54) SMALL MOLECULE COMPOUND

(71) Applicant: Technoderma Medicines Pte Ltd, Zhejiang (CN)

(72) Inventors: Li Xing, Zhejiang (CN); Guanqun Li, Zhejiang (CN); Xiaolei Wang, Zhejiang (CN); Yuting Cai, Zhejiang (CN); Xiang Jiang, Zhejiang (CN); Xiang Pan, Zhejiang (CN); Wenhao Zhu, Zhejiang (CN); Yang Wang, Zhejiang (CN); Zengquan Wang, Zhejiang (CN)

(73) Assignee: TECHNODERMA MEDICINES, INC. (CN)

( * ) Notice: Subject to any disclaimer, the term of this patent is extended or adjusted under 35 U.S.C. 154(b) by 853 days.

(21) Appl. No.: 17/771,083

(22) PCT Filed: Oct. 10, 2020

(86) PCT No.: PCT/CN2020/120132
§ 371 (c)(1),
(2) Date: Apr. 22, 2022

(87) PCT Pub. No.: WO2021/078022
PCT Pub. Date: Apr. 29, 2021

(65) Prior Publication Data
US 2022/0411408 A1    Dec. 29, 2022

(30) Foreign Application Priority Data

Oct. 24, 2019   (CN) ................. 201911019837.X

(51) Int. Cl.
| | |
|---|---|
| *C07D 403/14* | (2006.01) |
| *C07D 401/14* | (2006.01) |
| *C07D 403/12* | (2006.01) |
| *C07D 405/14* | (2006.01) |

(52) U.S. Cl.
CPC ......... *C07D 403/14* (2013.01); *C07D 401/14* (2013.01); *C07D 403/12* (2013.01); *C07D 405/14* (2013.01)

(58) Field of Classification Search
CPC .. C07D 403/14; C07D 401/14; C07D 403/12; C07D 405/14
See application file for complete search history.

(56) References Cited

U.S. PATENT DOCUMENTS

| 8,962,609 B2 | 2/2015 | Perrior et al. |
| 9,433,622 B2 | 9/2016 | Newton et al. |
| 2015/0336982 A1 | 11/2015 | Xu et al. |

FOREIGN PATENT DOCUMENTS

| CN | 103119025 | 5/2013 |
| CN | 103298794 | 9/2013 |
| CN | 105189480 | 12/2015 |
| CN | 110330484 | 10/2019 |
| CN | 110862380 | 3/2020 |
| WO | WO 2012062704 | 5/2012 |
| WO | WO 2014111037 | 7/2014 |

OTHER PUBLICATIONS

First Office Action for 201911019837.X, mailed Jan. 18, 2022 (machine translation).
Second Office Action for 201911019837.X, mailed May 10, 2022 (machine translation).

*Primary Examiner* — Joseph K Mckane
*Assistant Examiner* — Jalisa Holmes Ferguson
(74) *Attorney, Agent, or Firm* — McDonnell Boehnen Hulbert & Berghoff LLP

(57) ABSTRACT

Provided in the present invention is a small molecule compound, which is characterized in that it is a compound or a stereoisomer, geometric isomer, tautomer, racemate, hydrate, solvate, metabolite, and pharmaceutically acceptable salt or prodrug of the compound as represented by the following structural formula: formula (I). The small molecule compound of the present invention is applicable as a highly efficient and specific JAK kinase inhibitor, specifically a Tyk2 inhibitor and/or a JAK1 inhibitor, and/or a JAK1/Tyk2 dual inhibitor.

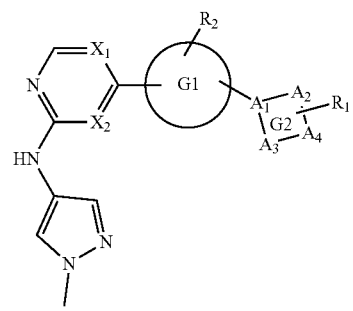

9 Claims, No Drawings

SMALL MOLECULE COMPOUND

CROSS REFERENCE TO RELATED APPLICATION

This application is a U.S. national phase of International Application No. PCT/CN2020/120132, filed on Oct. 10, 2020, which claims priority to Chinese Patent Application No. 201911019837.X, filed Oct. 24, 2019, both of which are incorporated by reference herein in their entirety.

TECHNICAL FIELD

The invention relates to the field of small molecule compounds, and specifically, to a small molecule compound which can be used for treating, preventing and regulating autoimmune diseases such as rheumatic arthritis, ulcerative colitis, SLE and/or inflammatory skin diseases such as psoriasis, eczema, albinism or the like.

BACKGROUND

A protein kinase catalyzes the phosphorylation of an amino acid at a special site in a protein, and can be divided into a tyrosine kinase, a serine kinase and an arginine kinase according to the phosphorylation of the amino acid. JAK is a family of intracellular non-receptor Tyrosine Kinases, including four members JAK1, JAK2, JAK3 and Tyk2. JAKs are mainly expressed in hematopoietic cells, white blood cells and intestinal epithelial cells, and are responsible for mediating signaling of various cytokines involved in inflammatory responses. When a cytokine binds to a cell surface receptor, JAK is activated by autophosphorylation, and then the activated JAK activates the receptor by phosphorylation of the intracellular part of the receptors, which recruits a member of STAT protein family. After that, STAT is activated by JAK via phosphorylation to form a dimer, which dissociates from the receptor and enters the nucleus to regulate gene transcription, thereby affecting the biological function of a cell. The JAK (Janus Kinase)-STAT (Signal Transducer and Activator of Transcription proteins) signaling pathway is the main pathway of intracellular transmission of a signal that is activated after an inflammatory cytokine binds to receptors. Many evidence has showed that the JAK-STAT signaling pathway is significantly related to many diseases, especially autoimmune diseases such as rheumatoid arthritis, bowel diseases, allergic diseases, etc. Therefore, such a protein kinase has become the most important drug research and development target for disease intervention. Currently, many pharmaceutical companies have conducted new drug research and development with respect to JAK family members, but most of them focus on the inhibition of JAK1, JAK2 and JAK3, and especially there are few reports on inhibitors of Tyk2.

Many studies have shown that JAKs are very important for individual growth, development and many immune-related diseases. JAK1 gene knockout mice died at birth, and the cause of death may be related to the difficulty of sucking in newborn mice. Additionally, JAK1-deleted transgenic mice cannot respond to IFN stimulation, suggesting that JAK1 is mainly related to the differentiation of Th1 cells in the immune system. JAK2 gene knockout mice died at 12 days of embryo. The heightened JAK2 activity due to gene fusion is linked to leukemia, especially of the type of clone-like proliferation of eosinophils. The increased JAK2 activity caused by JAK2-V617F gene mutation is related to Polycythemia Vera (PV), Essential Thrombocythemia (ET), Myelofibrosis, and other myeloproliferative disorders (MPDs), because this gain-of-function mutation renders hematopoietic stem cells more sensitive to simulation of growth factors. The expression of JAK3 is mainly in blood system cells, especially T cells and NK cells, and in epithelial cells. In neutrophils, JAK3 is responsible for mediating the chemotaxis of neutrophils induced by IL-8 stimulation. Inactive mutation of JAK3 leads to severe combined immunodeficiency (SCID) of autosomal inheritance, while its active mutation (mostly occurred in JH1 and JH2 regions) leads to leukemia or megakaryocytic leukemia in lymphocytic and NK cell lineages. In the intestinal epithelium, JAK3 binds to villin on the cytoskeleton, which plays an important role in the normal differentiation, damage repair and homeostasis of intestinal epithelium. Tyk2 is expressed in many tissues, especially in immune-related organs and tissues such as bone marrow, appendix, lymph nodes and spleen. TK2 gene knockout (Tyk2-/-) mice has a normal phenotype, but resistant to experimentally induced arthritis. The response of various immune cells isolated from the Tyk2-/- mice to inflammatory stimulation is decreased, especially the production of nitric oxide of Tyk2-/- macrophages stimulated by LPS was absent. Further molecular mechanism study has found that Tyk2-/- and IFN-/- mice are deficient in LPS-induced endotoxic shock, while STAT1-/- mice are highly sensitive to this reaction, suggesting that Tyk2 plays an indispensable role in the inflammatory responses of an organism. In the aspect of signaling of cytokines, research has found that Tyk2 is necessary for intracellular signal transmission of cytokines such as type I IFN (IFN-α & IFN-β), IL-6, IL-10, IL-12 and IL-23. All of these cytokines except IL-10 stimulate occurrence of inflammatory responses and play important roles in the pathogenesis of autoimmune diseases. Tyk2 loss-of-function gene mutation can cause Hyperimmuoglobulin E syndrome in human, which is a disease state driven by Th2 cells. This may be because the Tyk2-mediated immune responses are mostly manifested by Th1 and Th17 cells, which belong to autoimmune responses and inhibits the differentiation of Th2 cells to some extent.

Psoriasis is a common, chronic, and recurrent autoimmune related inflammatory skin disease. The pathogenesis of psoriasis involves abnormalities in two aspects of skin and immune cells. On one hand, epidermal hyperplasia in psoriasis lesions is accompanied by parakeratosis, and the rate of epidermal renewal decreases from 28-30 days to 3-5 days; and on the other hand, immune cells, including dendritic cells (DCs), macrophages and T cells, are activated and enter the epidermis to secrete various inflammatory cytokines such as tumor necrosis factor alpha (TNF-α), interleukin-1β (IL-1β), interleukin-6 (IL-6), interleukin-22 (IL-22), etc. These cytokines induce the proliferation of keratinocytes, and the proliferated keratinocytes also synthesize and secrete inflammatory cytokines such as IL-1β, IL-6 and TNF-α, which further aggravate the inflammatory response of skin and form a vicious circle. Activated DCs in psoriatic lesions produce IL-21 and IL-23, and the latter stimulates T cells in the epidermis to produce specific cytokines IFN γ and IL-17. Th17 cells secrete IL-17 and IL-22 to induce keratinocytes to produce inflammatory factors such as IL-8, CCL20, GM-CSF (granulocyte-macrophage colony stimulating factors) and anti-microbial peptides which have chemotactic effects on neutrophils, thereby causing a characteristic pathological phenomenon of psoriasis in which the neutrophils are aggregated in the stratum corneum of epidermis undergoing parakeratosis.

The latest research has shown that the cytokine-mediated signaling system affects the biological function of cells by activating JAK family members JAK1, JAK2, JAK3 and TYK2 tyrosine kinases, phosphorylating cytokine receptors, recruiting STATs (signal transducer and activator of transcription proteins), and finally regulating the gene expression in the cells. The coupling among the JAK members is directly related to upstream cytokines. Depending on different cytokine stimulation, there may be different coupling combinations of JAK1/JAK2, JAK1/JAK3, JAK1/TYK2, JAK2/TYK2, and JAK2/JAK2, wherein JAK1 couplings are the most common. TYK2 plays an important role in signal transduction of type I interferon (IFN-alpha, IFN-beta), IL-6 and IL-23. The differentiation and function of immune cells related to inflammatory diseases and autoimmune diseases are closely related to TYK2. Generally, TYK2 and its family members can appear in pairing forms of TYK2/JAK1, TYK2/JAK2, and TYK2/JAK1/JAK2 after being activated by the signaling system. It is speculated that inhibiting JAK kinase activity, especially TYK2 kinase activity by a high potent small molecule can block the signal pathway mediated by an inflammatory factor, control inflammation, and effectively treat autoimmune diseases and/or inflammatory skin diseases.

Currently, there is no radical treatment means for psoriasis. Generally, mild psoriasis is treated by a drug for external use, such as glucocorticoid, retinoic acid and vitamin D derivatives. Moderate psoriasis can be better controlled by a drug for external use in combination with ultraviolet irradiation (PUVA). Systemic drugs such as oral methotrexate, retinoids, or injectable biological agents can be considered for severe psoriasis. However, 90% of psoriasis patients choose treatment with the drug for external use, but there is still a shortage of drugs for external use with high efficiency and little side effects, which cannot meet the demands of patients. Currently, many pharmaceutical companies have conducted new drug research and development with respect to JAK family members, but most of them focus on inhibiting JAK1, JAK2 and JAK3. For example, based on the role of JAK3 in the differentiation and development of immune cells, the JAK3 inhibitor Tofacitinib (Xeljanz) developed by Pfizer was approved by FDA for marketing in 2012 to treat rheumatoid arthritis. Macromolecular bio-antibodies based on blocking IL-17 and IL-23 signaling pathways have good therapeutic effects on psoriasis. The latest research has proven that Tyk2 plays an extremely important role in IL17 and IL23 signaling pathways. Currently, the research on TK2 inhibitors is not very common, and only a few TK2 inhibitors have entered the clinical development stage. In view of the key role of Tyk2 in IL17/IL23 signaling, inhibiting Tyk2 may be a new direction for the research and development of immunosuppressive drugs, especially for autoimmune diseases driven by IL17/IL23 axis. Developing a JAK inhibitor suitable for external use, especially a Tyk2 inhibitor for external use, may bring more effective and safe treatment options for patients with mild to moderate psoriasis.

SUMMARY

The invention aims to develop an efficient and specific JAK kinase inhibitor, especially a TK2 inhibitor, and/or a JAK1 inhibitor, and/or a JAK1/Tyk2 double inhibitor, or a Tyk2/Jak1 double inhibitor, which are suitable for treating various autoimmune diseases and immune-related skin inflammatory diseases, such as those with psoriasis as the first indication.

The invention provides a small molecule compound, which is characterized by being a compound of the structural formula below, or a stereoisomer, geometric isomer, tautomer, racemate, hydrate, solvate, metabolite, and pharmaceutically acceptable salt or prodrug thereof:

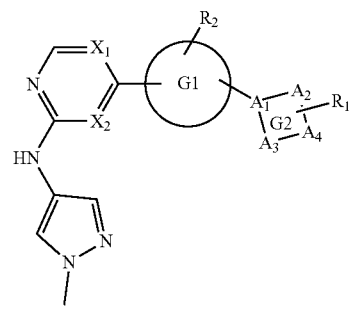

wherein the aforementioned $X_1$ and $X_2$ are selected from carbon or nitrogen;

the aforementioned G1 is a five or six-membered aromatic ring; and the aromatic ring can be a full carbon ring or a heteroaromatic ring containing nitrogen, oxygen and sulfur;

the heteroaromatic ring can be of the structure below:

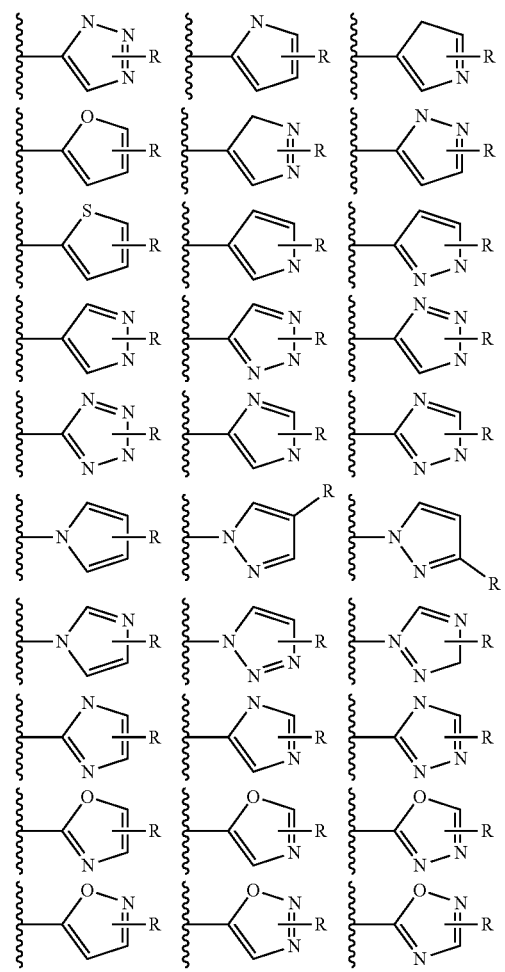

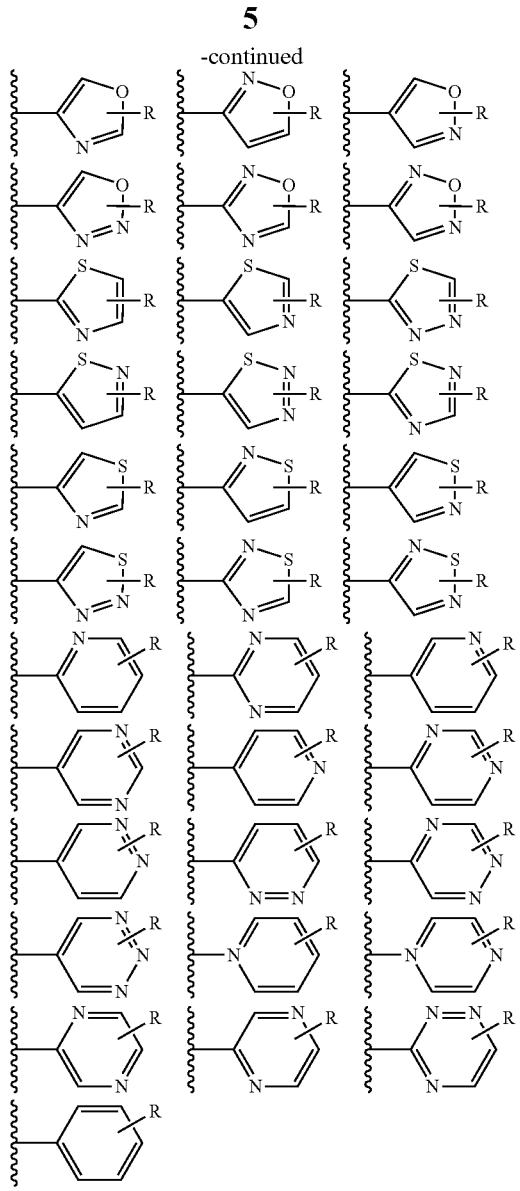

R in the aforementioned structure can be expressed as $R_2$ or $G_2$;

any one or more hydrogen atoms on the aforementioned G1 ring are substituted by $R_2$;

the aforementioned $R_2$ is selected from hydrogen, halogen, alkyl, substituted alkyl, amino, amido, substituted amido, carboxyl, amide, substituted amide, ester, substituted carbonyl, cycloalkyl, substituted cycloalkyl, heterocycloalkyl, substituted heterocycloalkyl, aryl, substituted aryl, heteroaryl, and substituted heteroaryl;

when it is a five-membered ring, any one or more hydrogen atoms on it are substituted by $R_2$, and it is a similar compound of the structure below;

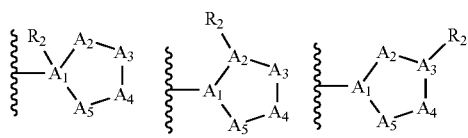

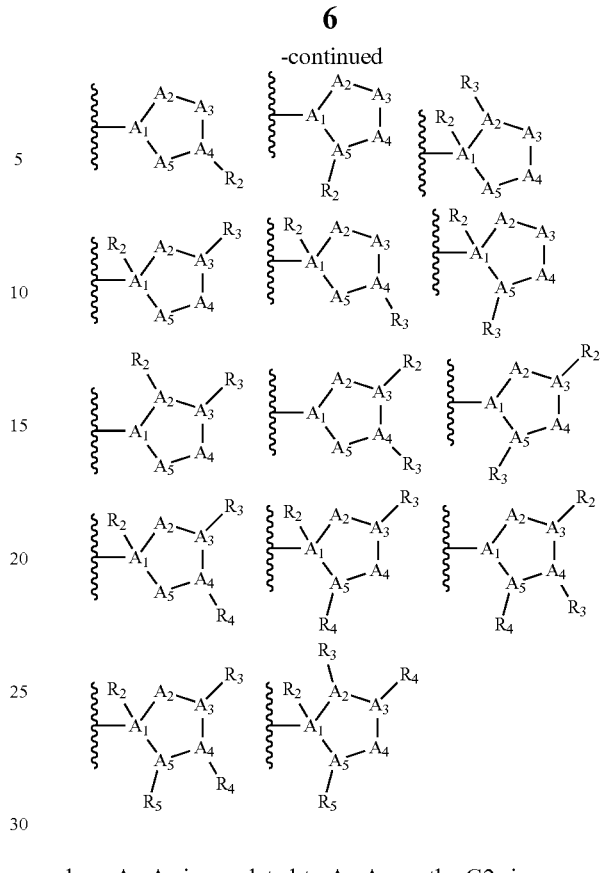

here $A_1$-$A_5$ is unrelated to $A_1$-$A_4$ on the G2 ring;

when it is a six-membered ring, any one or more hydrogen atoms on it are substituted by $R_2$, and it is a similar compound of a structure similar to that of the aforementioned five-membered ring.

The aforementioned $A_1$, $A_2$, $A_3$, and $A_4$ are selected from carbon, nitrogen, sulfur or oxygen;

the $G_2$ formed by the aforementioned $A_1$, $A_2$, $A_3$ and $A_4$ is a four-membered alkyl heterocyclic ring; that is, at least one of $A_1$, $A_2$, $A_3$ and $A_4$ is nitrogen, oxygen or sulfur.

Any one or more hydrogen atoms on the aforementioned G2 ring are substituted by $R_1$;

the aforementioned $R_1$ is selected from hydrogen, halogen, alkyl, substituted alkyl, amino, amido, substituted amido, carboxyl, amide, substituted amide, ester, substituted carbonyl, cycloalkyl, substituted cycloalkyl, heterocycloalkyl, substituted heterocycloalkyl, aryl, substituted aryl, heteroaryl, substituted heteroaryl, a sulfone group, a substituted sulfone group, a sulfoxide group, and a substituted sulfoxide group.

When the aforementioned $R_1$ or $R_2$ is polysubstituted, each $R_1$ or $R_2$ is the same or different;

moreover, in the invention, the related groups of $R_1$ or $R_2$ are defined as follows:

the aforementioned alkyl is generally a linear alkyl group or a branched alkyl group with no more than 6 carbon atoms;

the aforementioned substituted alkyl refers to the substitution of one or more hydrogen atoms on the carbon chain of alkyl by other groups, and the other groups referred to here may be cycloalkyl (substituted in a form similar to

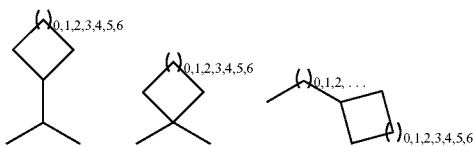

and the like, and any hydrogen atom on the cycloalkyl ring may further be substituted by halogen, cyano, alkyl, hydroxyl, carboxyl and the like groups), heterocycloalkyl (i.e., on the basis of the aforementioned cycloalkyl, at least one carbon atom on the alkyl ring of the cycloalkyl is replaced by oxygen, sulfur or nitrogen), halogen (F, Cl, Br, I), carboxyl, cyano (—CN), a sulfonic acid group (—SO$_4$,), a sulfonyl group (—SO$_2$R$_a$, wherein R$_a$ is hydrogen, alkyl, aryl, etc.), alkenyl (—C═C—R$_b$, wherein R$_b$ is hydrogen, alkyl, aryl, etc.), alkynyl (—C≡CH, —C≡CR$_b$, wherein R$_b$ is hydrogen, alkyl, aryl, etc.), amide (—C(O)NR$_x$R$_y$, wherein R$_x$R$_y$ is alkyl, aryl, etc.), ester (—C(O)O—R$_z$, wherein R$_z$ is alkyl, aryl, etc.), aryl, heteroaryl, ether

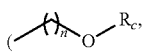

wherein n is a natural number of 1, 2, 3 ..., and R$_c$ is hydrogen, alkyl, aryl, etc.) and the like groups;

the aforementioned substituted amido refers to substitution of one or more hydrogen atoms on the amido by other groups, and the other groups referred to here may be alkyl, cycloalkyl, carboxyl, cyano, a sulfonic acid group, amide, ester, and the like groups;

the aforementioned substituted cycloalkyl ring refers to substitution of one or more hydrogen atoms on the cyclic ring by other groups, and the other groups referred to here may be alkyl, substituted alkyl (ditto), halogen (F, Cl, Br, I), carboxyl, cyano (—CN), a sulfonic acid group (—SO$_4$), a sulfonyl group (—SO$_2$R$_a$, where R$_a$ is hydrogen, alkyl, aryl, etc.), alkynyl (—C≡CH, —C≡CR$_b$, wherein R$_b$ is alkyl, aryl, etc.), amide (—C(O)NR$_x$R$_y$, wherein R$_x$R$_y$ is alkyl, aryl, etc.), ester (—C(O)O—R$_z$, wherein R$_z$ is alkyl, aryl, etc.), aryl, heteroaryl, and the like groups.

The aforementioned substituted heterocycloalkyl refers to that on the basis of the aforementioned substituted cycloalkyl, one or more carbon atoms on the ring of the substituted cycloalkyl are replaced by oxygen, sulfur and nitrogen.

The aforementioned aryl refers to a six or more-membered aromatic ring or benzoaromatic ring, such as benzene, naphthalene and the like.

The aforementioned substituted aryl refers to a five or more-membered aromatic ring or benzoaromatic ring, such as benzene, naphthalene, fluorene, and the like, in which one or more hydrogen atoms on the ring are substituted by other groups, and the other groups referred to here may be alkyl, substituted alkyl (ditto), halogen (F, Cl, Br, I), carboxyl, cyano (—CN), a sulfonic acid group (—SO$_4$), a sulfonyl group (—SO$_2$R$_a$, where R$_a$ is hydrogen, alkyl, aryl, etc.), alkynyl (—C≡CH, —C≡CR$_b$, wherein R$_b$ is alkyl, aryl, etc.), amide (—C(O)NRxRy, wherein RxRy is alkyl, aryl, etc.), ester (—C(O)O—Rz, wherein R$_z$ is alkyl, aryl, etc.), aryl, heteroaryl, and the like groups.

The aforementioned heteroaryl refers to five or more-membered aromatic heterocyclic or benzoaromatic heterocyclic, such as thiophene, pyrrole, pyridine, furan, imidazole, benzimidazole, quinoline, and the like.

The aforementioned substituted heteroaryl refers to five or more-membered aromatic heterocyclic or benzoaromatic heterocyclic, such as thiophene, pyrrole, pyridine, furan, imidazole, benzimidazole, quinoline, etc., in which one or more hydrogen atoms on the ring are substituted by other groups, and the other groups referred to here may be alkyl, substituted alkyl (ditto), halogen (F, Cl, Br, I), carboxyl, cyano (—CN), a sulfonic acid group (—SO$_4$), a sulfonyl group (—SO$_2$R$_a$, where R$_a$ is hydrogen, alkyl, aryl, etc.), alkynyl (—C≡CH, —C≡CR$_b$, wherein R$_b$ is alkyl, aryl, etc.), amide (—C(O)NRxRy, wherein RxRy is alkyl, aryl, etc.), ester (—C(O)O—Rz, wherein Rz is alkyl, aryl, etc.), aryl, heteroaryl, and the like groups.

The aforementioned amide group has the structure of —CONH$_2$;

the aforementioned substituted amide is that one or more hydrogen atoms in the aforementioned structure are substituted by other groups, and the other groups referred to here may be alkyl, substituted alkyl (ditto), halogen (F, Cl, Br, I), carboxyl, cyano (—CN), a sulfonic acid group (—SO$_4$), a sulfonyl group (—SO$_2$R$_a$, where R$_a$ is hydrogen, alkyl, aryl, etc.), alkynyl (—C≡CH, —C≡CR$_b$, wherein R$_b$ is alkyl, aryl, etc.), amide (—C(O)NRxRy, wherein RxRy is alkyl, aryl, etc.), ester (—C(O)O—Rz, wherein Rz is alkyl, aryl, etc.), aryl, heteroaryl, and the like groups.

The aforementioned ester is —C(O)O—R$_z$, wherein R$_z$ is alkyl, aryl, etc.

The aforementioned substituted carbonyl is several kinds of compounds of the structures below:

the aforementioned R is

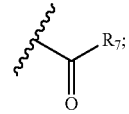

wherein the aforementioned R$_7$ is alkyl (ditto), substituted alkyl (ditto), cycloalkyl (cyclopropyl, cyclobutyl, cyclopentyl, cyclohexyl, cycloheptyl, etc.), substituted cycloalkyl (that is, one or more of the hydrogen atoms on the cycloalkyl ring are substituted by halogen, cyano or alkynyl, for example in the form of the structure

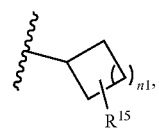

R$^{15}$ is halogen, cyano, alkynyl, etc.), heterocycloalkyl (at least one carbon atom on the 3 to 7 membered ring is substituted by nitrogen, sulfur or oxygen), substituted heterocycloalkyl (one or more of the hydrogen atoms on the heterocycloalkyl ring are substituted by halogen, cyano or alkynyl), a sulfone group

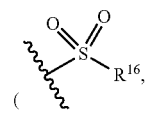

wherein $R^{16}$ is alkyl, halogen, aryl, etc.), a sulfoxide group

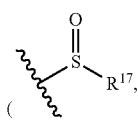

wherein $R^{17}$ is alkyl, halogen, aryl, etc.), and substituted carbonyl

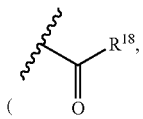

wherein $R^{17}$ is alkyl, substituted alkyl, aryl, etc.).
The aforementioned sulfone group is

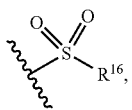

wherein $R^{16}$ is alkyl, substituted alkyl (ditto), halogen, aryl, substituted aryl (ditto), ether, cycloalkyl, substituted cycloalkyl (ditto), etc.
the aforementioned sulfoxide group is

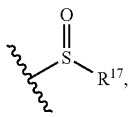

and $R^{17}$ is alkyl, halogen, aryl, etc.

Further, the invention provides a small molecule compound that is further characterized in that the aforementioned G1 is cyclic of the structure below:

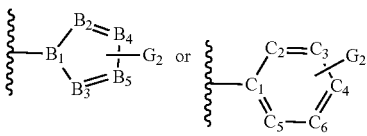

wherein, the aforementioned $B_1$, $B_2$, $B_3$, $B_4$, and $B_5$ are selected from carbon, nitrogen, sulfur or oxygen;
the aforementioned $C_1$, $C_2$, $C_3$, $C_4$, $C_5$, and $C_6$ are selected from carbon, nitrogen, sulfur or oxygen.
Further, the small molecule compound provided by the invention is further characterized in that: when G1 is a five-membered ring, at least one of the aforementioned $B_1$, $B_2$, $B_3$, $B_4$, and $B_5$ is nitrogen;
the aforementioned G2 is connected to a nitrogen atom; or alternatively
when G1 is a six-membered ring, at least one of the aforementioned $C_1$, $C_2$, $C_3$, $C_4$, $C_5$, $C_6$ is nitrogen;
the aforementioned G2 is connected to a nitrogen atom.

Further, the small molecule compound provided by the invention is further characterized in that: namely, it has a structure shown by the following molecular general formula:

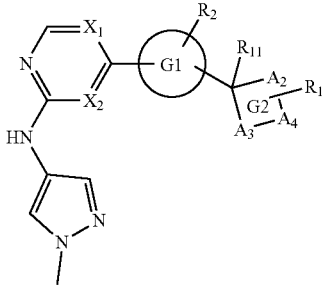

wherein the aforementioned $R_{11}$ is selected from hydrogen, halogen, alkyl, substituted alkyl, amino, amido, substituted amido, carboxyl, amide, substituted amide, ester, substituted carbonyl, cycloalkyl, substituted cycloalkyl, heterocycloalkyl, substituted heterocycloalkyl, aryl, substituted aryl, heteroaryl, and substituted heteroaryl.

Further, the small molecule compound provided by the invention is further characterized in that: namely, the end of the carbon chain of the aforementioned $R_{11}$ is terminated by cyano.

Further, the small molecule compound provided by the invention is further characterized in that: namely, the small molecule compound is a product that is obtained after hydrolysis, substitution, addition and reduction reactions of the cyano at the end of the carbon chain of the aforementioned $R_{11}$.

Further, the small molecule compound provided by the invention is further characterized in that: namely, at least one of the aforementioned $A_2$, $A_3$, and $A_4$ is nitrogen;
The aforementioned $R_1$ is bonded to nitrogen.

Further, the small molecule compound provided by the invention is further characterized in that: namely, the aforementioned $R_1$ is

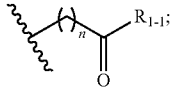

wherein the aforementioned n is 0, 1, and 2;
the aforementioned $R_{1-1}$ is alkyl, substituted alkyl, cycloalkyl, substituted cycloalkyl, heterocycloalkyl, and substituted heterocycloalkyl.

Further, the small molecule compound provided by the invention is further characterized in that: namely, the aforementioned $R_1$ is

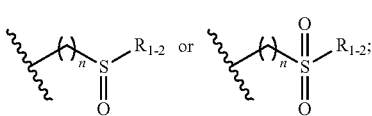

wherein $R_{1-2}$ is alkyl, substituted alkyl, cycloalkyl, substituted cycloalkyl, heterocycloalkyl, substituted heterocycloalkyl, alkenyl, substituted alkenyl, alkynyl, substituted alkynyl, heterocycloalkyl, and substituted heterocycloalkyl.

Further, the small molecule compound provided by the invention is further characterized in that: the aforementioned G2 ring is replaced by a five or six-membered carboatomic ring or a nitrogen heterocyclic ring.

Further, the small molecule compound provided by the invention is further characterized in that: namely, it is used for treating, preventing and relieving inflammatory skin diseases related to autoimmunity. It can be in various dosage forms, such as oral administration, external use and injection.

The functions and effects of the invention:

in the invention, according to the protein structure of JAK kinase, especially the protein structure of Tyk2, the small molecule compound is reasonably designed, the synthesized compound is firstly detected for JAK kinase biochemical activity, SAR (structure-activity relationship) is established according to IC50, a cytological test is carried out on a powerful inhibitor with IC50 below 200 nM, and the selectivity of the compound is determined. According to the specific activity experimental data, it can be found that several kinds of compounds referred in the invention have good inhibition ability of cell activity.

The inhibitor provided by the invention can also be used for other autoimmune-related skin diseases, such as alopecia areata, vitiligo, lupus erythematosus mainly manifested on skin, lichen planus, lichen nitidus, lichen sclerosis et atrophicus, panniculitis, atopic dermatitis, etc.

The Tyk2 inhibitor, and/or JAK1 inhibitor, and/or JAK1/Tyk2 double inhibitor obtained in the invention, which are suitable for oral or intravenous administration, can still be used for treating psoriasis and other autoimmune diseases such as RA, IBD, MS, etc.

DETAILED DESCRIPTION

Example 1. A reaction equation for synthesizing compound TDM-180636 was as follows:

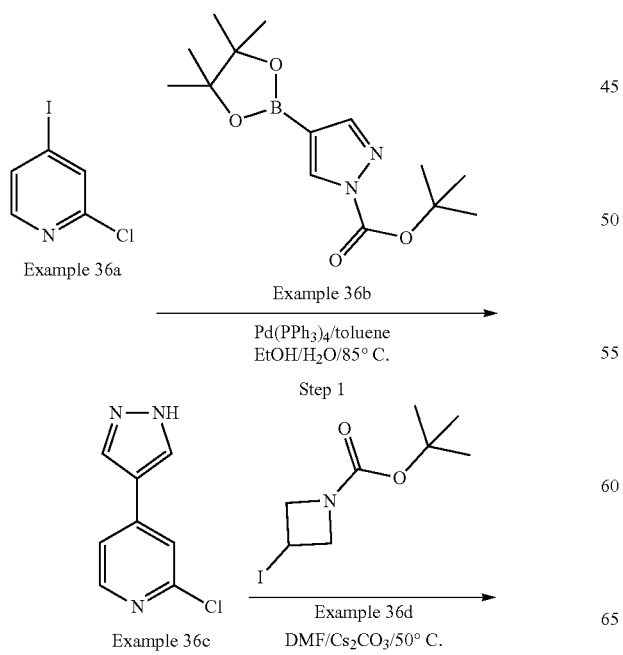

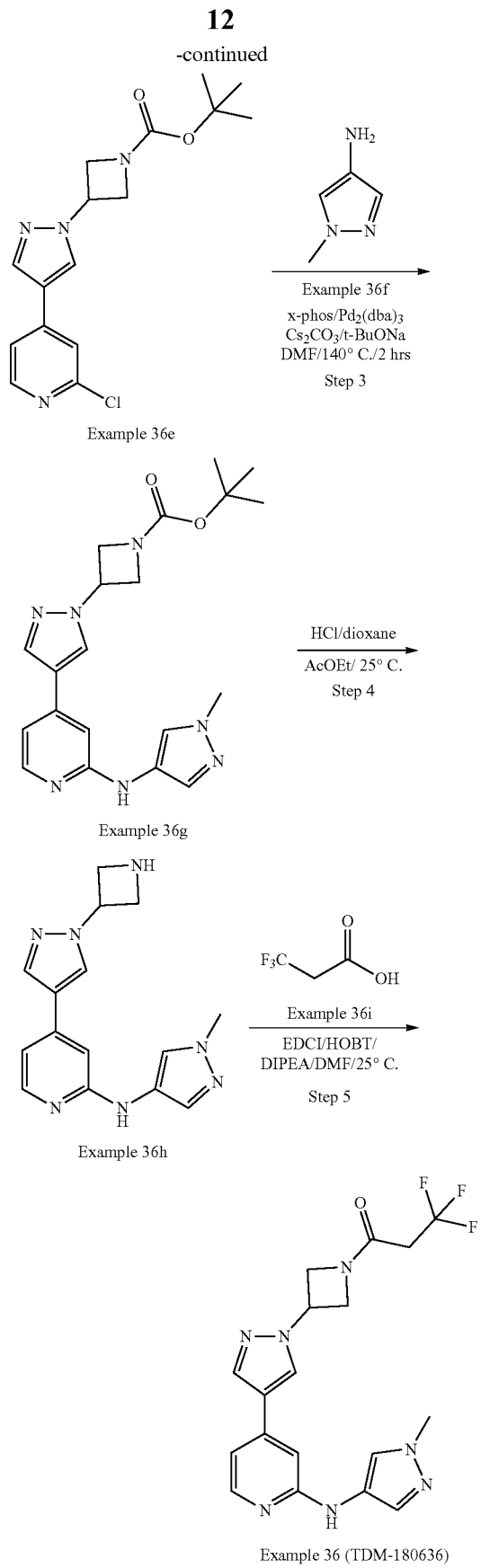

Step 1: Example 36c

Into a 250 mL round-bottom flask containing compound 36a, namely 2-chloro-4-iodopyridine (2.39 g, 10 mmol), compound 36b, namely tert-butyl 4-(4,4,5,5-tetramethyl-1,3,2-dioxaborocan-2-yl)-1H-pyrazole-1-carboxylate (3.24 g, 11 mmol) and sodium carbonate (4.14 g, 30 mmol) added were toluene (50 mL), ethanol (20 mL) and water (20 mL). The mixture was subjected to replacement with nitrogen for 1 minute, and then quickly added with tetra(triphenylphosphine) palladium (230 mg, 0.199 mmol). The reaction mixture was heated to 85° C., and stirred overnight under protection of nitrogen. The mixture was cooled to room temperature, added with ethyl acetate (50 mL), and stirred for 3 minutes. An organic layer was collected, washed with a saturated saline solution (30 mL×3) for three times, and dried with anhydrous sodium sulfate. The solvent was concentrated via rotary evaporation. The residue was washed with petroleum ether to obtain compound 36c, namely 2-chloro-4-(1H-pyrazol-4-yl)pyridine, as a white solid (0.86 g, yield of 75%). LCMS [M+1]+=180.0

Step 2: Example 36e

Into a solution of the compound 36c (0.86 g, 4.8 mmol) and compound 36d, namely tert-butyl 3-iodoazetidin-1-carboxylate (1.63 g, 5.8 mmol) in N,N-dimethyl formamide (20 mL) added was cesium carbonate (1.5 g, 7.2 mmol). The mixture was stirred at 50° C. overnight. The mixture was added with water (100 mL) and ethyl acetate (70 mL), and stirred for 5 minutes. The organic layer was collected and washed with a saturated saline solution for three times (50 ml×3), dried over anhydrous sodium sulfate, and concentrated by rotary evaporation. The residue was washed with a solution of ethyl acetate and petroleum ether (petroleum ether/ethyl acetate=1:1) to obtain compound 36e, namely tert-butyl 3-(4-(2-chloropyridine-4-yl)-1H-pyrazol-1-yl) azetidin-1-carboxylate as a white solid (1.2 g, yield of 75%). LCMS [M+1]+=335.1
$^1$H NMR (400 MHz, DMSO-d$_6$) δ 8.78-8.67 (m, 1H), 8.41-8.30 (m, 1H), 8.28 (s, 1H), 7.79 (d, J=0.9 Hz, 1H), 7.64 (dd, J=5.2, 1.5 Hz, 1H), 5.22 (tt, J=7.9, 5.2 Hz, 1H), 4.33 (t, J=8.2 Hz, 2H), 4.15 (s, 2H), 1.41 (s, 9H).

Step 3: Example 36g

The compound 36e (950 mg, 2.84 mmol), compound 36f, namely 1-methyl-1H-pyrazole-4-amine (828 mg, 8.53 mmol), cesium carbonate (1.17 g, 5.53 mmol) and sodium tert-butoxide (532 mg, 5.53 mmol) were mixed in N,N-dimethyl formamide (56 mL), and added with tri(dibenzylideneacetone) dipalladium (266 mg, 0.29 mmol) and 2-(dicyclohexylphosphino)-2',4',6'-triisopropyl-1,1'-biphenyl (266 mg, 0.58 mmol). The mixture was heated to 140° C., and stirred for 2 hours under protection of nitrogen. The mixture was poured into ice water, and extracted with ethyl acetate. An organic layer was washed with a saturated saline solution, dried with anhydrous sodium sulfate, and concentrated by rotary evaporation. The residue was purified by passing through a column (petroleum ether/EtOAc=8/1) to obtain compound 36g, namely tert-butyl 3-(4-(2-((1-methyl-1H-pyrazol-4-yl)amino)pyridine-4-yl)-1H-pyrazol-1-yl) azetidin-1-carboxylate, as a white solid (500 mg, yield of 45%). LCMS [M+1]+=396.2
$^1$H NMR (400 MHz, DMSO-d$_6$) δ 8.45 (s, 1H), 8.30 (d, J=2.1 Hz, 1H), 8.07-7.97 (m, 2H), 7.92 (s, 1H), 7.42 (s, 1H), 6.87 (d, J=21.0 Hz, 2H), 5.25 (d, J=4.8 Hz, 1H), 4.30 (d, J=8.5 Hz, 2H), 4.17 (s, 2H), 3.82 (s, 3H), 1.42 (s, 9H).

Step 4: Example 36h

Into a solution of the compound 36g (500 mg, 1.27 mmol) in ethyl acetate (25 mL) added was 4 mol/L of hydrochloric acid/1,4-dioxane (4.4 mL) at 5° C. The mixture was stirred at room temperature for 4 hours. The solvent was removed by rotary evaporation to obtain compound 36h, namely 4-(1-(azetidin-3-yl)-1H-pyrazol-4-yl)-N-(1-methyl-1H-pyrazol-4-yl)pyridine-2-amine (520 mg, crude product). LCMS [M+1]+=296.1

Step 5: Example 36 (TDM-180636)

Into a 25 mL vial containing compounds 36i, namely 3,3,3-trifluoropropionic acid (18 mg, 0.14 mmol), 1-hydroxybenzotriazole (22 mg, 0.16 mmol) and 1-(3-dimethylaminopropyl)-3-ethylcarbodiimide (36 mg, 0.19 mmol) added were N,N-dimethylformamide (4 mL), the compound 36h (41.89 mg, 0.13 mmol) and N-ethyl-N-isopropyl propyl-2-amine (65 mg, 0.50 mmol). The mixture was stirred at room temperature overnight. The reaction mixture was added with water (20 mL) and ethyl acetate (20 mL), and stirred for 1 minute. An organic layer was washed with a saturated saline solution, dried with anhydrous sodium sulfate, and concentrated by rotary evaporation. The residue was purified by HPLC preparation to obtain compound 36, namely 3,3,3-trifluoro-1-(3-(4-(2-((1-methyl-1H-pyrazol-4-yl)amino) pyridin-4-yl)-1H-pyrazol-1-yl)azetidin-1-yl)propan-1-one, as a white solid (1.9 mg, yield of 3.7%). LCMS [M+1]+=406.3
$^1$H NMR (400 MHz, CD$_3$OD) δ 8.48 (s, 1H), 8.20 (s, 1H), 7.87 (s, 1H), 7.77 (d, J=6.6 Hz, 1H), 7.58 (s, 1H), 7.27-7.12 (m, 2H), 5.37 (tt, J=8.1, 5.2 Hz, 1H), 4.75 (d, J=8.3 Hz, 1H), 4.65 (dd, J=9.3, 5.3 Hz, 1H), 4.53 (dd, J=19.3, 8.8 Hz, 1H), 4.40 (dd, J=10.5, 5.3 Hz, 1H), 3.95 (s, 3H), 3.30-3.22 (m, 3H).

Compounds prepared by similar methods were as follows:

| Structure Structural formula | TDM No. Registration number | LCMS [M + 1]+ | $^1$H-NMR Hydrogen nuclear magnetic resonance spectrum |
|---|---|---|---|
| (structure shown) | TDM-180637 | 364.4 | $^1$H NMR (400 MHz, CD$_3$OD) δ 8.24 (s, 1H), 8.03-7.96 (m, 2H), 7.84 (s, 1H), 7.47 (d, J = 0.5 Hz, 1H), 6.88 (dd, J = 5.5, 1.5 Hz, 1H), 6.82 (s, 1H), 5.34 (tt, J = 8.1, 5.3 Hz, 1H), 4.70 (dd, J = 9.1, 5.3 Hz, 1H), 4.58 (s, 1H), 4.50-4.41 (m, 1H), 4.34 (dd, J = 10.3, 5.3 Hz, 1H), 1.63 (ddd, J = 9.2, 7.8, 4.8 Hz, 1H), 0.94-0.83 (m, 4H). |

-continued

| Structure Structural formula | TDM No. Registration number | LCMS [M + 1]+ | 1H-NMR Hydrogen nuclear magnetic resonance spectrum |
|---|---|---|---|
| | TDM-180638 | 400.4 | 1H NMR (400 MHz, CD3OD) δ 8.21 (s, 1H), 7.99 (dd, J = 10.2, 4.7 Hz, 2H), 7.84 (s, 1H), 7.46 (d, J = 0.5 Hz, 1H), 6.86 (dd, J = 5.5, 1.5 Hz, 1H), 6.80 (s, 1H), 5.40-5.29 (m, 1H), 4.83-4.73 (m, 1H), 4.68 (ddd, J = 19.8, 9.3, 5.5 Hz, 1H), 4.50 (dd, J = 18.2, 9.2 Hz, 1H), 4.39 (dt, J = 10.8, 5.6 Hz, 1H), 3.87 (s, 3H), 2.64 (ddt, J = 12.9, 11.0, 7.4 Hz, 1H), 2.02 (qt, J = 13.4, 6.7 Hz, 1H), 1.90-1.73 (m, 1H). |
| | TDM-180639 | 352.4 | 1H NMR (400 MHz, CD3OD) δ 8.21 (d, J = 0.5 Hz, 1H), 8.04-7.97 (m, 2H), 7.84 (s, 1H), 7.46 (d, J = 0.6 Hz, 1H), 6.86 (dd, J = 5.5, 1.5 Hz, 1H), 6.79 (d, J = 0.7 Hz, 1H), 5.34-5.24 (m, 1H), 4.71-4.63 (m, 1H), 4.56 (dd, J = 9.4, 5.4 Hz, 1H), 4.49-4.42 (m, 1H), 4.33 (dd, J = 10.4, 5.3 Hz, 1H), 3.87 (s, 3H), 2.28-2.18 (m, 2H), 1.13 (t, J = 7.6 Hz, 3H). |
| | TDM-180640 | 366.43 | 1H NMR (400 MHz, CD3OD) δ 8.18 (d, J = 0.5 Hz, 1H), 8.03-7.95 (m, 2H), 7.87-7.81 (m, 1H), 7.47 (d, J = 0.6 Hz, 1H), 6.84 (dd, J = 5.4, 1.5 Hz, 1H), 6.79 (d, J = 0.7 Hz, 1H), 5.27 (tt, J = 8.0, 5.3 Hz, 1H), 4.70-4.61 (m, 1H), 4.56 (dd, J = 9.3, 5.4 Hz, 1H), 4.49-4.41 (m, 1H), 4.32 (dd, J = 10.4, 5.3 Hz, 1H), 3.86 (s, 3H), 2.17 (q, J = 7.5 Hz, 2H), 1.73-1.58 (m, 2H), 0.97 (t, J = 7.4 Hz, 3H). |
| | TDM-180641 | 363.32 | 1H NMR (400 MHz, CD3OD) δ 8.22 (s, 1H), 8.07-7.96 (m, 2H), 7.84 (s, 1H), 7.46 (s, 1H), 6.86 (dd, J = 5.5, 1.4 Hz, 1H), 6.80 (s, 1H), 5.32 (tt, J = 8.1, 5.2 Hz, 1H), 4.72 (t, J = 8.7 Hz, 1H), 4.61 (dd, J = 9.3, 5.4 Hz, 1H), 4.55-4.47 (m, 1H), 4.39 (dd, J = 10.3, 5.4 Hz, 1H), 3.87 (s, 3H), 3.30 (d, J = 1.5 Hz, 2H). |

TDM-180637, which was compound 37, namely cyclopropyl(3-(4-(2-((1-methyl-1H-pyrazol-4-yl)amino)pyridin-4-yl)-1H-pyrazol-1-yl)azetidin-1-yl)ketone, as a gray solid (5.5 mg, yield of 10%)

TDM-180638, which was compound 38, namely (2,2-difluorocyclopropyl)(3-(4-(2-((1-methyl-1H-pyrazol-4-yl)amino)pyridin-4-yl)-1H-pyrazol-1-yl)azetidin-yl)methyl ketone, as a gray solid (5.5 mg, yield of 3.8%)

TDM-180639, which was compound 39, namely 1-(3-(4-(2-((1-methyl-1H-pyrazol-4-yl)amino)pyridin-4-yl)-1H-pyrazol-1-yl)azetidin-1-yl)propan-1-one, as agray solid (2.1 mg, yield of 4.2%)

TDM-180640, which was compound 40, namely 1-(3-(4-(2-((1-methyl-1H-pyrazol-4-yl)amino)pyridin-4-yl)-1H-pyrazol-1-yl)azetidin-1-yl)butan-1-one, as a gray solid (6 mg, yield of 11.5%)

TDM-180641, which was compound 41, namely 3-(3-(4-(2-((1-methyl-1H-pyrazol-4-yl)amino)pyridin-4-yl)-1H-pyrazol-1-yl)azetidin-1-yl)-3-oxy-propionitrile, as a gray solid (5.7 mg, yield of 11%)

Example 2. A reaction equation for synthesizing compound TDM-180642 was as follows:

Example 3. A reaction equation for synthesizing compound TDM-180644 and compound 45 (TDM-180645) was as follows:

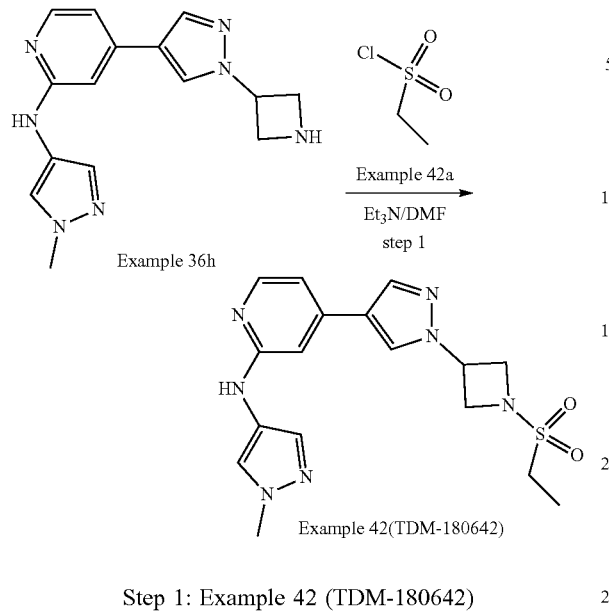

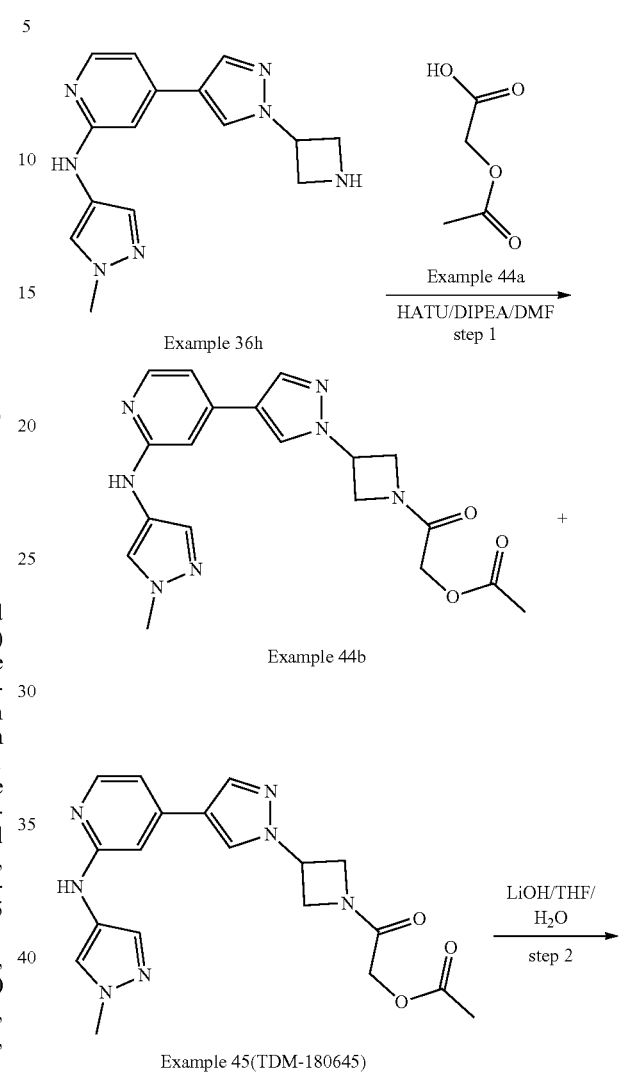

Step 1: Example 42 (TDM-180642)

Into a 25 mL vial containing a solution of the compound 36h (45 mg, 0.15 mmol) in N,N-dimethylformamide (3 mL) added were compound 42a, namely ethylsulfonyl chloride (23 mg, 0.18 mmol) and N-ethyl-N-isopropyl propyl-2-amine (39 mg, 0.3 mmol). The mixture was stirred at room temperature overnight. The reaction mixture was added with water (20 mL) and ethyl acetate (20 mL), and stirred for 1 minute. An organic layer was washed with a saturated saline solution, dried with anhydrous sodium sulfate, and concentrated by rotary evaporation. The residue was stirred in ethyl acetate for 5 minutes and filtered to obtain compound 42, namely 4-(1-(1-(ethylsulfonyl)azetidin-3-yl)-1H-pyrazol-4-yl)-N-(1-methyl-1H-pyrazol-4-yl) pyridine-2-amine (5.5 mg, yield of 25.4%). LCMS [M+1]$^+$=388.4

$^1$H NMR (400 MHz, DMSO-d$_6$) δ 8.73 (s, 1H), 8.38 (s, 1H), 8.05 (d, J=4.5 Hz, 2H), 7.94 (d, J=12.2 Hz, 1H), 7.40 (d, J=0.5 Hz, 1H), 6.84 (dd, J=5.3, 1.4 Hz, 1H), 6.78 (s, 1H), 5.40-5.28 (m, 1H), 4.40-4.22 (m, 4H), 3.80 (s, 3H), 3.24 (q, J=7.4 Hz, 2H), 1.28 (t, J=7.4 Hz, 3H)

Compounds prepared by similar methods were as follows:

A gray solid compound TDM-180643, namely N-(1-methyl-1H-pyrazol-4-yl)-4-(1-(1-(propylsulfonyl)azetidin-3-yl)-1H-pyrazol-4-yl)pyridine-2-amine (30.6 mg, yield of 53%)

| Structure Structural formula | TDM No. Registration number | LCMS [M + 1]$^+$ | $^1$H-NMR Hydrogen nuclear magnetic resonance spectrum |
|---|---|---|---|
| | TDM-180643 | 402.49 | $^1$H NMR (400 MHz, d6-DMSO) δ 8.73 (s, 1H), 8.38 (s, 1H), 8.05 (d, J = 4.8 Hz, 2H), 7.92 (s, 1H), 7.40 (d, J = 0.5 Hz, 1H), 6.84 (dd, J = 5.3, 1.4 Hz, 1H), 6.77 (s, 1H), 5.39-5.27 (m, 1H), 4.38-4.23 (m, 4H), 3.80 (s, 3H), 3.27-3.16 (m, 2H), 1.84-1.64 (m, 2H), 1.03 (t, J = 7.4 Hz, 3H). |

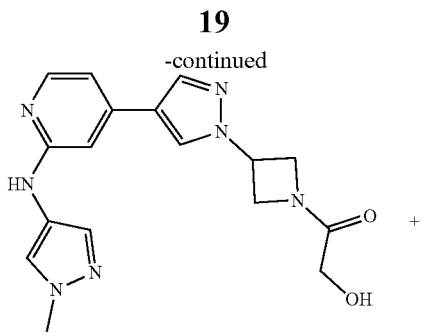

Example 44(TDM-180644)

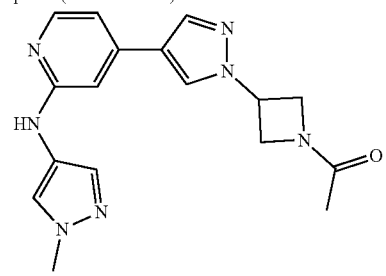

Example 45(TDM-180645)

Step 1: Example 45 & Example 44b

Into a 25 mL vial containing a solution of the compound 36h (45 mg, 0.15 mmol) in N,N-dimethylformamide (3 mL) added were compound 44a, namely 2-acetoxyacetic acid (21 mg, 0.18 mmol), 2-(7-benzotriazole oxide)-N,N,N',N'-tetramethylurea hexafluorophosphate (68 mg, 0.18 mmol), and N-ethyl-N-isopropyl propyl-2-amine (39 mg, 0.3 mmol). The mixture was stirred at room temperature overnight. The reaction mixture was added with water (20 mL) and ethyl acetate (20 mL), and stirred for 1 minute. The organic layer was washed with a saturated saline solution, dried over anhydrous sodium sulfate, and concentrated by rotary evaporation to obtain a crude mixture of compound 45 (V833-30-1), namely ethoxyethyl 1-(3-(4-(2-(1-methyl-1H-pyrazol-4-yl)aminopyridin-4-yl-1H-pyrazol-1-yl)azetidin-1-yl)ethan-1-one and compound 44b(V833-30), namely 2-(3-(4-(2-((1-methyl-1H-pyrazol-4-yl)amino)pyridin-4-yl)-1H-pyrazol-1-yl(azetidin-1-yl)-2-acetate, which was directly used in the next step without further purification.

Step 2: Example 44 and Example 45

Into the oily mixture obtained in step 1 added was tetrahydrofuran (5 mL), water (2.5 mL) and lithium hydroxide (5 mg, 0.18 mmol). The mixture was stirred at room temperature for 2 hours. After extraction with ethyl acetate (30 mL×5), the combined organic layers were dried over anhydrous magnesium sulfate and concentrated under reduced pressure. The residue was purified by HPLC preparation to obtain compound 44 (TDM-180644), namely 2-hydroxy-1-(3-(4-(2-((1-methyl-1H-pyrazol-4-yl)amino)pyridin-4-yl)-1H-pyrazol-1-yl)azetidin-1-yl)ethan-1-one (1.5 mg, yield of 2.7%) and compound 45 (TDM-180645), namely 1-(3-(4-(2-(1-methyl-1H-pyrazol-4-yl)aminopyridin-4-yl-1H-pyrazol-1-yl)azetidin-1-ypethan-1-one (5.5 mg, yield of 10.7%).

Example 44 (TDM-180644). LCMS [M+1]$^+$=354.3

$^1$H NMR (400 MHz, CD$_3$OD) δ 8.49 (s, 1H), 8.20 (s, 1H), 7.87 (s, 1H), 7.76 (d, J=6.7 Hz, 1H), 7.58 (s, 1H), 7.27-7.16 (m, 2H), 5.38 (ddd, J=13.3, 8.1, 5.4 Hz, 1H), 4.80-4.76 (m, 1H), 4.69 (s, 1H), 4.55 (dd, J=19.2, 8.2 Hz, 1H), 4.42 (d, J=4.6 Hz, 1H), 4.17 (s, 2H).

Example 45 (TDM-180645). LCMS [M+1]$^+$=338.38

$^1$H NMR (400 MHz, CD$_3$OD) δ 8.50 (t, J=3.9 Hz, 1H), 8.21 (s, 1H), 7.87 (s, 1H), 7.77 (dd, J=7.0, 3.6 Hz, 1H), 7.59 (d, J=0.7 Hz, 1H), 7.29-7.17 (m, 2H), 5.34 (tt, J=8.0, 5.2 Hz, 1H), 4.75-4.67 (m, 1H), 4.60 (dd, J=9.3, 5.5 Hz, 1H), 4.52-4.43 (m, 1H), 4.34 (dd, J=10.5, 5.2 Hz, 1H), 3.96 (s, 3H), 1.95 (s, 3H).

Example 4. A reaction equation for synthesizing compound TDM-180646 was as follows:

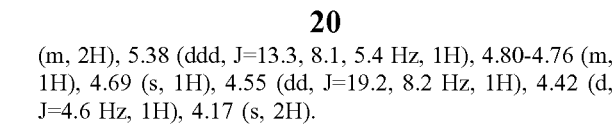

Example 46a    Example 46b

Pd(dppf)Cl$_2$/Na$_2$CO$_3$
dioxane/H$_2$O/70° C.
Step 1

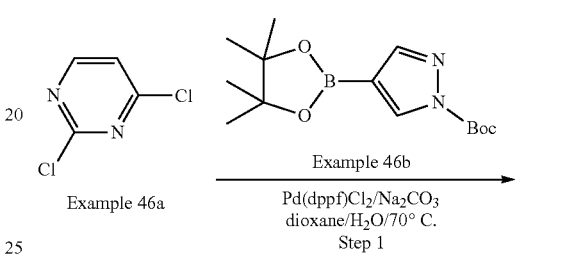

Example 46c    Example 46d

TsOH·H$_2$O/$^n$BuOH
Step 2

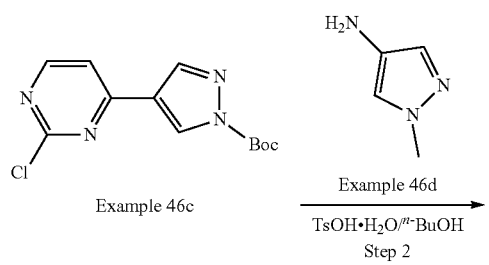

Example 46e    Example 46f

Cs$_2$CO$_3$/DMF/40° C.

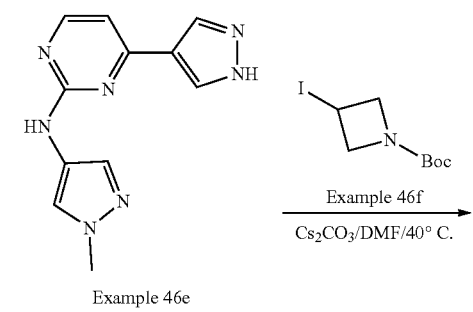

Example 46g

HCl/dioxane
EtOAc
Step 5

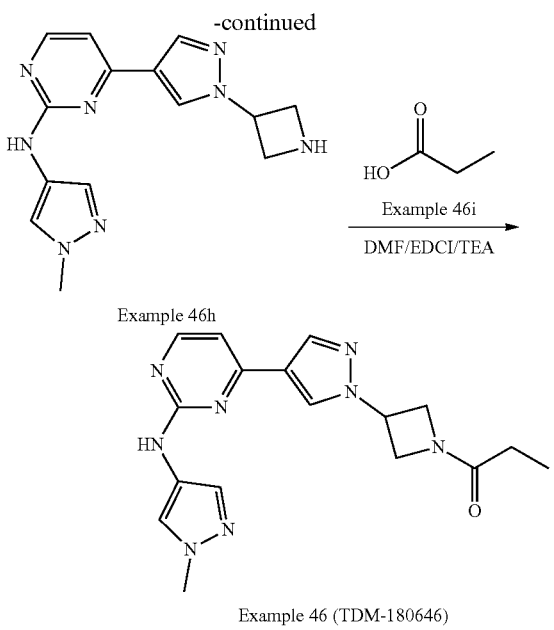

Step 1: Example 46c

Into a three-necked flask added were compound 46a, namely 2,4-dichloropyrimidine (5.1 g, 34 mmol), and compound 46b, namely tert-butyl 4-(4,4,5,5-tetramethyl-1,3,2-dioxazaborocan-2-yl)-1H-pyrazol-1-carboxylate (10 g, 34 mmol), Pd(dppf)Cl$_2$ (2.488 g, 34 mmol), sodium carbonate (7.2 g, 68 mmol), 1,4-dioxane (170 mL) and water (17 mL). The system was subjected to pumping and replacement with nitrogen under the condition of a water pump for three times. The reaction solution was reacted under the condition of 70° C. for 2 hours, and then cooled. After completion of the reaction, the crude product concentrated under reduced pressure was purified by column chromatography (eluent: petroleum ether/ethyl acetate=4/1), and the obtained spin-dried product was pulped (petroleum ether/ethyl acetate=15:1) and filtered, and the solid was collected to obtain compound 46c, namely tert-butyl 4-(2-chloropyrimidin-4-yl)-1H-pyrazol-1-carboxylate, as a white solid (1.7 mg, yield of 17.8%). LCMS [M+1]$^+$=281.0

Step 2: Example 46e

Into a single-necked flask added were the compound 46c (600 mg, 2.1 mmol), the compound 46d, namely 1-methyl-1H-pyrazol-4-amine (621 mg, 6.4 mmol), p-toluenesulfonic acid monohydrate (798 mg, 4.2 mmol) and n-butanol (10 mL). The system was subjected to pumping and replacement with nitrogen under the condition of a water pump for three times. The reaction solution was stirred at 105° C. for 2 hours. After completion of the reaction, the product was concentrated, spin-dried, adjusted with a saturated sodium carbonate solution to the pH of about 12, and extracted with ethyl acetate (40 mL×4) [Note: the insoluble substances were collected together]. The organic layers were combined, concentrated and spin-dried, the crude product was pulped with ethyl acetate and filtered, and the solid was collected to obtain compound 46e, namely N-(1-methyl-1H-pyrazol-4-yl)-4-(1H-pyrazol-4-yl)pyrimidin-2-amine as a off-white solid (430 mg, yield of 85%).
LCMS [M+1]$^+$=242.10.

1H NMR (400 MHz, DMSO-d$_6$) δ 13.24 (br s, 1H), 9.32 (s, 1H), 8.42 (br s, 1H), 8.32 (d, J=5.2 Hz, 1H), 8.15 (br s, 1H), 7.96 (s, 1H), 7.49 (s, 1H), 7.01 (d, J=4.8 Hz, 1H), 3.84 (s, 3H).

Step 3: Example 46h

The compound 46e (0.480 g, 1.99 mmol), cesium carbonate (0.974 g, 2.99 mmol), and compound 46f, namely 1-Boc-3-iodoazetidine (0.846 g, 2.99 mmol) were stirred in N,N-dimethylformamide (15 mL) at 45° C. for 3 hours. After completion of the reaction, the resultant mixture was poured into water (50 mL) and extracted with ethyl acetate (20 mL×3). The organic layers were combined, washed with a saturated saline solution, dried over anhydrous magnesium sulfate, and concentrated under reduced pressure to obtain compound 46g, namely tert-butyl 3-(4-(2-((1-methyl-1H-pyrazol-4-yl)amino)pyrimidin-4-yl)-1H-pyrazol-1-yl)azetidin-1-carboxylate, as a brown solid (0.313 g, yield of 39.7%).
LCMS [M+1]$^+$=397.0.

Step 4: Example 46h

The compound 46g (0.36 g, 0.91 mmol) and a solution of hydrochloric acid in 1,4-dioxane (2.5 mL, 4 M) were stirred in ethyl acetate (10 mL) at room temperature for 4 hours. After the reaction was finished, the system was concentrated under reduced pressure to obtain compound 46h (0.2 g, crude product), namely 4-(1-(azetidin-3-yl)-1H-pyrazol-4-yl)-N-(1-methyl-1H-pyrazol-4-yl)pyrimidine-2-amine, as a grayish yellow solid. LCMS [M+1]+=181.0.

Step 5: Example 46 (TDM-180646)

The mixture of the compound 46h (30 mg, 0.10 mmol) and triethylamine (15.4 mg, 0.15 mmol) in N,N-dimethylformamide (5 mL) was stirred at room temperature for 5 minutes. Then the system was added with 1-(3-dimethylaminopropyl)-3-ethylcarbodiimide hydrochloride (29 mg, 0.15 mmol) and the compound 46i (9 mg, 0.1216 mmol). The reaction solution was stirred at room temperature for 4 hours. After completion of the reaction, the resultant mixture was poured into water (10 mL) and extracted with ethyl acetate (10 mL×3). The organic layers were combined, washed with a saturated saline solution, dried over anhydrous magnesium sulfate, and concentrated under reduced pressure, and then the crude product was purified by preparation to obtain compound 46, namely 1-(3-(4-(2-((1-methyl-1H-pyrazol-4-yl) amino)pyrimidin-4-yl)-1H-pyrazol-1-yl)azetidin-1-yl)propan-1-one, as a yellow solid (4.5 mg, yield of 12.6%). LCMS [M+1]$^+$=353.0

$^1$H NMR (400 MHz, DMSO-d$_6$) δ 9.44 (s, 1H), 8.63 (s, 1H), 8.35 (d, J=5.2 Hz, 1H), 8.26 (s, 1H), 7.94 (s, 1H), 7.51 (s, 1H), 7.02 (d, J=5.2 Hz, 1H), 5.44-5.28 (m, 1H), 4.60 (t, J=8.5 Hz, 1H), 4.42 (dd, J=8.9, 5.2 Hz, 1H), 4.33 (t, J=9.0 Hz, 1H), 4.16 (dd, J=9.9, 5.3 Hz, 1H), 3.84 (s, 3H), 2.13 (q, J=7.5 Hz, 2H), 1.00 (t, J=7.5 Hz, 3H).

Compounds prepared by similar methods were as follows:

| TDM No. Registration number | LCMS [M + 1]$^+$ | $^1$H-NMR Hydrogen nuclear magnetic resonance spectrum |
|---|---|---|
| TDM-180667 | 365.0 | $^1$H NMR (400 MHz, DMSO-d$_6$) δ 9.36 (s, 1H), 8.62 (s, 1H), 8.35 (d, J = 5.1 Hz, 1H), 8.26 (s, 1H), 7.94 (s, 1H), 7.50 (s, 1H), 7.01 (d, J = 5.1 Hz, 1H), 5.40 (m, 1H), 4.75 (t, J = 8.4 Hz, 1H), 4.56 (dd, J = 8.6, 5.3 Hz, 1H), 4.35 (t, J = 9.1 Hz, 1H), 4.17 (dd, J = 9.7, 5.0 Hz, 1H), 3.83 (s, 3H), 0.85 (t, J = 6.8 Hz, 1H), 0.75 (dd, J = 6.1, 4.2 Hz, 4H). |
| TDM-180668 | 401.1 | $^1$H NMR (400 MHz, DMSO-d$_6$) δ 9.50 (s, 1H), 8.65 (s, 1H), 8.35 (d, J = 5.3 Hz, 1H), 8.29 (s, 1H), 7.95 (s, 1H), 7.52 (s, 1H), 7.04 (d, J = 5.2 Hz, 1H), 5.43 (m, 1H), 4.83-4.51 (m, 2H), 4.42 (m, 1H), 4.24 (m, 1H), 3.84 (s, 3H), 2.81 (m, 1H), 2.04-1.80 (m, 2H). |
| TDM-180669 | 407.2 | $^1$H NMR (400 MHz, DMSO-d$_6$) δ 9.36 (s, 1H), 8.60 (s, 1H), 8.35 (d, J = 5.1 Hz, 1H), 8.26 (s, 1H), 7.93 (s, 1H), 7.51 (s, 1H), 7.00 (d, J = 5.1 Hz, 1H), 5.44-5.35 (m, 1H), 4.68 (t, J = 8.7 Hz, 1H), 4.51 (dd, J = 9.2, 5.3 Hz, 1H), 4.44-4.36 (m, 1H), 4.24 (dd, J = 10.2, 5.3 Hz, 1H), 3.83 (s, 3H), 3.45 (m, 2H). |
| TDM-180670 | 367.1 | $^1$H NMR (400 MHz, DMSO-d$_6$) δ 9.36 (s, 1H), 8.60 (s, 1H), 8.35 (d, J = 5.1 Hz, 1H), 8.25 (s, 1H), 7.94 (s, 1H), 7.50 (s, 1H), 7.00 (d, J = 5.1 Hz, 1H), 5.35 (m, 1H), 4.60 (t, J = 8.5 Hz, 1H), 4.43 (dd, J = 8.9, 5.2 Hz, 1H), 4.33 (t, J = 9.0 Hz, 1H), 4.16 (dd, J = 10.0, 5.2 Hz, 1H), 3.83 (s, 3H), 2.10 (t, J = 7.3 Hz, 2H), 1.52 (dt, J = 14.7, 7.3 Hz, 2H), 0.90 (t, J = 7.4 Hz, 3H). |
| TDM-180671 | 364.0 | $^1$H NMR (400 MHz, DMSO-d$_6$) δ 9.36 (s, 1H), 8.60 (s, 1H), 8.35 (d, J = 5.1 Hz, 1H), 8.26 (s, 1H), 7.93 (s, 1H), 7.51 (s, 1H), 6.99 (d, J = 5.1 Hz, 1H), 5.45-5.35 (m, 1H), 4.65 (t, J = 8.6 Hz, 1H), 4.49 (dd, J = 9.2, 5.2 Hz, 1H), 4.45-4.37 (m, 1H), 4.24 (dd, J = 10.3, 5.2 Hz, 1H), 3.84 (d, J = 3.9 Hz, 2H), 3.83 (s, 3H). |

TDM-180667, which was compound 67, namely cyclopropyl(3-(4-(2-((1-methyl-1H-pyrazol-4-yl)amino)pyrimidin-4-yl)-1H-pyrazol-1-yl)azetidin-1-yl)ketone, as a yellow solid (6.1 mg, yield of 5.6%)

TDM-180668, which was compound 68, namely (2,2-difluorocyclopropyl)(3-(4-(2-((1-methyl-1H-pyrazol-4-yl)amino)pyrimidin-4-yl)-1H-pyrazol-1-yl)azetidin-1-yl)ketone, as light green oil (15 mg, yield of 12.5%)

TDM-180669, which was compound 69, namely 3,3,3-trifluoro-1-(3-(4-(2-((1-methyl-1H-pyrazol-4-yl)amino)pyrimidin-4-yl)-1H-pyrazol-1-yl)azetidin-yl)propan-1-one, as a yellow solid (7.9 mg, yield of 6.5%).

TDM-180670, which was compound 70, namely 1-(3-(4-(2-(1-methyl-1H-pyrazol-4-yl)amino)pyrimidin-4-yl)-1H-pyrazol-1-yl)azetidin-1-yl)butan-1-one, as a yellow solid (15.6 mg, yield of 14.2%).

TDM-180671, which was compound 71, namely 3-(3-(4-(2-((1-methyl-1H-pyrazol-4-yl)amino)pyrimidin-4-yl)-1H-pyrazol-1-yl)azetidin-1-yl)-3-oxo-propanenitrile, as a yellow solid (4.5 mg, yield of 5.9%).

Example 5. A reaction equation for synthesizing compound TDM-180665 was as follows:

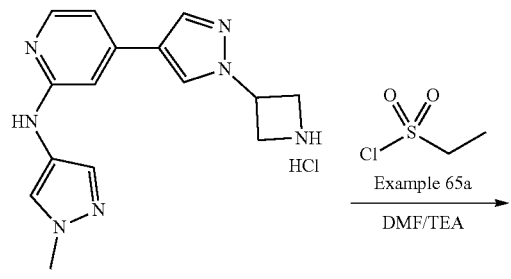

Example 46h

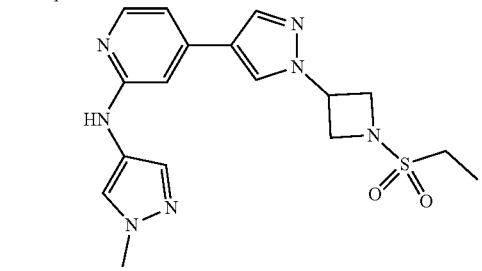

Example 65 (TDM-180665)

The mixture of the compound 46h (50 mg, 0.15 mmol) and triethylamine (60.6 mg, 0.6 mmol) in dimethylformamide (5 mL) was stirred at room temperature for 5 minutes. Then the mixture was added with ethyl sulfonyl chloride (23.2 mg, 0.18 mmol). The resultant mixture was stirred at room temperature for 3 hours, poured into water (10 mL) and extracted with ethyl acetate (10 mL×3). The organic layers were combined, washed with saline, dried over anhydrous magnesium sulfate, and concentrated under reduced pressure, and then the crude product was purified by column chromatography (eluent: petroleum ether/ethyl acetate=0/100) to obtain compound 65, namely 4-(1-(1-(ethylsulfonyl)azetidin-3-yl)-1H-pyrazol-4-yl)-N-(1-methyl-1H-pyrazol-4-yl)pyrimidin-2-amine, as a yellow solid (28.2 mg, yield of 48.4%). LCMS $[M+1]^+=389.0$ $^1$H NMR (400 MHz, DMSO-$d_6$) δ 9.37 (s, 1H), 8.57 (s, 1H), 8.35 (d, J=5.1 Hz, 1H), 8.28 (s, 1H), 7.94 (s, 1H), 7.50 (s, 1H), 7.00 (d, J=5.1 Hz, 1H), 5.40 (m, 1H), 4.32 (m, 4H), 3.83 (s, 3H), 3.27-3.21 (m, 2H), 1.28 (t, J=7.4 Hz, 3H).

Compounds prepared by similar methods were as follows:
TDM-180666, which was compound 66, namely N-(1-methyl-1H-pyrazol-4-yl)-4-(1-(1-(propylsulfonyl)azetidin-3-yl)-1H-pyrazol-4-yl)pyrimidin-2-amine, as a yellow solid (23.2 mg, yield of 38.6%).

Example 6. A reaction equation for synthesizing compound TDM-180672 was as follows:

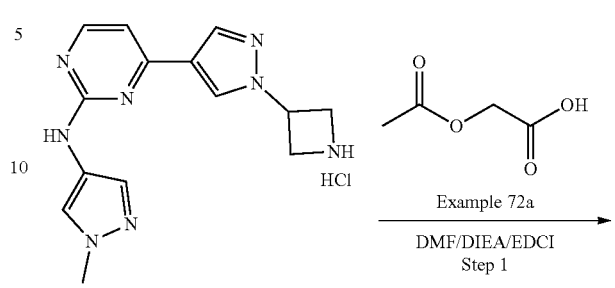

Example 46h

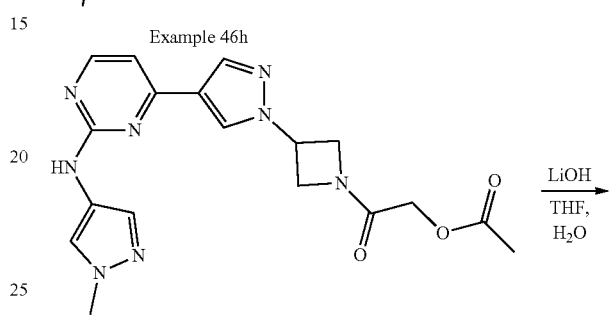

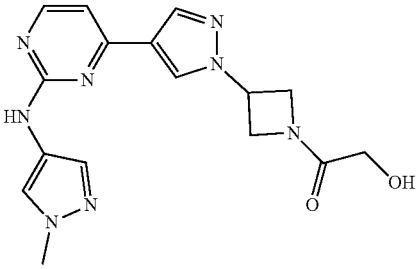

Example 72 (TDM-180672)

Step 1: Example 72c

By using the compound 46h as the raw material, the process was conducted similar to the operation step 5 of Example 46, so as to obtain compound 72b, namely ethoxyethyl 2-(3-(4-(2-((1-methyl-1H-pyrazol-4-yl)amino)pyrimidin-4-yl)-1H-pyrazol-1-yl)azetidin-1-yl)-2-acetate, as light green oil (30 mg, yield of 25.3%). LCMS $[M+1]^+=397.1$

| Structure Structural formula | TDM No. Registration number | LCMS $[M+1]^+$ | $^1$H-NMR Hydrogen nuclear magnetic resonance spectrum |
|---|---|---|---|
| (structure shown) | TDM-180666 | 403.0 | $^1$H NMR (400 MHz, DMSO-$d_6$) δ 9.37 (s, 1H), 8.56 (s, 1H), 8.35 (d, J = 5.1 Hz, 1H), 8.28 (s, 1H), 7.94 (s, 1H), 7.50 (s, 1H), 7.01 (d, J = 5.1 Hz, 1H), 5.45-5.34 (m, 1H), 4.31 (m, 4H), 3.83 (s, 3H), 3.26-3.19 (m, 2H), 1.86-1.68 (m, 2H), 1.03 (t, J = 7.4 Hz, 3H). |

Step 2: Example 72 (TDM-180672)

Into a solution of the compound 72b (30 mg, 0.076 mmol) in tetrahydrofuran (6 mL) and water (2 mL) added was lithium hydroxide monohydrate (9.5 mg, 0.227 mmol). The reaction solution was reacted at room temperature for 2 hours. After completion of the reaction, the product was extracted with ethyl acetate (30 mL*5), the organic layers were combined, washed with saline, dried over anhydrous magnesium sulfate, and concentrated under reduced pressure, and then the crude product was purified by a scraper to obtain compound 72, namely 2-hydroxy-1-(3(4-(2-((1-methyl-1H-pyrazol-4-yl)amino)pyrimidin-4-yl)-1H-pyrazol-1-yl)azetidin-1-yl)ethanone, as a yellow solid (6.8 mg, yield of 25.3%). LCMS $[M+1]^+=355.0$ $^1$H NMR (400 MHz, DMSO-$d_6$) δ 9.36 (s, 1H), 8.60 (s, 1H), 8.35 (d, J=5.1 Hz, 1H), 8.25 (s, 1H), 7.93 (s, 1H), 7.50 (s, 1H), 7.00 (d, J=5.1 Hz, 1H), 5.44-5.35 (m, 1H), 5.05 (t, J=6.1 Hz, 1H), 4.68 (t, J=8.8 Hz, 1H), 4.51 (dd, J=9.3, 5.0 Hz, 1H), 4.45-4.34 (m, 1H), 4.21 (dd, J=10.0, 5.1 Hz, 1H), 3.98 (d, J=6.0 Hz, 2H), 3.83 (s, 3H).

Example 7. A reaction equation for synthesizing compound TDM-180647 was as follows:

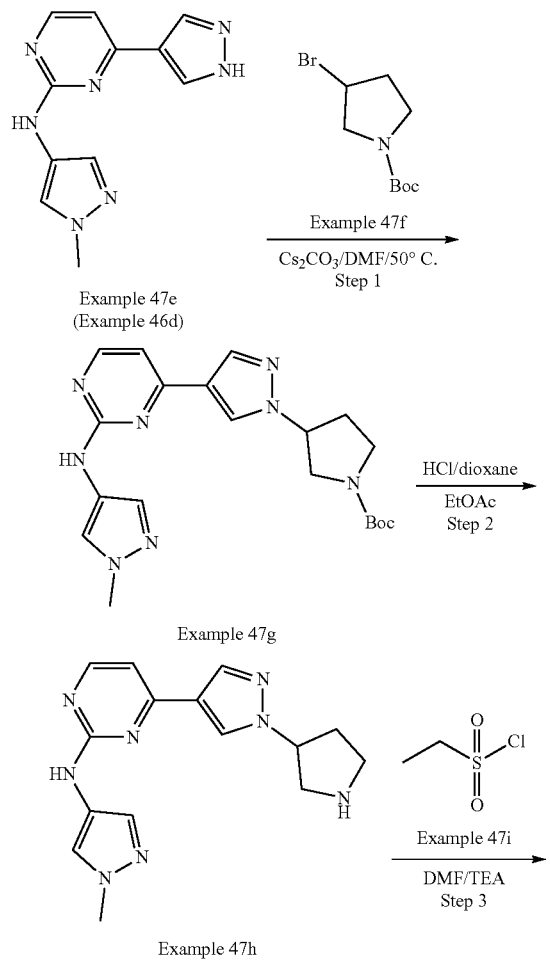

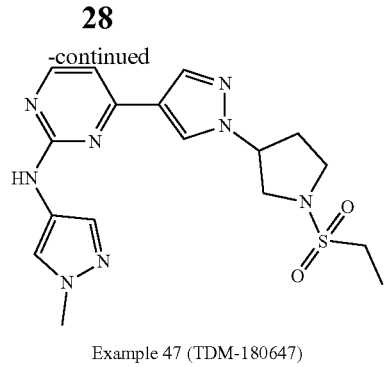

Example 47 (TDM-180647)

Step 1: Example 47g

Into dimethylformamide (50 mL) added were the compound 47e (1.5 g, 6.22 mmol) and cesium carbonate (6.08 g, 18.67 mmol), and stirred at room temperature for 5 minutes. Then, the mixture was added with compound 47f, namely tert-butyl (3-bromopyrrolidine-1-carboxylate (1.86 g, 7.47 mmol), and stirred at 60° C. for 2 hours. After completion of the reaction, the product was filtered, and the filtrate was concentrated under reduced pressure and purified by column chromatography (eluent: dichloromethane/methanol=10/1) to obtain compound 47g, namely tert-butyl 3-(4-(2-((1-methyl-1H-pyrazol-4-yl)amino)pyrimidin-4-yl)-1H-pyrazol-1-yl)pyrrolidi ne-1-carboxylate, as a yellow solid (1.4 mg, yield of 55%). LCMS $[M+1]^+=411.0$

Step 2: Example 47h

The compound 47g (1.5 g, 6.22 mmol)) and a solution of hydrochloric acid in 1,4-dioxane (10 mL, 4 M) were stirred in ethyl acetate (20 mL) at room temperature for 1 hour. After the reaction was finished, the product was concentrated under reduced pressure to obtain compound 47h, namely N-(1-methyl-1H-pyrazol-4-yl)-4-(1-(pyrrolidine-3-yl)-1H-pyrazol-4-yl)pyrimidin-2-amine, as a grayish yellow solid (1.4 g crude product). LCMS $[M+1]^+=311.0$

Step 3: Example 47 (TDM-180647)

The mixture of the compound 47h (50 mg, 0.161 mmol) and triethylamine (65.6 mg, 0.643 mmol) in dimethylformamide (5 mL) was stirred at room temperature for 5 minutes. Then the mixture was added with ethyl sulfonyl chloride (31 mg, 0.241 mmol). The resultant mixture was stirred at room temperature for 2 hours, poured into water (10 mL) and extracted with ethyl acetate (30 mL×3). The organic layers were combined, washed with saline, dried over anhydrous magnesium sulfate, and concentrated under reduced pressure, and then the crude product was purified by a scraper (eluent: petroleum ether/ethyl acetate=0/100) to obtain compound 47, namely 4-(1-(1-(ethylsulfonyl)pyrrolidine-3-yl)-1H-pyrazol-4-yl)-N-(1-methyl-1H-pyrazol-4-yl)pyrimidin-2-amine, as a brown solid (16.2 mg, yield of 12%). LCMS $[M+1]^+=403.0$ $^1$H NMR (400 MHz, DMSO-$d_6$) δ 9.36 (s, 1H), 8.54 (s, 1H), 8.34 (d, J=5.1 Hz, 1H), 8.18 (s, 1H), 7.94 (s, 1H), 7.50 (s, 1H), 7.00 (d, J=5.1 Hz, 1H), 5.22-5.04 (m, 1H), 3.83 (s, 3H), 3.63 (dd, J=10.6, 4.3 Hz, 1H), 3.58-3.45 (m, 3H), 3.13 (dd, J=7.3, 3.8 Hz, 2H), 2.47-2.38 (m, 2H), 1.21 (dd, J=9.6, 5.1 Hz, 4H).

Compounds prepared by similar methods were as follows:
TDM-180648, which was compound 48, namely N-(1-methyl-1H-pyrazol-4-yl)-4-(1-(1-(propylsulfonyl)pyrrolidine-3-yl)-1H-pyrazol-4-yl)pyrimidin-2-amine, as a brown solid (24.2 mg, yield of 37%).

| Structure Structural formula | TDM No. Registration number | LCMS [M + 1]+ | 1H-NMR Hydrogen nuclear magnetic resonance spectrum |
|---|---|---|---|
| 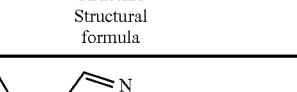 | TDM-180648 | 417.0 | 1H NMR (400 MHz, MeOD) δ 8.41 (s, 1H), 8.28 (d, J = 5.2 Hz, 1H), 8.13 (d, J = 2.9 Hz, 1H), 7.97 (s, 1H), 7.57 (s, 1H), 6.96 (d, J = 5.2 Hz, 1H), 5.18-5.06 (m, 1H), 3.90 (s, 3H), 3.88-3.74 (m, 2H), 3.72-3.52 (m, 2H), 3.16-2.97 (m, 2H), 2.51 (dq, J = 10.3, 7.8 Hz, 2H), 1.91-1.73 (m, 2H), 1.12-0.98 (m, 3H). |

Example 8. A reaction equation for synthesizing compound TDM-180649 was as follows:

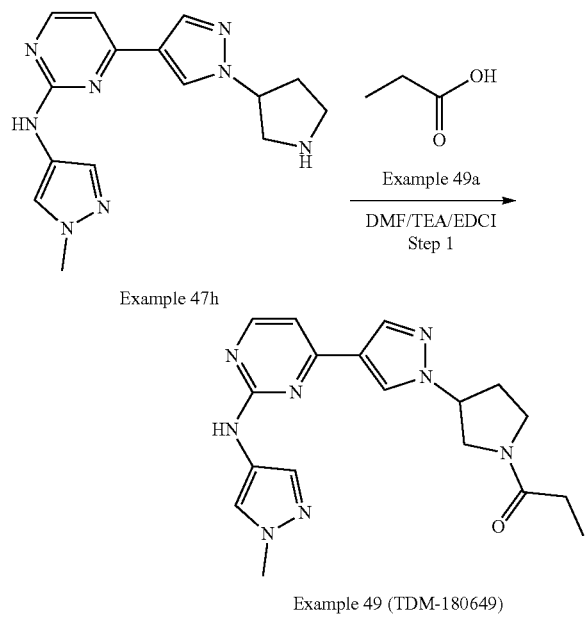

The mixture of the compound 47h (100 mg, 0.32 mmol) and triethylamine (130 mg, 1.28 mmol) in dimethylformamide (5 mL) was stirred at room temperature for 5 minutes. Then, the system was added with 1-(3-dimethylaminopropyl)-3-ethylcarbodiimide hydrochloride (92.4 mg, 0.48 mmol) and compound 49a, namely propionic acid (35 mg, 0.48 mmol). The reaction solution was stirred at room temperature for 2 hours. After completion of the reaction, the resultant mixture was poured into water (10 mL) and extracted with ethyl acetate (30 mL×3). The organic layers were combined, washed with a saturated saline solution, dried over anhydrous magnesium sulfate, and concentrated under reduced pressure, and then the crude product was purified and separated by column chromatography (ethyl acetate/methanol=20/1) to obtain compound 49, namely 1-(3-(4-(2-((1-methyl-1H-pyrazol-4-yl)amino)pyrimidin-4-yl)-1H-pyrazol-1-yl)pyrrolidin-1-yl)propan-1-one, as light green oil (10.8 mg, yield of 9%). LCMS [M+1]+=367.0

1H NMR (400 MHz, DMSO-d6) δ 9.45 (s, 1H), 8.53 (d, J=5.7 Hz, 1H), 8.33 (d, J=5.2 Hz, 1H), 8.18 (s, 1H), 7.94 (s, 1H), 7.50 (s, 1H), 7.02 (d, J=5.2 Hz, 1H), 5.18-4.99 (m, 1H), 3.97 (dd, J=11.0, 6.7 Hz, 1H), 3.82 (d, J=9.3 Hz, 4H), 2.44-2.22 (m, 4H), 1.21 (d, J=15.8 Hz, 2H), 0.99 (dd, J=13.0, 7.4 Hz, 3H).

Compounds prepared by similar methods were as follows:

| Structure Structural formula | TDM No. Registration number | LCMS [M + 1]+ | 1H-NMR Hydrogen nuclear magnetic resonance spectrum |
|---|---|---|---|
| 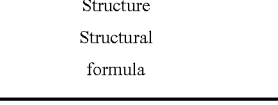 | TDM-180650 | 381.1 | 1H NMR (400 MHz, MeOD) δ 8.54 (d, J = 7.5 Hz, 1H), 8.23 (d, J = 1.9 Hz, 1H), 8.18 (s, 1H), 7.95 (s, 1H), 7.63 (s, 1H), 7.19 (d, J = 6.2 Hz, 1H), 5.14 (ddd, J = 16.3, 10.6, 5.3 Hz, 1H), 4.06 (dd, J = 11.4, 6.5 Hz, 1H), 3.95-3.90 (m, 4H), 3.84 (dd, J = 12.9, 5.1 Hz, 1H), 3.78-3.69 (m, 1H), 2.60-2.44 (m, 2H), 2.35 (dt, J = 14.9, 7.5 Hz, 2H), 1.73-1.57 (m, 2H), 0.98 (dt, J = 9.7, 7.4 Hz, 3H). |

| Structure Structural formula | TDM No. Registration number | LCMS [M + 1]⁺ | ¹H-NMR Hydrogen nuclear magnetic resonance spectrum |
|---|---|---|---|
| | TDM-180651 | 421.2 | ¹H NMR (400 MHz, MeOD) δ 8.54 (d, J = 6.0 Hz, 1H), 8.24 (s, 1H), 8.18 (s, 1H), 7.92 (d, J = 25.0 Hz, 1H), 7.63 (s, 1H), 7.18 (dd, J = 6.2, 1.5 Hz, 1H), 5.18 (qd, J = 11.0, 5.7 Hz, 1H), 4.09 (dd, J = 11.2, 6.5 Hz, 1H), 4.00 (dd, J = 11.3, 4.3 Hz, 1H), 3.93 (s, 3H), 3.86 (d, J = 8.5 Hz, 1H), 3.82-3.72 (m, 1H), 3.45 (dd, J = 12.4, 10.7 Hz, 2H), 2.63-2.41 (m, 2H). |
| | TDM-180652 | 379.2 | ¹H NMR (400 MHz, MeOD) δ 8.53 (d, J = 11.2 Hz, 1H), 8.24-8.14 (m, 2H), 7.95 (s, 1H), 7.62 (s, 1H), 7.17 (d, J = 6.1 Hz, 1H), 5.26-5.04 (m, 1H), 4.30-3.98 (m, 2H), 3.93 (s, 4H), 3.80-3.59 (m, 1H), 2.61-2.39 (m, 2H), 1.90-1.75 (m, 1H), 0.91 (dd, J = 7.9, 3.4 Hz, 2H), 0.88-0.81 (m, 2H). |
| | TDM-180653 | 378.2 | ¹H NMR (400 MHz, DMSO-d₆) δ 9.52 (s, 1H), 8.55 (s, 1H), 8.34 (d, J = 5.3 Hz, 1H), 8.20 (s, 1H), 7.95 (s, 1H), 7.52 (s, 1H), 7.04 (d, J = 5.3 Hz, 1H), 5.17 (dd, J = 21.3, 16.2 Hz, 1H), 3.97-3.92 (m, 2H), 3.84 (s, 3H), 3.79 (d, J = 4.0 Hz, 1H), 3.70-3.50 (m, 3H), 2.43-2.28 (m, 2H). |
| | TDM-180654 | 415.1 | ¹H NMR (400 MHz, MeOD) δ 7.62 (t, J = 9.9 Hz, 1H), 7.36-7.26 (m, 2H), 7.06 (s, 1H), 6.73 (s, 1H), 6.25 (d, J = 6.0 Hz, 1H), 4.38-4.18 (m, 1H), 3.27 (ddd, J = 44.8, 25.5, 5.2 Hz, 1H), 3.03 (s, 5H), 2.96-2.76 (m, 1H), 2.05-1.85 (m, 1H), 1.74-1.51 (m, 2H), 1.15 (dt, J = 13.0, 6.6 Hz, 1H), 0.89 (dd, J = 11.0, 7.0 Hz, 1H). |

TDM-180650, which was compound 50, namely 1-(3-(4-(2-((1-methyl-1H-pyrazol-4-yl)amino)pyrimidin-4-yl)-1H-pyrazol-1-yl)pyrrolidin-1-yl)butan-1-one, as light green oil (21 mg, yield of 17%).

TDM-180651, which was compound 51, namely 3,3,3-trifluoro-1-(3-(4-(2-((1-methyl-1H-pyrazol-4-yl)amino)pyrimidin-4-yl)-1H-pyrazol-1-yl)pyrrolidine-yl)propan-1-one, as light green oil (18 mg, yield of 13%).

TDM-180652, which was compound 52, namely cyclopropyl(3-(4-(2-((1-methyl-1H-pyrazol-4-yl)amino)pyrimidin-4-yl)-1H-pyrazol-1-yl)pyrrolidin-1-yl)ketone, as light green oil (16 mg, yield of 13%).

TDM-180653, which was compound 53, namely 3-(3-(4-(2-((1-methyl-1H-pyrazol-4-yl)amino)pyrimidin-4-yl)-1H-pyrazol-1-yl)pyrrolidin-1-yl)-3-oxopropanenitrile, as light green oil (7.5 mg, yield of 6%).

TDM-180654, which was compound 54, namely (2,2-difluorocyclopropyl)(3-(4-(2-((1-methyl-1H-pyrazol-4-yl)amino)pyrimidin-4-yl)-1H-pyrazol-1-yl)pyrrolidin-1-yl)ketone, as a light green solid (31.6 mg, yield of 23.7%).

Example 9. A reaction equation for synthesizing compound TDM-180655 was as follows:

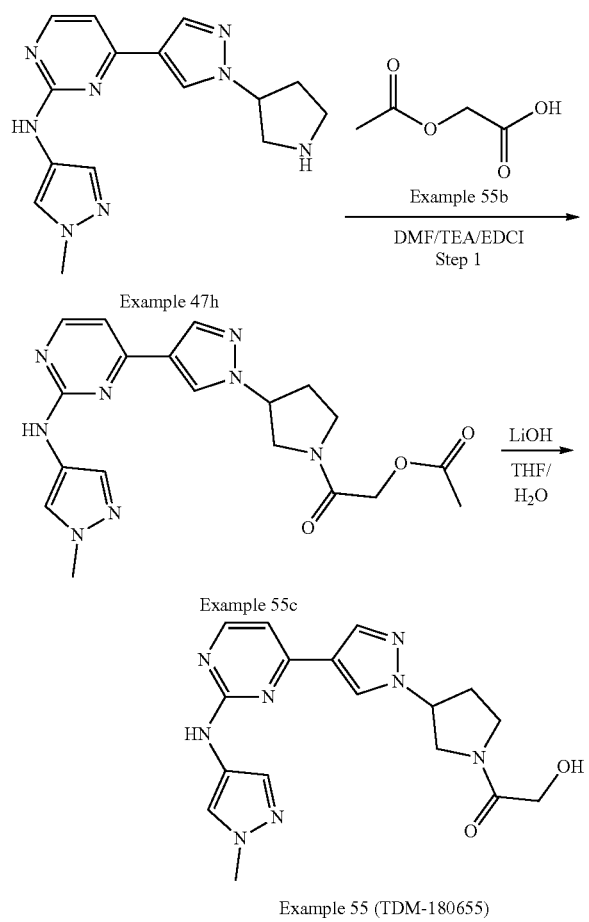

Step 1: Example 55c

By using the compound 47h as the raw material, the process was conducted similar to the operation steps of Example 49, so as to obtain compound 55c, namely ethoxyethyl 2-(3-(4-(2-((1-methyl-1H-pyrazol-4-yl)amino)pyrimidin-4-yl)-1H-pyrazol-1-yl)pyrrolidin-1-yl)-2-acetate, as light green oil (7.5 mg, yield of 6%). LCMS [M+1]$^+$=411.1

Step 2: Example 55 (TDM-180655)

Into a solution of the compound 55c (40 mg, 0.112 mmol) in tetrahydrofuran (5 ml) added was a LiOH aqueous solution (1 M, 2.5 mL). The reaction solution was reacted at room temperature for 2 hours. After completion of the reaction, the product was extracted with ethyl acetate (30 mL*5), the organic layers were combined, dried over anhydrous magnesium sulfate, and concentrated under reduced pressure, and then the crude product was purified by preparation to obtain compound 55, namely 2-hydroxy-1-(3-(4-(2-((1-methyl-1H-pyrazol-4-yl)amino)pyrimidin-4-yl)-1H-pyrazol-1-yl)pyrrolidin-1-yl)ethanone, as a white solid (11.9 mg, yield of 17%). LCMS [M+1]$^+$=367.0

$^1$H NMR (400 MHz, MeOD) δ 7.72 (d, J=5.7 Hz, 1H), 7.46-7.35 (m, 2H), 7.16 (s, 1H), 6.84 (s, 1H), 6.37 (dd, J=6.1, 2.0 Hz, 1H), 4.44-4.30 (m, 1H), 3.41 (d, J=17.5 Hz, 2H), 3.17 (d, J=5.4 Hz, 2H), 3.15-3.06 (m, 3H), 3.01-2.81 (m, 2H), 1.81-1.62 (m, 2H).

Example 10. A reaction equation for synthesizing compound TDM-180674 was as follows:

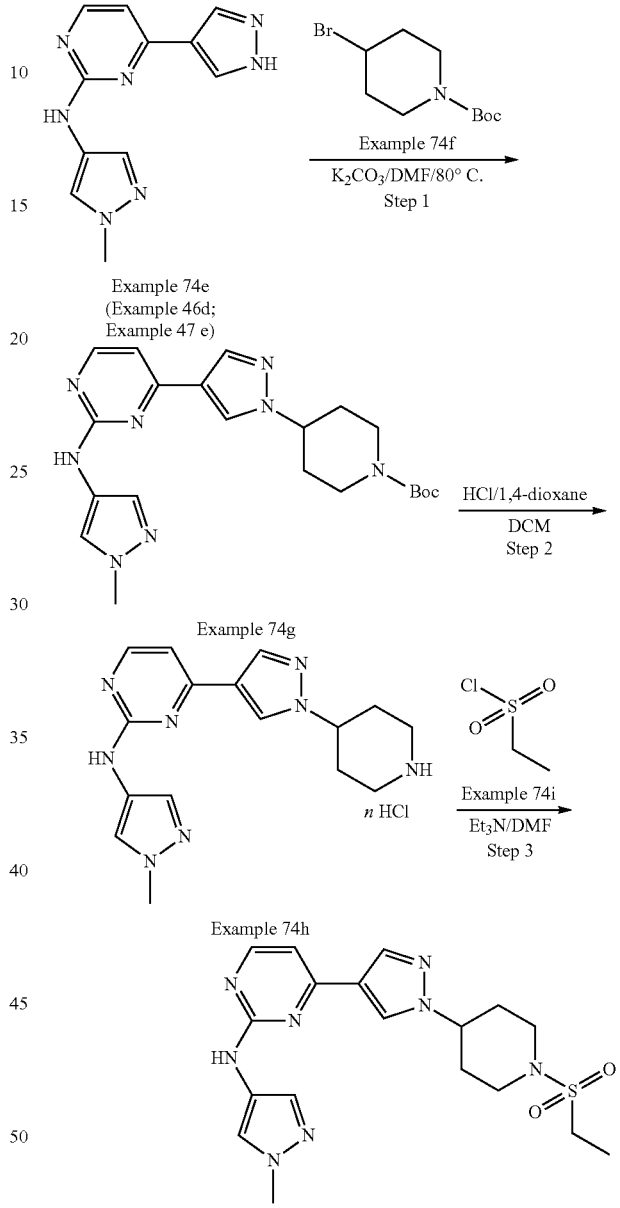

Step 1: Example 74g

Into dimethylformamide (20 mL) added were the compound 74e (700 mg, 2.9 mmol), potassium carbonate (3.2 g, 23.2 mmol) and compound 74f, namely tert-butyl 4-bromopiperidin-1-carboxylate (3 g, 11.6 mmol), and the mixture was stirred at 80° C. for 20 hours. After completion of the reaction, the resultant mixture was poured into water (30 mL) and extracted with ethyl acetate (40 mL×3). The organic layers were combined, washed with a saturated saline solution, dried over anhydrous magnesium sulfate, and concentrated under reduced pressure, and then the crude product was pulped with dichloromethane/petroleum ether (about 5:1) and filtered. The obtained solid was the recycled raw material, and the filtrate was concentrated to obtain the crude product. The crude product was separated and purified by column chromatography (EtOAc) to obtain compound 74g, namely tert-butyl 4-(4-(2-((1-methyl-1H-pyrazol-4-yl) amino)pyrimidin-4-yl)-1H-pyrazol-1-yl) piperidin-1-carboxylate, as a white solid (500 mg, yield of 71%).

LCMS [M+1]$^+$=425.1

1H NMR (400 MHz, Chloroform-d) δ 8.34 (d, J=5.2 Hz, 1H), 8.04 (s, 2H), 7.83 (s, 1H), 7.58 (s, 1H), 6.87 (s, 1H), 6.81 (d, J=5.2 Hz, 1H), 4.23-4.40 (m, 3H), 3.93 (s, 3H), 2.84-3.01 (m, 2H), 2.14-2.25 (m, 2H), 1.90-2.05 (m, 2H), 1.50 (s, 9H).

Step 2: Example 74h

The compound 74g (500 mg, 1.2 mmol) and a solution of hydrochloric acid in 1,4-dioxane (3 mL, 4 M) were stirred in dichloromethane (12 mL) at room temperature for 4 hours. After the reaction was finished, the product was concentrated under reduced pressure to obtain compound 74h, namely N-(1-methyl-1H-pyrazol-4-yl)-4-(1-(piperidin-4-yl)-1H-pyrazol-4-yl)pyrimidin-2-amine, as a grayish yellow solid (0.57 g crude product). LCMS [M+1]$^+$=325.1

Step 3: Example 74 (TDM-180674)

Into dimethylformamide (6 mL) added were the compound 74h (100 mg, 0.31 mmol) and triethylamine (0.18 mL), and stirred for 5 minutes. The mixture was added with ethyl sulfonyl chloride (47 mg, 0.37 mmol) under a condition of ice bath. The resultant mixture was stirred at room temperature for 1.5 hours, poured into water (30 mL) and extracted with ethyl acetate (20 mL×4). The organic layers were combined, washed with saline, dried over anhydrous magnesium sulfate, and concentrated under reduced pressure, and then the crude product was pulped and purified (petroleum ether/ethyl acetate=1/2) and filtered, and the solid was collected to obtain compound 74, namely 4-(1-(1-(ethylsulfonyl)piperidin-4-yl)-1H-pyrazol-4-yl)-N-(1-methyl-1H-pyrazol-4-yl)pyrimidin-2-amine, as a white solid (30 mg, yield of 47%).

LCMS [M+1]$^+$=417.1

1H NMR (400 MHz, Chloroform-d) δ 8.35 (d, J=5.2 Hz, 1H), 8.04 (s, 2H), 7.83 (s, 1H), 7.57 (s, 1H), 6.93 (s, 1H), 6.82 (d, J=5.2 Hz, 1H), 4.29-4.40 (m, 2H), 3.95-4.02 (m, 2H), 3.93 (s, 3H), 2.99-3.13 (m, 4H), 2.26-2.32 (m, 2H), 2.09-2.21 (m, 2H), 1.42 (t, J=7.6 Hz, 3H).

Compounds prepared by similar methods were as follows:

TDM-180675, which was compound 75, namely N-(1-methyl-1H-pyrazol-4-yl)-4-(1-(1-(propylsulfonyl)piperidin-4-yl)-1H-pyrazol-4-yl)pyrimidin-2-amine, as a white solid (70 mg, yield of 53%).

| Structure Structural formula | TDM No. Registration number | LCMS [M + 1]$^+$ | $^1$H-NMR Hydrogen nuclear magnetic resonance spectrum |
|---|---|---|---|
| | TDM-180675 | 431.1 | 1H NMR (400 MHz, Chloroform-d) δ 8.35 (d, J = 4.8 Hz, 1H), 8.04 (s, 2H), 7.83 (s, 1H), 7.57 (s, 1H), 6.91 (s, 1H), 6.82 (d, J = 5.2 Hz, 1H), 4.29-4.40 (m, 2H), 3.95-4.02 (m, 2H), 3.93 (s, 3H), 2.99-3.13 (m, 4H), 2.26-2.32 (m, 2H), 2.09-2.21 (m, 2H), 1.84-1.96 (m, 2H), 1.10 (t, J = 7.6 Hz, 3H). |

Example 11. A reaction equation for synthesizing compound TDM-180673 was as follows:

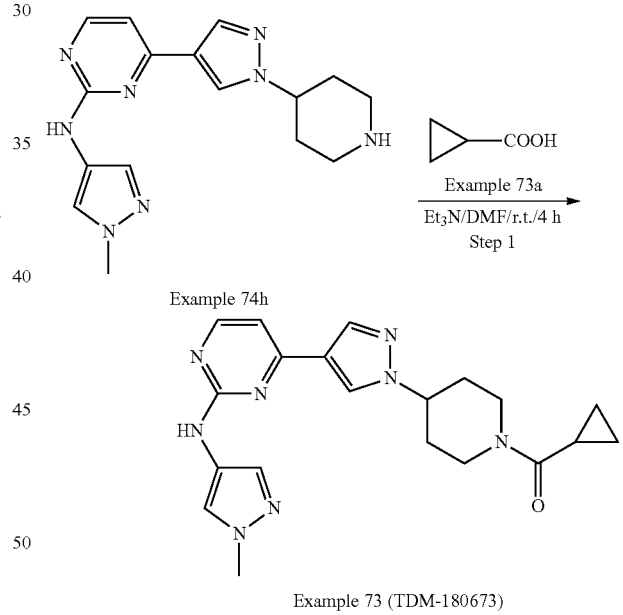

Into dimethylformamide (8 mL) added were the compound 74h (110 mg, 0.34 mmol) and triethylamine (0.2 mL), and stirred for 5 minutes. Then, the mixture was added with compound 73a, namely cyclopropanecarboxylic acid (73 mg, 0.85 mmol) and HATU (200 mg, 0.51 mmol). The resultant mixture was stirred at room temperature for 4 hours, poured into water (30 mL) and extracted with ethyl acetate (50 mL×6). The organic layers were combined, washed with saline, dried over anhydrous magnesium sulfate, and concentrated under reduced pressure, and then the crude product was purified and separated by column chromatography (ethyl acetate/methanol=20/1) to obtain compound 73, namely cyclopropyl(4-(4-(2-((1-methyl-1H-pyrazol-4-yl)amino)pyrimidin-4-yl)-1H-pyrazol-1-yl)piperidin-1-yl)ketone, as a white solid (49.2 mg, yield of 36.9%).
LCMS [M+1]⁺=393.1

1H NMR (400 MHz, Chloroform-d) δ 8.315 (s, 1H), 8.107 (s, 2H), 7.800 (s, 1H), 7.562 (s, 1H), 6.846 (s, 1H), 6.793 (d, J=5.2 Hz, 2H), 4.768 (s, 1H), 4.366-4.461 (m, 2H), 3.910 (s, 3H), 3.297 (s, 1H), 2.817 (s, 1H), 2.238 (s, 2H), 2.012 (s, 2H), 1.758-1.821 (m, 1H), 1.000-1.037 (m, 2H), 0.785-0.821 (m, 2H).

Compounds prepared by similar methods were as follows:

| Structure Structural formula | TDM No. Registration number | LCMS [M + 1]⁺ | ¹H-NMR Hydrogen nuclear magnetic resonance spectrum |
|---|---|---|---|
| | TDM-180676 | 381.1 | 1H NMR (400 MHz, Chloroform-d) δ 8.34 (d, J = 5.2 Hz, 1H), 8.03 (s, 2H), 7.82 (s, 1H), 7.59 (s, 1H), 6.91 (s, 1H), 6.81 (d, J = 4.8 Hz, 1H), 4.77-4.88 (m, 1H), 4.36-4.47 (m, 1H), 4.01-4.09 (m, 1H), 3.93 (s, 3H), 3.18-3.30 (m, 1H), 2.75-2.86 (m, 1H), 2.43 (q, J = 7.6 Hz, 2H), 2.09-2.32 (m, 2H), 1.93-2.08 (m, 2H), 1.21 (t, J = 7.6 Hz, 3H). |
| | TDM-180677 | 395.1 | 1H NMR (400 MHz, Chloroform-d) δ 8.34 (d, J = 5.2 Hz, 1H), 8.03 (d, J = 3.2 Hz, 2H), 7.82 (s, 1H), 7.58 (s, 1H), 6.91 (s, 1H), 6.81 (d, J = 5.2 Hz, 1H), 4.36-4.47 (m, 1H), 4.00-4.01 (m, 1H), 3.93 (s, 3H), 3.18-3.30 (m, 1H), 2.75-2.86 (m, 1H), 2.38 (t, J = 7.6 Hz, 2H), 2.18-2.32 (m, 2H), 1.92-2.05 (m, 2H), 1.68-1.76 (m, 2H), 1.02 (t, J = 7.6 Hz, 3H). |
| | TDM-180678 | 435.1 | 1H NMR (400 MHz, Chloroform-d) δ 8.35 (d, J = 5.2 Hz, 1H), 8.03 (d, J = 1.2 Hz, 2H), 7.81 (s, 1H), 7.58 (s, 1H), 6.96 (s, 1H), 6.82 (d, J = 5.2 Hz, 1H), 4.74-4.84 (m, 1H), 4.39-4.49 (m, 1H), 3.95-4.01 (m, 1H), 3.93 (s, 3H), 3.27-3.41 (m, 3H), 2.86-2.97 (m, 1H), 2.23-2.36 (m, 2H), 2.00-2.10 (m, 2H). |
| | TDM-180679 | 429.1 | 1H NMR (400 MHz, Chloroform-d) δ 8.35 (d, J = 5.2 Hz, 1H), 8.00-8.08 (m, 2H), 7.77-7.87 (m, 1H), 7.52-7.63 (m, 1H), 6.97 (s, 1H), 6.82 (d, J = 5.2 Hz, 1H), 4.63-4.84 (m, 1H), 4.41-4.52 (m, 1H), 4.17-4.29 (m, 1H), 3.93 (s, 3H), 3.32-3.44 (m, 1H), 2.84-3.07 (m, 1H), 2.53-2.66 (m, 1H), 1.73-2.44 (m, 6H). |

-continued

| Structure Structural formula | TDM No. Registration number | LCMS [M + 1]+ | 1H-NMR Hydrogen nuclear magnetic resonance spectrum |
|---|---|---|---|
| 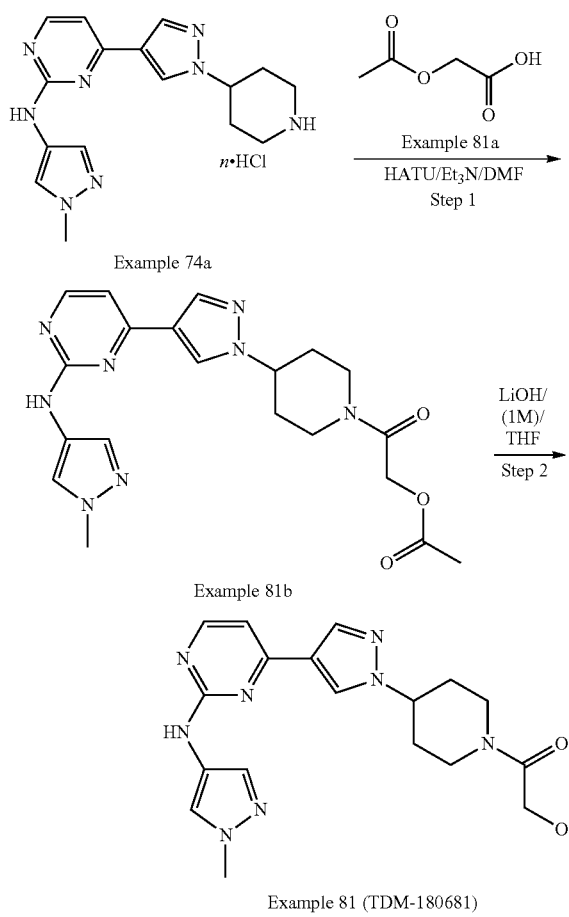 | TDM-180680 | 392.1 | 1H NMR (400 MHz, Chloroform-d) δ 8.35 (d, J = 5.2 Hz, 1H), 8.04 (d, J = 4.4 Hz, 2H), 7.80 (s, 1H), 7.59 (s, 1H), 6.99 (s, 1H), 6.82 (d, J = 5.2 Hz, 1H), 4.67-4.74 (m, 1H), 3.86-4.00 (m, 4H), 3.51-3.63 (m, 2H), 3.36-3.45 (m, 1H), 2.93-3.02 (m, 1H), 2.23-2.39 (m, 2H), 1.99-2.21 (m, 2H). |

TDM-180676, which was compound 76, namely 1-(4-(4-(2-((1-methyl-1H-pyrazol-4-yl)amino)pyrimidin-4-yl)-1H-pyrazol-1-yl)piperidin-1-yl)propan-1-one, as a white solid (55 mg, yield of 47%).
TDM-180677, which was compound 77, namely 1-(4-(4-(2-((1-methyl-1H-pyrazol-4-yl)amino)pyrimidin-4-yl)-1H-pyrazol-1-yl)piperidin-1-yl)butan-1-one, as a white solid (55 mg, yield of 45%).
TDM-180678, which was compound 78, namely 3,3,3-trifluoro-1-(4-(4-(2-((1-methyl-1H-pyrazol-4-yl)amino)pyrimidin-4-yl)-1H-pyrazol-1-yl)piperidin-1-yl)propan-1-one, as a white solid (63.4 mg, yield of 47%).
TDM-180679, which was compound 79, namely (2,2-difluorocyclopropyl)(4-(4-(2-((1-methyl-1H-pyrazol-4-yl)amino)pyrimidin-4-yl)-1H-pyrazol-1-yl)piperidin-1-yl)ketone, as light green oil (78.6 mg, yield of 59%).
TDM-180680, which was compound 80, namely 3-(4-(4-(2-((1-methyl-1H-pyrazol-4-yl)amino)pyrimidin-4-yl)-1H-pyrazol-1-yl)piperidin-1-yl)3-oxopropanenitrile, as a white solid (80.2 mg, yield of 33%).

Example 12. A reaction equation for synthesizing compound TDM-180681 was as follows:

Step 1: Example 81b

By using the compound 74h as the raw material, the process was conducted with operation steps similar to those of Example 73. Compound 81b, namely ethoxyethyl 2-(4-(4-(2-((1-methyl-1H-pyrazol-4-yl)amino)pyrimidin-4-yl)-1H-pyrazol-1-yl)piperidin-1-yl)-2-acetate, was obtained as a light green solid (120 mg, yield of 61.5%). LCMS[M+1]+=425.1

Step 2: Example 81

Into a solution of the compound 81b (150 mg, 0.35 mmol) in tetrahydrofuran (5 ml) added was a lithium hydroxide aqueous solution (1 M, 1.5 mL). The reaction solution was reacted at room temperature for 1 hour. After completion of the reaction, the reaction solution was extracted with ethyl acetate (15 mL*7), the organic layers were combined, dried over anhydrous magnesium sulfate, and concentrated under reduced pressure, and then the crude product was purified by column chromatography to obtain compound 81, namely 2-hydroxy-1-(4-(4-(2-((1-methyl-1H-pyrazol-4-yl) amino) pyrimidin-4-yl)-1H-pyrazol-1-yl)piperidin-1-yl)ethanone, as a white solid (52.8 mg, yield of 33%).

LCMS [M+1]+=383.1
1H NMR (400 MHz, Chloroform-d) δ 8.34 (d, J=5.2 Hz, 1H), 8.04 (d, J=2.0 Hz, 2H), 7.80 (s, 1H), 7.61 (s, 1H), 6.98 (s, 1H), 6.81 (d, J=5.2 Hz, 1H), 4.69-4.79 (m, 1H), 4.40-4.51 (m, 1H), 4.19-4.30 (m, 2H), 3.93 (s, 3H), 3.67-3.76 (m, 1H), 3.13-3.27 (m, 2H), 2.93-3.06 (m, 1H), 2.23-2.34 (m, 2H), 1.99-2.13 (m, 2H).

Example 13. A reaction equation for synthesizing compound TDM-180726 was as follows:

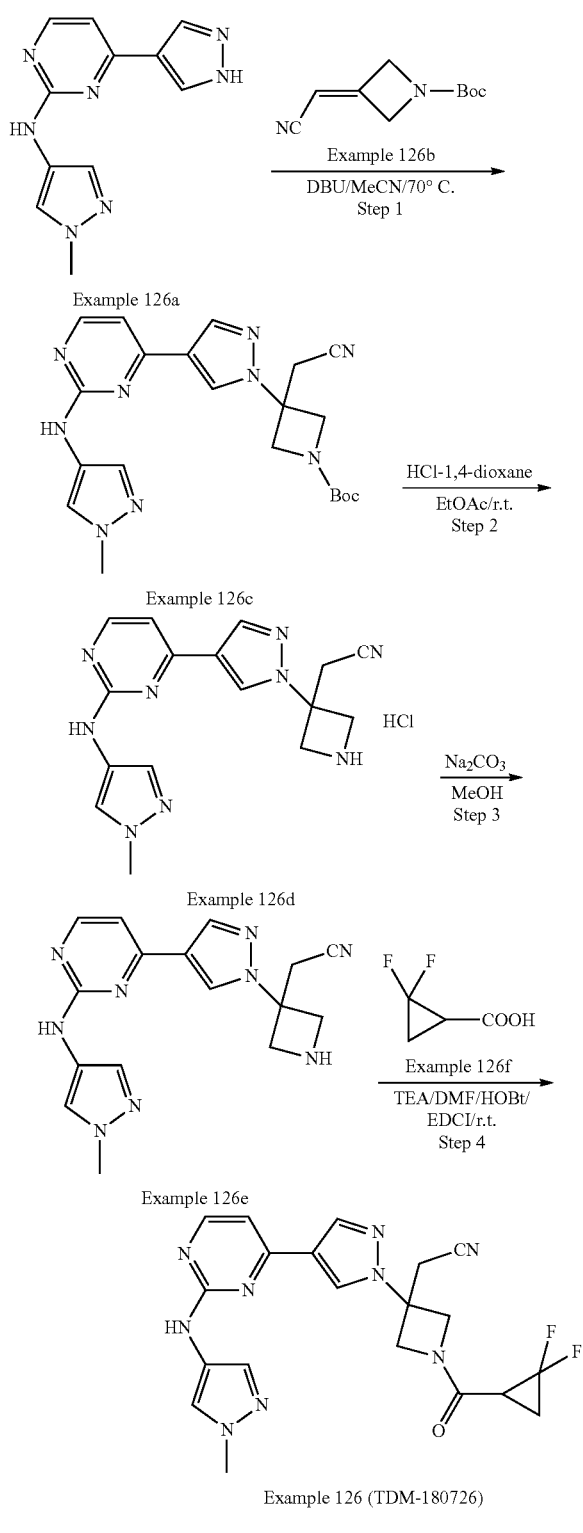

Step 1: Example 126c

Into a solution of compound 126b, namely tert-butyl 3-(cyanomethylene) azetidin-1-carboxylate (242 mg, 1.25 mmol) and compound 126a, namely N-(1-methyl-1H-pyrazol-4-yl)-4-(1H-pyrazol-4-yl)pyrimidin-2-amine (300 mg, 1.25 mmol) in acetonitrile (30 mL) added was 1,8-diazabi- cycloundec-7-ene (380 mg, 2.49 mmol). The mixture was stirred at 70° C. for 16 hours. The solvent was removed under reduced pressure, and the residue was purified by flash chromatography (dichloromethane/(dichloromethane/methanol=10:1)=70:30) to obtain compound 126c, namely tert-butyl 3-(cyanomethyl)-3-(4-(2-((1-methyl-1H-pyrazol-4-yl)amino) pyrimidin-4-yl)-1H-pyrazol-1-yl)azetidin-1-carboxylate, as a white solid (410 mg, yield of 65%). LCMS [M+1]$^+$=436.1

Step 2: Example 126d

Into a mixture of the compound 126c (410 mg, 0.94 mmol) in ethyl acetate (30 mL) added was a solution of hydrochloric acid in dioxane (20 mL) at room temperature. Then the mixture was stirred at room temperature for 2 hours, and then the mixture was concentrated under reduced pressure to obtain compound 126d, namely 2-(3-(4-(2-((1-methyl-1H-pyrazol-4-yl)amino)pyrimidin-4-yl)-1H-pyrazol-1-yl)azetidin-3-yl)acetonitrile hydrochloride, as a yellow solid (480 mg, crude product). LCMS [M+1]$^+$=336.1

Step 3: Example 126e

Into a mixture of the compound 126d (100 mg, 0.30 mmol) in methanol (10 mL) added was sodium carbonate (63 mg, 0.60 mmol), and stirred at room temperature for 30 minutes. The mixture was filtered, the filter cake was washed with methanol, and the filtrates were combined and concentrated under reduced pressure to obtain compound 126e, namely 2-(3-(4-(2-((1-methyl-1H-pyrazol-4-yl)amino)pyrimidin-4-yl)-1H-pyrazol-1-yl)azetidin-3-yl)acetonitrile, as a white solid (100 mg, crude product).

Step 4: Example 126 (TDM-180726)

Into a solution of the compound 126e (50 mg, 0.15 mmol) in N,N-dimethylformamide (10 mL) added was triethylamine (60 mg, 0.60 mmol), and stirred at room temperature for 5 minutes. The mixture was added with compound 126f, namely 2,2-difluorocyclopropane-1-carboxylic acid (27 mg, 0.22 mmol), 1-(3-dimethylaminopropyl)-3-ethylcarbodiimide (43 mg, 0.22 mmol) and 1-hydroxybenzotriazole (30 mg, 0.22 mmol). The mixture was then stirred at room temperature for 2 hours, diluted with water, and extracted with ethyl acetate (50 mL×3). The combined organic layers were washed with water (3×50 mL) and saline (3×50 mL), the organic layers were separated, dried over anhydrous sodium sulfate and concentrated under reduced pressure, and the residue was purified by flash column chromatography (ethyl acetate/methanol=20/1) to obtain compound 126, TDM-180726, namely 2-(1-(2,2-difluorocyclo-1-carbonyl)-3-(4-(2-((1-methyl-1H-pyrazol-4-yl)amino)pyrimidin-4-yl)-1H-pyrazol-1-yl)azetidin-3-yl)acetonitrile, as a light yellow solid (10.9 mg, yield of 16%). LCMS[M+1]+=440.2

$^1$H NMR (400 MHz, MeOD) δ 8.65 (s, 1H), 8.31 (d, J=5.2 Hz, 1H), 8.25 (s, 1H), 7.98 (s, 1H), 7.58 (s, 1H), 7.00 (d, J=5.2 Hz, 1H), 4.95 (dd, J=24.4, 9.6 Hz, 1H), 4.68 (ddd, J=18.5, 15.3, 7.1 Hz, 2H), 4.47-4.34 (m, 1H), 3.87 (d, J=10.4 Hz, 3H), 3.58 (s, 2H), 2.68 (ddd, J=14.7, 13.7, 7.4 Hz, 1H), 2.06-1.93 (m, 1H), 1.83 (tt, J=12.0, 6.2 Hz, 1H).

Compounds prepared by similar methods were as follows:

| Structure Structural formula | TDM No. Registration number | LCMS [M + 1]⁺ | ¹H-NMR Hydrogen nuclear magnetic resonance spectrum |
|---|---|---|---|
| | TDM-180727 | 403.2 | ¹H NMR (400 MHz, MeOD) δ 8.63 (s, 1H), 8.31 (d, J = 5.2 Hz, 1H), 8.24 (s, 1H), 7.96 (d, J = 7.0 Hz, 1H), 7.58 (s, 1H), 6.99 (d, J = 5.2 Hz, 1H), 4.64 (t, J = 9.0 Hz, 2H), 4.41 (d, J = 10.7 Hz, 1H), 3.89 (s, 3H), 3.57 (s, 2H), 2.21-2.14 (m, 1H), 2.07-1.98 (m, 2H). |
| | TDM-180752 | 446.1 | ¹H NMR (400 MHz, CDCl₃) δ 9.40 (s, 1H), 8.80 (s, 1H), 8.49-8.25 (m, 2H), 7.97 (s, 1H), 7.50 (s, 1H), 7.04 (d, J = 5.1 Hz, 1H), 4.77 (d, J = 9.7 Hz, 1H), 4.53 (dd, J = 21.4, 10.2 Hz, 2H), 4.29 (d, J = 10.6 Hz, 1H), 3.83 (s, 3H), 3.68 (s, 2H), 3.47 (m, 2H). |
| | TDM-180753 | 404.2 | ¹H NMR (400 MHz, DMSO) δ 9.40 (s, 1H), 8.82 (s, 1H), 8.49-8.25 (m, 2H), 7.97 (s, 1H), 7.50 (s, 1H), 7.05 (d, J = 5.1 Hz, 1H), 4.83 (d, J = 9.5 Hz, 1H), 4.63 (d, J = 9.4 Hz, 1H), 4.43 (d, J = 10.5 Hz, 1H), 4.23 (d, J = 10.3 Hz, 1H), 3.83 (s, 3H), 3.71 (s, 2H), 1.82-1.50 (m, 1H), 0.95-0.61 (m, 4H). |
| | TDM-180765 | 407.4 | ¹H NMR (400 MHz, CDCl₃) δ 8.35 (d, J = 4.8 Hz, 1H), 8.22 (s, 1H), 8.11 (s, 1H), 7.82 (s, 1H), 7.56 (s, 1H), 6.82 (d, J = 5.2 Hz, 1H), 4.88 (d, J = 10.4 Hz, 1H), 4.65 (dd, J = 28.8, 10.8 Hz, 2H), 4.41 (d, J = 10.9 Hz, 1H), 4.08 (d, J = 1.5 Hz, 2H), 3.91 (s, 3H), 3.41 (s, 3H), 3.29 (d, J = 2.6 Hz, 2H). |
| | TDM-180925 | 476.2 | ¹H NMR (400 MHz, DMSO-d₆) δ 9.41 (s, 1H), 8.81 (s, 1H), 8.39 (d, J = 5.1 Hz, 1H), 8.32 (s, 1H), 7.97 (s, 1H), 7.50 (s, 1H), 7.04 (d, J = 5.1 Hz, 1H), 4.54 (d, J = 9.0 Hz, 2H), 4.26 (d, J = 9.1 Hz, 2H), 3.83 (s, 3H), 3.75 (t, J = 6.6 Hz, 2H), 3.68 (s, 2H), 3.39-3.34 (m, 2H), 2.21-2.10 (m, 2H). |

| Structure Structural formula | TDM No. Registration number | LCMS [M + 1]⁺ | ¹H-NMR Hydrogen nuclear magnetic resonance spectrum |
|---|---|---|---|
| | TDM-180927 | 486.2 | ¹H NMR (400 MHz, DMSO-d$_6$) δ 9.41 (s, 1H), 8.80 (s, 1H), 8.44-8.22 (m, 2H), 7.97 (s, 1H), 7.50 (s, 1H), 7.04 (d, J = 5.1 Hz, 1H), 4.51 (d, J = 9.0 Hz, 2H), 4.25 (d, J = 9.1 Hz, 2H), 3.83 (s, 3H), 3.66 (s, 2H), 3.61 (s, 3H), 3.51 (t, J = 7.2 Hz, 2H), 2.77 (t, J = 7.2 Hz, 2H). |
| | TDM-180928 | 482.1 | ¹H NMR (400 MHz, DMSO-d$_6$) δ 9.41 (s, 1H), 8.81 (s, 1H), 8.40 (d, J = 5.1 Hz, 1H), 8.33 (s, 1H), 7.97 (s, 1H), 7.51 (s, 1H), 7.04 (d, J = 5.1 Hz, 1H), 4.82 (q, J = 10.0 Hz, 2H), 4.66 (d, J = 9.1 Hz, 2H), 4.42 (d, J = 9.1 Hz, 2H), 3.83 (s, 3H), 3.67 (s, 2H) |
| | TDM-180930 | 472.1 | ¹H NMR (400 MHz, DMSO-d$_6$) δ 9.41 (s, 1H), 8.81 (s, 1H), 8.39 (d, J = 5.1 Hz, 1H), 8.32 (s, 1H), 7.97 (s, 1H), 7.50 (s, 1H), 7.04 (d, J = 5.1 Hz, 1H), 4.64 (t, J = 4.4 Hz, 4H), 4.39 (d, J = 9.2 Hz, 2H), 3.83 (s, 3H), 3.68 (d, J = 16.3 Hz, 5H) |
| | TDM-180931 | 454.2 | ¹H NMR (400 MHz, DMSO-d$_6$) δ 9.41 (s, 1H), 8.81 (s, 1H), 8.39 (d, J = 5.1 Hz, 1H), 8.32 (s, 1H), 7.97 (s, 1H), 7.51 (s, 1H), 7.04 (d, J = 5.1 Hz, 1H), 4.54 (d, J = 9.0 Hz, 2H), 4.25 (d, J = 9.1 Hz, 2H), 3.83 (s, 3H), 3.66 (s, 2H), 3.21 (d, J = 7.1 Hz, 2H), 1.04 (ddd, J = 12.5, 7.8, 4.7 Hz, 1H), 0.66-0.54 (m, 2H), 0.43-0.32 (m, 2H). |

-continued

| Structure Structural formula | TDM No. Registration number | LCMS [M + 1]+ | 1H-NMR Hydrogen nuclear magnetic resonance spectrum |
|---|---|---|---|
| 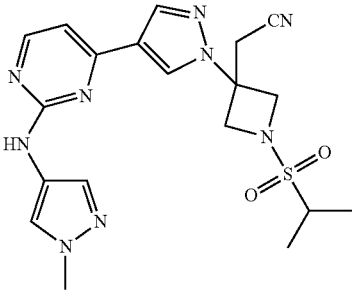 [SMILES: CC(C)S(=O)(=O)N1CC(CC#N)(n2cc(-c3ccnc(Nc4cnn(C)c4)n3)cn2)C1] | TDM-180932 | 442.2 | 1H NMR (400 MHz, DMSO-d6) δ 9.41 (s, 1H), 8.80 (s, 1H), 8.39 (d, J = 5.1 Hz, 1H), 8.31 (s, 1H), 7.97 (s, 1H), 7.50 (s, 1H), 7.04 (d, J = 5.1 Hz, 1H), 4.52 (d, J = 8.9 Hz, 2H), 4.20 (d, J = 9.0 Hz, 2H), 3.83 (s, 3H), 3.68 (s, 2H), 3.39-3.34 (m, 1H), 1.27 (s, 3H), 1.26 (s, 3H). |
| 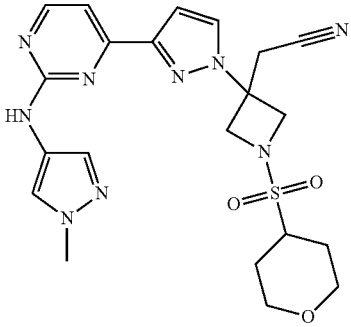 [SMILES: Cn1cc(Nc2nccc(-c3ccn(C4(CC#N)CN(S(=O)(=O)C5CCOCC5)C4)n3)n2)cn1] | TDM-180912 | 484.2 | 1H NMR (400 MHz, DMSO-d6) δ 9.53 (s, 1H), 8.46 (d, J = 5.0 Hz, 1H), 8.27 (d, J = 2.5 Hz, 1H), 7.98 (s, 1H), 7.52 (s, 1H), 7.21 (d, J = 5.1 Hz, 1H), 7.08 (s, 1H), 4.54 (d, J = 8.9 Hz, 2H), 4.25 (d, J = 9.0 Hz, 2H), 3.93 (dd, J = 11.2, 3.7 Hz, 2H), 3.83 (s, 3H), 3.68 (s, 2H), 3.49 (tt, J = 11.9, 3.7 Hz, 1H), 3.36 (s, 2H), 1.91 (dd, J = 12.4, 1.9 Hz, 2H), 1.65 (qd, J = 12.3, 4.6 Hz, 2H). |
| 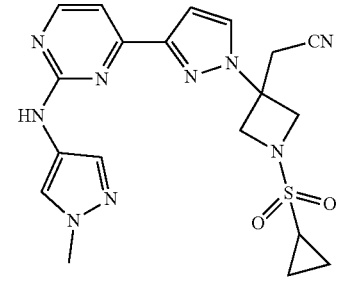 [SMILES: Cn1cc(Nc2nccc(-c3ccn(C4(CC#N)CN(S(=O)(=O)C5CC5)C4)n3)n2)cn1] | TDM-180915 | 440.2 | 1H NMR (400 MHz, DMSO) δ 9.53 (s, 1H), 8.46 (d, J = 5.0 Hz, 1H), 8.29 (d, J = 2.5 Hz, 1H), 7.97 (s, 1H), 7.52 (s, 1H), 7.22 (d, J = 5.0 Hz, 1H), 7.09 (s, 1H), 4.60 (d, J = 9.2 Hz, 2H), 4.29 (d, J = 9.3 Hz, 2H), 3.83 (s, 3H), 3.67 (s, 2H), 2.86 (dq, J = 7.7, 4.9 Hz, 1H), 1.12-0.90 (m, 4H). |
| 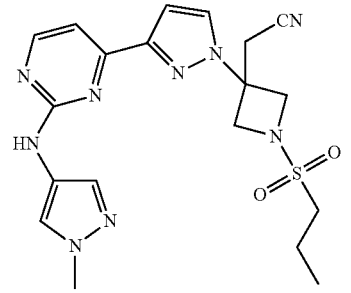 [SMILES: CCCS(=O)(=O)N1CC(CC#N)(n2ccc(-c3ccnc(Nc4cnn(C)c4)n3)n2)C1] | TDM-180916 | 421.1 | 1H NMR (400 MHz, DMSO) δ 9.53 (s, 1H), 8.46 (d, J = 5.0 Hz, 1H), 8.27 (d, J = 2.5 Hz, 1H), 7.98 (s, 1H), 7.52 (s, 1H), 7.22 (d, J = 5.1 Hz, 1H), 7.08 (s, 1H), 4.53 (d, J = 9.1 Hz, 2H), 4.25 (d, J = 9.2 Hz, 2H), 3.83 (s, 3H), 3.67 (s, 2H), 3.26-3.19 (m, 2H), 1.79-1.66 (m, 2H), 0.99 (t, J = 7.4 Hz, 3H). |
| 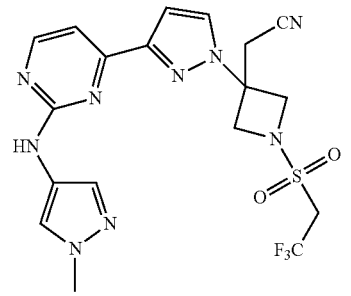 [SMILES: Cn1cc(Nc2nccc(-c3ccn(C4(CC#N)CN(S(=O)(=O)CC(F)(F)F)C4)n3)n2)cn1] | TDM-180918 | 482.2 | 1H NMR (400 MHz, DMSO) δ 9.53 (s, 1H), 8.46 (d, J = 4.9 Hz, 1H), 8.28 (s, 1H), 7.97 (s, 1H), 7.52 (s, 1H), 7.24 (d, J = 5.0 Hz, 1H), 7.09 (s, 1H), 4.84 (q, J = 10.0 Hz, 2H), 4.69 (d, J = 9.2 Hz, 2H), 4.42 (d, J = 9.2 Hz, 2H), 3.83 (s, 3H), 3.68 (s, 2H). |

-continued

| Structure Structural formula | TDM No. Registration number | LCMS [M + 1]+ | ¹H-NMR Hydrogen nuclear magnetic resonance spectrum |
|---|---|---|---|
| 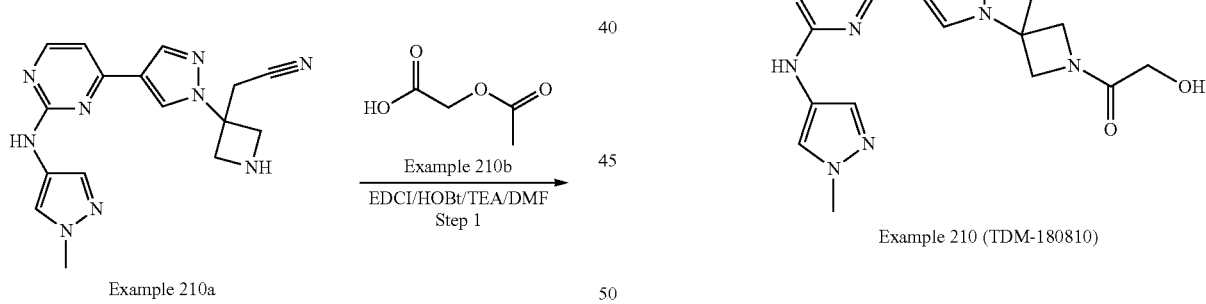 | TDM-180922 | 428.2 | ¹H NMR (400 MHz, DMSO-d6) δ 9.53 (s, 1H), 8.46 (d, J = 5.0 Hz, 1H), 8.27 (d, J = 2.4 Hz, 1H), 7.98 (s, 1H), 7.52 (s, 1H), 7.22 (d, J = 5.1 Hz, 1H), 7.08 (s, 1H), 4.53 (d, J = 9.1 Hz, 2H), 4.25 (d, J = 9.2 Hz, 2H), 3.83 (s, 3H), 3.67 (s, 2H), 3.25 (q, J = 7.3 Hz, 2H), 1.25 (t, J = 7.3 Hz, 3H). |

TDM-180727, which was compound 127, namely 3-(3-(cyanomethyl)-3-(4-(2-((1-methyl-1H-pyrazol-4-yl)amino)pyrimidin-4-yl)-1H-pyrazol-1-yl)azetidinpiperazin-1-yl)-3-oxypropionitrile, as a light yellow solid (5.6 mg, yield of 9%)

TDM-180752, which was compound 152, namely 2-(3-(4-(2-((1-methyl-1H-pyrazol-4-yl)amino)pyrimidin-4-yl)-1H-pyrazol-1-yl)-1-(3,3,3-trifluoropropionyl)azetidin-3-yl)acetonitrile, as a light yellow solid (2.1 mg, yield of 3.9%).

TDM-180753, which was compound 153, namely 2-(1-(cyclopropanecarbonyl)-3-(4-(2-((1-methyl-1H-pyrazol-4-yl)amino)pyrimidin-4-yl)-1H-pyrazol-1-yl)azetidin pyridin-3-yl)acetonitrile, as a light yellow solid (2.3 mg, yield of 4.3%).

TDM-180765, which was compound 165, namely 2-(1-(2-methoxy acetyl)-3-(4-(2-((1-methyl-1H-pyrazol-4-yl)amino)pyrimidin-4-yl)-1H-pyrazol-1-yl)azetidin-3-yl)acetonitrile, as a light yellow solid (2.4 mg, yield of 6.6%).

TDM-180925, which was compound 225, namely 2-(1-((3-chloropropyl)sulfonyl)-3-(4-(2-((1-methyl-1H-pyrazol-4-yl)amino)pyrimidin-4-yl)-1H-pyrazol-1-yl)azetidin-3-yl)acetonitrile, as a white solid (33.4 mg, yield of 53%).

TDM-180927, which was compound 327, namely Ethyl methyl-3-((3-(cyanomethyl)-3-(4-(2-((1-methyl-1H-pyrazol-4-yl)amino)pyrimidin-4-yl)-1H-pyrazol-1-yl)azetidineazetidin-1-yl)sulfonyl)propionate, as a light beige solid (25.4 mg, yield of 35.1%)

TDM-180928, which was compound 328, namely 2-(3-(4-(2-((1-methyl-1H-pyrazol-4-yl)amino)pyrimidin-4-yl)-1H-pyrazol-1-yl)-1-((2,2,2-trifluoroethyl)sulfonyl)azetidin-3-yl)acetonitrile, as a light beige solid (19.4 mg, yield of 33.9%)

TDM-180930, which was compound 330, namely methyl-2-oxo-((3-(cyanomethyl)-3-(4-(2-((1-methyl-1H-pyrazol-4-yl)amino)pyrimidin-4-yl)-1H-pyrazol-1-yl)azetidin-1-yl)sulfonyl)acetonitrile, as a light beige solid (20.8 mg, yield of 37.1%)

TDM-180931, which was compound 331, namely 2-(1-((cyclopropylmethyl)sulfonyl)-3-(4-(2-((1-methyl-1H-pyrazol-4-yl)amino)pyrimidin-4-yl)-1H-pyrazol-1-yl)azetidin-3-yl)acetonitrile, as a light beige solid (28.5 mg, yield of 52.8%)

TDM-180932, which was compound 342, namely 2-(1-(isopropylsulfonyl)-3-(4-(2-((1-methyl-1H-pyrazol-4-yl)amino)pyrimidin-4-yl)-1H-pyrazol-1-yl)azetidin-3-yl)acetonitrile, as a light beige solid (47.3 mg, yield of 89%)

TDM-180912, which was compound 312, namely 2-(3-(3-(2-((1-methyl-1H-pyrazol-4-yl)amino)pyrimidin-4-yl)-1H-pyrazol-1-yl)-1-((tetrahydro-2H-pyran-4-yl)sulfonyl)azetidin-3-yl)acetonitrile, as alight beige solid (26.8 mg, yield of 37.2%)

TDM-180915, which was compound 315, namely 2-(1-(cyclopropylsulfonyl)-3-(3-(2-((1-methyl-1H-pyrazol-4-yl)amino)pyrimidin-4-yl)-1H-pyrazol-1-yl)azetidinpyridin-3-yl)acetonitrile, as a light beige solid (35.4 mg, yield: 54%)

TDM-180916, which was compound 316, namely 2-(3-(3-(2-((1-methyl-1H-pyrazol-4-yl)amino)pyrimidin-4-yl)-1H-pyrazol-1-yl)-1-(propylsulfonyl) azacyclobutanpyridin-3-yl)acetonitrile, as a light beige solid (10.6 mg, yield of 20%).

TDM-180918, which was compound 318, namely 2-(3-(3-(2-((1-methyl-1H-pyrazol-4-yl)amino)pyrimidin-4-yl)-1H-pyrazol-1-yl)-1-((2,2,2-trifluoroethyl)sulfonyl)azetidin-3-yl)acetonitrile, as a light beige solid (3.0 mg, yield of 7%).

TDM-180922, which was compound 322, namely 2-(1-(ethylsulfonyl)-3-(3-(2-((1-methyl-1H-pyrazol-4-yl)amino)pyrimidin-4-yl)-1H-pyrazol-1-yl)azetidinpyridin-3-yl)acetonitrile, as a yellow solid (13.7 mg, yield of 17%)

Example 14. A reaction equation for synthesizing compound TDM-180810 was as follows:

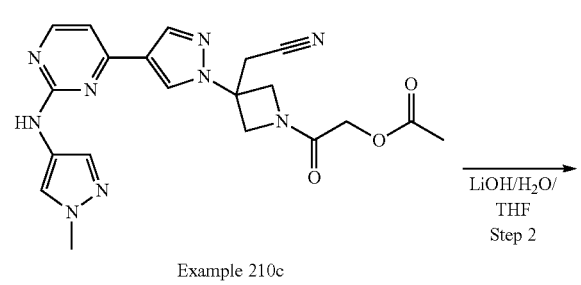

Step 1: Example 210c

Into a solution of the compound 210a (150 mg, 0.45 mmol) in N,N-dimethylformamide (15 mL) added were 2-(7-benzotriazole oxide)-N,N,N',N'-tetramethylurea hexafluorophosphate (255.1 mg, 0.67 mmol), triethylamine (67.8 mg, 0.67 mmol) and the compound 210b (79.2 mg, 0.67 mmol). The reaction solution was stirred at 35° C. for 17 hours. After the solvent was removed, the residue was purified by silica gel chromatography (ethyl acetate:petroleum ether=0-100%) to obtain compound 210c, namely 2-(3-(cyanomethyl)-3-(4-(2-((1-methyl-1H-pyrazol-4-yl)amino)pyrimidin-4-yl)-1H-pyrazol-1-yl)azetidin-1-yl)-2-oxoethyl ester, as a white solid (75.0 mg, yield of 38.3%). LCMS[M+1]+=436.1.

Step 2: Example 210 (TDM-180810)

Into a mixed solution of the compound 210c (100 mg, 0.23 mmol) in tetrahydrofuran (10 mL) and water (2 mL) added was LiOH·H$_2$O (11.8 mg, 0.28 mmol), and was stirred at room temperature for 1 hour. After the solvent was removed, the residue was purified by preparative HPLC to obtain compound 210, namely 2-(1-(2-hydroxyacetyl)-3-(4-(2-((1-methyl-1H-pyrazol-4-yl)amino)pyrimidin-4-yl)-1H-pyrazol-1-yl)azetidin-3-yl)acetonitrile, as a light yellow solid (36.0 mg, yield of 39.8). LCMS[M+1]$^+$=393.1.

$^1$H NMR (400 MHz, DMSO) δ 9.49 (s, 1H), 8.83 (s, 1H), 8.38 (d, J=5.2 Hz, 1H), 8.31 (s, 1H), 7.97 (s, 1H), 7.51 (s, 1H), 7.07 (d, J=5.2 Hz, 1H), 4.78 (d, J=10.1 Hz, 1H), 4.58 (d, J=10.0 Hz, 1H), 4.46 (d, J=10.4 Hz, 1H), 4.26 (d, J=10.4 Hz, 1H), 4.00 (s, 2H), 3.83 (s, 3H), 3.67 (s, 2H).

Example 15. A reaction equation for synthesizing compound TDM-180728 was as follows:

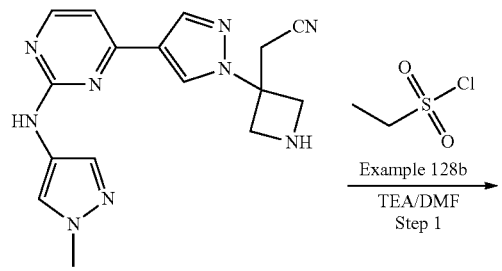

Example 128a → Example 128b TEA/DMF Step 1

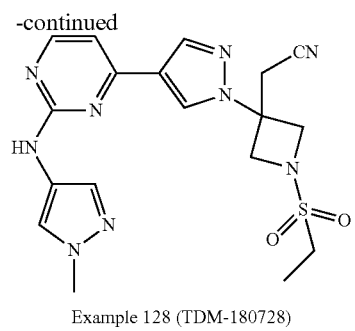

Example 128 (TDM-180728)

Step 1: Example 128 (TDM-180728)

Into a solution of the compound 128a (50 mg, 0.15 mmol) in N,N-dimethylformamide (10 mL) added was triethylamine (60 mg, 0.60 mmol), and stirred at room temperature for 5 minutes. The mixture was added with compound 128b, namely ethylsulfonyl chloride (20 mg, 0.22 mmol), then stirred at room temperature for 2 hours, diluted with water and extracted with ethyl acetate (50 mL×3). The combined organic layers were washed with water (3×50 mL) and saline (3×50 mL), the organic layers were separated, dried over anhydrous sodium sulfate and concentrated under reduced pressure, and the residue was purified by flash column chromatography (ethyl acetate/methanol=20/1) to obtain compound 128, TDM-180728, namely 2-(1-(ethylsulfonyl)-3-(4-(2-((1-methyl-1H-pyrazol-4-yl) amino)pyrimidin-4-yl)-1H-pyrazol-1-yl)azetidinpyridin-3-yl)acetonitrile, as a light yellow solid (128, 9.5 mg, yield of 15%). LCMS [M+1]$^+$=428.2.

$^1$H NMR (400 MHz, MeOD) δ 8.65 (s, 1H), 8.34 (d, J=5.2 Hz, 1H), 8.26 (s, 1H), 8.01 (s, 1H), 7.59 (s, 1H), 7.02 (d, J=5.2 Hz, 1H), 4.62 (d, J=9.2 Hz, 2H), 4.28 (d, J=9.2 Hz, 2H), 3.91 (s, 3H), 3.59 (s, 2H), 3.18 (dd, J=14.8, 7.4 Hz, 2H), 1.39 (d, J=7.4 Hz, 3H).

Compounds prepared by similar methods were as follows:

| Structure Structural formula | TDM No. Registration number | LCMS [M + 1]$^+$ | $^1$H-NMR Hydrogen nuclear magnetic resonance spectrum |
|---|---|---|---|
| | TDM-180766 | 440.2 | $^1$H NMR (400 MHz, DMSO) δ 9.41 (s, 1H), 8.82 (s, 1H), 8.39 (d, J = 5.1 Hz, 1H), 8.30 (d, J = 10.5 Hz, 1H), 7.97 (s, 1H), 7.50 (s, 1H), 7.04 (d, J = 5.1 Hz, 1H), 4.57 (d, J = 9.2 Hz, 2H), 4.29 (d, J = 9.3 Hz, 2H), 3.83 (s, 3H), 3.67 (s, 2H), 2.84 (ddd, J = 12.6, 7.8, 4.9 Hz, 1H), 1.09-0.90 (m, 4H). |
| | TDM-180794 | 442.2 | $^1$H NMR (400 MHz, DMSO) δ 9.41 (s, 1H), 8.81 (s, 1H), 8.39 (d, J = 5.1 Hz, 1H), 8.31 (s, 1H), 7.97 (s, 1H), 7.50 (s, 1H), 7.04 (d, J = 5.1 Hz, 1H), 4.51 (d, J = 9.0 Hz, 2H), 4.24 (d, J = 9.1 Hz, 2H), 3.83 (s, 3H), 3.66 (s, 2H), 3.26-3.18 (m, 2H), 1.73 (dd, J = 15.1, 7.5 Hz, 2H), 1.00 (t, J = 7.4 Hz, 3H) |

-continued

| Structure Structural formula | TDM No. Registration number | LCMS [M + 1]+ | ¹H-NMR Hydrogen nuclear magnetic resonance spectrum |
|---|---|---|---|
| | TDM-180800 | 440.1 | ¹H NMR (400 MHz, DMSO) δ 9.41 (s, 1H), 8.80 (s, 1H), 8.44-8.26 (m, 2H), 7.97 (s, 1H), 7.50 (s, 1H), 7.04 (d, J = 5.1 Hz, 1H), 5.84 (ddt, J = 17.2, 10.1, 7.2 Hz, 1H), 5.53-5.32 (m, 2H), 4.57 (d, J = 9.1 Hz, 2H), 4.28 (d, J = 9.2 Hz, 2H), 4.10 (d, J = 7.2 Hz, 2H), 3.83 (s, 3H), 3.66 (s, 2H) |
| | TDM-180807 | 456.2 | ¹H NMR (400 MHz, DMSO) δ 9.41 (s, 1H), 8.81 (s, 1H), 8.48-8.23 (m, 2H), 7.97 (s, 1H), 7.50 (s, 1H), 7.04 (d, J = 5.1 Hz, 1H), 4.51 (d, J = 9.0 Hz, 2H), 4.24 (d, J = 9.1 Hz, 2H), 3.83 (s, 3H), 3.66 (s, 2H), 3.28-3.16 (m, 2H), 1.67 (t, J = 7.7 Hz, 2H), 1.40 (dd, J = 14.9, 7.4 Hz, 2H), 0.90 (t, J = 7.4 Hz, 3H). |
| | TDM-180798 | 460.2 | ¹H NMR (400 MHz, DMSO) δ 9.49 (s, 1H), 8.83 (s, 1H), 8.39 (d, J = 5.2 Hz, 1H), 8.33 (s, 1H), 7.98 (s, 1H), 7.51 (s, 1H), 7.06 (d, J = 5.2 Hz, 1H), 4.55 (ddd, J = 21.1, 11.9, 5.9 Hz, 4H), 4.27 (d, J = 9.2 Hz, 2H), 3.83 (s, 3H), 3.68 (s, 2H), 3.40-3.29 (m, 2H), 2.18-1.98 (m, 2H). |
| | TDM-180808 | 496.1 | ¹H NMR (400 MHz, DMSO) δ 9.41 (s, 1H), 8.80 (s, 1H), 8.47-8.24 (m, 2H), 7.97 (s, 1H), 7.50 (s, 1H), 7.04 (d, J = 5.1 Hz, 1H), 4.59 (d, J = 8.9 Hz, 2H), 4.31 (d, J = 9.1 Hz, 2H), 3.83 (s, 3H), 3.69 (s, 2H), 3.62-3.52 (m, 2H), 2.86-2.70 (m, 2H). |
| | TDM-180796 | 472.2 | ¹H NMR (400 MHz, DMSO) δ 9.41 (s, 1H), 8.80 (s, 1H), 8.39 (d, J = 5.1 Hz, 1H), 8.31 (s, 1H), 7.97 (s, 1H), 7.50 (s, 1H), 7.04 (d, J = 5.1 Hz, 1H), 4.55 (d, J = 9.0 Hz, 2H), 4.26 (d, J = 9.0 Hz, 2H), 3.83 (s, 3H), 3.72 (t, J = 5.9 Hz, 2H), 3.64 (s, 2H), 3.56 (t, J = 5.9 Hz, 2H), 3.45 (q, J = 7.0 Hz, 2H), 1.07 (t, J = 7.0 Hz, 3H). |

| Structure Structural formula | TDM No. Registration number | LCMS [M + 1]⁺ | ¹H-NMR Hydrogen nuclear magnetic resonance spectrum |
|---|---|---|---|
| (structure) | TDM-180797 | 484.2 | ¹H NMR (400 MHz, DMSO) δ 9.48 (s, 1H), 8.82 (s, 1H), 8.39 (d, J = 5.2 Hz, 1H), 8.32 (s, 1H), 7.98 (s, 1H), 7.51 (s, 1H), 7.06 (d, J = 5.2 Hz, 1H), 4.53 (d, J = 8.9 Hz, 2H), 4.22 (d, J = 9.0 Hz, 2H), 3.93 (dd, J = 11.2, 3.7 Hz, 2H), 3.83 (s, 3H), 3.68 (s, 2H), 3.48 (ddd, J = 15.7, 7.8, 3.7 Hz, 1H), 3.33 (dd, J = 11.7, 10.1 Hz, 2H), 1.96-1.87 (m, 2H), 1.65 (qd, J = 12.3, 4.7 Hz, 2H). |
| (structure) | TDM-180795 | 490.2 | ¹H NMR (400 MHz, DMSO) δ 9.41 (s, 1H), 8.77 (s, 1H), 8.39 (d, J = 5.0 Hz, 1H), 8.32 (s, 1H), 7.97 (s, 1H), 7.50 (s, 1H), 7.42 (s, 2H), 7.36 (d, J = 3.0 Hz, 3H), 7.04 (d, J = 5.0 Hz, 1H), 4.63 (s, 2H), 4.49 (d, J = 9.0 Hz, 2H), 4.20 (d, J = 9.1 Hz, 2H), 3.82 (s, 3H), 3.63 (s, 2H). |
| (structure) | TDM-180801 | 504.1 | ¹H NMR (400 MHz, DMSO) δ 9.41 (s, 1H), 8.80 (s, 1H), 8.47-8.19 (m, 2H), 7.97 (s, 1H), 7.49 (d, J = 5.2 Hz, 1H), 7.32-7.20 (m, 5H), 7.04 (d, J = 5.1 Hz, 1H), 4.54 (d, J = 9.1 Hz, 2H), 4.26 (d, J = 9.1 Hz, 2H), 3.82 (s, 3H), 3.63 (s, 2H), 3.60-3.52 (m, 2H), 3.08-2.96 (m, 2H). |

TDM-180766, which was compound 166, namely 2-(1-(cyclopropylsulfonyl)-3-(4-(2-((1-methyl-1H-pyrazol-4-yl)amino)pyrimidin-4-yl)-1H-pyrazol-1-yl)azetidinpyridin-3-yl)acetonitrile, as a light yellow solid (2.3 mg, yield of 5.8%)

TDM-180794, which was compound 194, namely 2-(3-(4-(2-((1-methyl-1H-pyrazol-4-yl)amino)pyrimidin-4-yl)-1H-pyrazol-1-yl)-1-(propylsulfonyl)azacyclobutanpyridin-3-yl)acetonitrile, as a white solid (16.7 mg, yield of 25.2%)

TDM-180800, which was compound 200, namely 2-(1-(allylsulfonyl)-3-(4-(2-((1-methyl-1H-pyrazol-4-yl)amino)pyrimidin-4-yl)-1H-pyrazol-1-yl)azetidin-3-yl)acetonitrile, as a white solid (12.8 mg, yield of 19.5%)

TDM-180807, namely 2-(1-(butylsulfonyl)-3-(4-(2-((1-methyl-1H-pyrazol-4-yl)amino)pyrimidin-4-yl)-1H-pyrazol-1-yl)azetidin-3-yl)acetonitrile, as a yellow solid (8.6 mg, yield of 12.7%).

TDM-180798, which was compound 198, namely 2-(3-(4-(2-((1-methyl-1H-pyrazol-4-yl)amino)pyrimidin-4-yl)-1H-pyrazol-1-yl)-1-((tetrahydro-2H-pyran-4-yl)sulfonyl)azetidin-3-yl)acetonitrile, as a yellow solid (26.4 mg, yield of 38.3%).

TDM-180808, namely 2-(3-(4-(2-((1-methyl-1H-pyrazol-4-yl)amino)pyrimidin-4-yl)-1H-pyrazol-1-yl)-1-((3,3,3-trifluoropropyl)sulfonyl)azetidin-3-yl)acetonitrile, as a white solid (9.5 mg, yield of 12.8%)

TDM-180796, which was compound 196, namely 2-(1-((2-ethoxyethyl)sulfonyl)-3-(4-(2-((1-methyl-1H-pyrazol-4-yl)amino)pyrimidin-4-yl)-1H-pyrazol-1-yl)acetonitrile, as a white solid (13.3 mg, yield of 18.8%).

TDM-180797, which was compound 197, namely 2-(3-(4-(2-((1-methyl-1H-pyrazol-4-yl)amino)pyrimidin-4-yl)-1H-pyrazol-1-yl)-1-((tetrahydro-2H-pyran-4-yl)sulfonyl)azetidin-3-yl)acetonitrile, as a white solid (24.4 mg, yield of 33.6%).

TDM-180795, which was compound 195, namely 2-(1-(benzylsulfonyl)-3-(4-(2-((1-methyl-1H-pyrazol-4-yl)amino)pyrimidin-4-yl)-1H-pyrazol-1-yl)azetidinpyridin-3-yl)acetonitrile, as a white solid (11.8 mg, yield of 16.1%).

TDM-180801, namely 2-(3-(4-(2-(1-methyl-1H-pyrazol-4-yl)amino)pyrimidin-4-yl)-1H-pyrazol-1-yl)-1-(phenethylsulfonyl)azetidin-3-yl)acetonitrile, as a white solid (13 mg, yield of 17.3%).

Example 16. A reaction equation for synthesizing compound TDM-180772 was as follows:

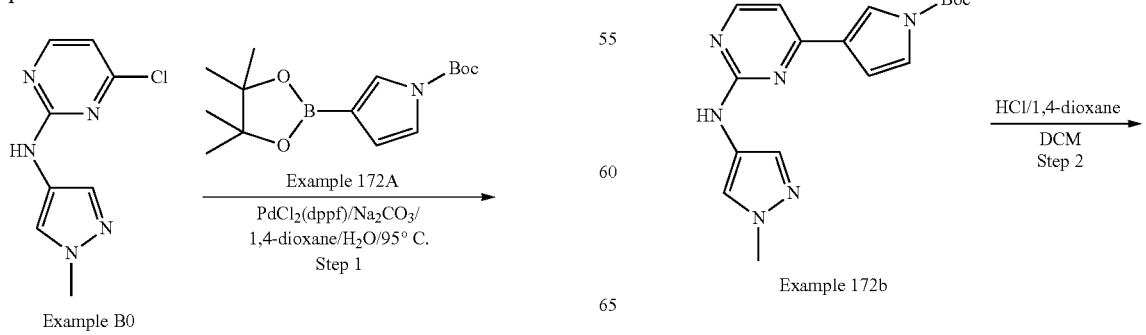

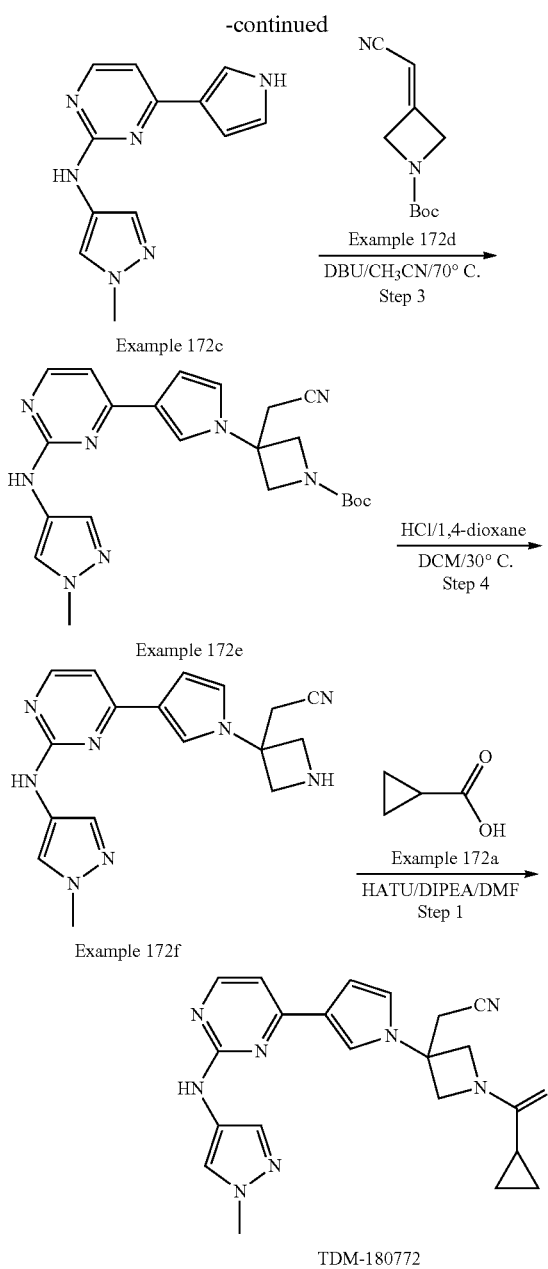

(200 mg, yield>43%) as a light yellow solid [Note: a mixture of the product and a de-Boc product was also obtained (100 mg)].
LCMS [M+1]$^+$=372.1.

Step 2: Example 172c

N-(1-methyl-1H-pyrazol-4-yl)-4-(1H-pyrrol-3-yl)pyrimidin-2-amine

Into a solution of the compound 172b (480 mg, 1.41 mmol) in DCM (20 mL) added was HCl/1,4-dioxane (6 mL, 4 M). The reactants were stirred at 35° C. for 16 hours. After completion of the reaction, the product was concentrated under reduced pressure, pulped with DCM, and filtered to collect the solid, and the solid was vacuum-dried. compound 172c (400 mg, HCl salt) was obtained as a gray solid.
LCMS [M+1]$^+$=241.1.

Step 3: Example 172d 3-(cyanomethyl)-3-(3-(2-((1-methyl-1H-pyrazol-4-yl)amino)pyrimidin-4-yl)-1H-pyrrol-1-yl)azetidin-3-pyridin-1-carboxy c acid into the compound 172c (490 mg, 2.0 mmol) added was the compound 172d (776 mg, 4.0 mmol), DBU (1368 mg, 9.0 mmol) and CH$_3$CN (40 mL). The mixture was heated to 70° C., and stirred for 16 hours. After completion of the reaction, the mixture was concentrated to remove CH$_3$CN, then added with DCM (80 mL), washed with saturated NH4Cl (30 mL×3), washed with saline (30 mL×1), dried over Na2SO4, filtered and concentrated. The crude product was combined with another batch of crude products, and purified by column chromatography (petroleum ether/ethyl acetate=0/100%, 5% MeOH/DCM/EtOAc (with the ratio: 1:1)) to obtain compound 172c (800 mg, yield of 80%) as a light green solid.
LCMS [M+1]$^+$=435.3.

Step 4: Example 172f 2-(3-(3-(2-((1-methyl-1H-pyrazol-4-yl)amino)pyrimidin-4-yl)-1H-pyrrol-1-yl)azetidin-3-yl)acetonitrile Into a solution of the compound 172e (200 mg, 0.46 mmol) in DCM (10 mL) added was HCl/1,4-dioxane (4 mL, 4 M). The mixture was stirred at 35° C. for 2 hours. The reaction mixture was concentrated under reduced pressure to obtain compound 172f (180 mg crude product, HCl salt) as a light green solid. It was directly used for the next step.
LCMS [M+1]$^+$=335.1.

Step 5: Example 172 (TDM-180772)

2-(1-(cyclopropanecarbonyl)-3-(3-(2-((1-methyl-1H-pyrazol-4-yl)amino)pyrimidin-4-yl)-1H-pyrrol-1-yl)azetidinpyridin-3-yl)acetonitrile Into a solution of the compound 172f (80 mg, 0.24 mmol) in DIPEA (155 mg, 1.2 mmol) and DMF (8 mL) added were HATU (137 mg, 0.36 mmol) and the compound 172a (32 mg, 0.36 mmol). The reactants were stirred at room temperature for 3 hours. After the reaction was finished, the mixture was poured into H2O, and extracted with EtOAc (30 mL×3). The combined organic layers were washed with H2O and saline, dried over Na2SO4, filtered, concentrated and purified by column chromatography (DCM/MeOH=10/1). Compound 172 (48.1 mg; Yield<50%) was obtained as a white solid.

Step 1: Example 172b

Tert-butyl 3-2-((1-methyl-1H-pyrazol-4-yl)amino)pyrimidin-4-yl)-1H-pyrrol-1-carboxylate into the compound B0 (300 mg, 1.44 mmol) added were the compound 172a (425 mg, 1.45 mmol), PdCl2(dppf) (105 mg, 0.14 mmol), Na2CO3 (458 mg, 4.32 mmol), 1,4-dioxane (25 mL) and H2O (5 mL). The reaction system was subjected to pumping and replacement with nitrogen by a water pump for three times. The mixture was heated to 95° C. and stirred for 4 hours. After the reaction was finished, the product was concentrated and purified by column chromatography (petroleum ether/ethyl acetate=0/100, solution of 5% methanol in ethyl acetate) to obtain compound 172b

LCMS [M+1]⁺=403.

¹H NMR (400 MHz, CDCL3) δ 8.34 (d, J=5.2 Hz, 1H), 7.85 (s, 1H), 7.54 (s, 1H), 7.48 (t, J=2.0 Hz, 1H), 7.00 (s, 1H), 6.77-6.86 (m, 3H), 4.71-4.85 (m, 1H), 4.46-4.68 (m, 2H), 4.27-4.40 (m, 1H), 3.92 (s, 3H), 3.15 (d, J=4.0 Hz, 2H), 1.40-1.50 (m, 1H), 0.98-1.13 (m, 2H), 0.82-0.92 (m, 2H).

Compounds prepared by similar methods were as follows:

| Structure Structural formula | TDM No. Registration number | LCMS [M + 1]⁺ | ¹H-NMR Hydrogen nuclear magnetic resonance spectrum |
|---|---|---|---|
| | TDM-180776 | 439.2 | ¹H NMR (400 MHz, DMSO-d₆) δ 9.54 (s, 1H), 8.28 (d, J = 5.5 Hz, 1H), 7.95 (s, 2H), 7.54 (s, 1H), 7.19 (d, J = 2.4 Hz, 1H), 7.04 (t, J = 6.1 Hz, 1H), 6.84 (s, 1H), 4.84 (d, J = 9.5 Hz, 1H), 4.72 (dd, J = 23.4, 9.6 Hz, 2H), 4.58 (d, J = 9.7 Hz, 1H), 4.43 (dd, J = 10.6, 5.3 Hz, 1H), 4.32-4.25 (m, 1H), 3.83 (s, 3H), 3.60 (s, 2H), 2.78 (dt,J =18.9, 10.1 Hz, 1H), 1.93 (dd, J = 17.8, 8.3 Hz, 2H). |
| | TDM-180775 | 402.2 | ¹H NMR (400 MHz, DMSO-d₆) δ 9.61 (s, 1H), 8.28 (d, J = 5.6 Hz, 1H), 7.94 (d, J = 7.7 Hz, 2H), 7.54 (s, 1H), 7.21-7.15 (m, 1H), 7.05 (d, J = 5.6 Hz, 1H), 6.84 (s, 1H), 4.66 (d, J = 9.6 Hz, 1H), 4.51 (d, J = 9.6 Hz, 1H), 4.43 (d, J = 10.7 Hz, 1H), 4.27 (d, J = 10.6 Hz, 1H), 3.90-3.78 (m, 5H), 3.58 (s, 2H). |
| | TDM-180778 | 445.1 | ¹H NMR (400 MHz, DMSO-d₆) δ 9.59 (s, 1H), 8.28 (d, J = 5.6 Hz, 1H), 7.94 (d, J = 11.0 Hz, 2H), 7.54 (s, 1H), 7.20-7.15 (m, 1H), 7.04 (d, J = 5.6 Hz, 1H), 6.84 (s, 1H), 4.69 (d, J = 9.7 Hz, 1H), 4.54 (d, J = 9.6 Hz, 1H), 4.43 (d, J = 10.7 Hz, 1H), 4.27 (d, J = 10.7 Hz, 1H), 3.83 (s, 3H), 3.58 (s, 2H), 3.46 (q, J = 11.2 Hz, 2H). |
| | TDM-180769 | 407.2 | ¹H NMR (400 MHz, CDCl₃) δ 8.29 (s, 1H), 7.81 (s, 1H), 7.55 (d, J = 15.9 Hz, 2H), 6.84-6.77 (m, 3H), 4.82 (d, J = 10.7 Hz, 1H), 4.69 (d, J = 9.8 Hz, 1H), 4.55 (d, J = 10.8 Hz, 1H), 4.38 (d, J = 10.6 Hz, 1H), 4.08 (d, J = 3.0 Hz, 2H), 3.90 (s, 3H), 3.41 (s, 3H), 3.12 (s, 2H). |

TDM-180776, which was compound 176, namely 2-(1-(2,2-difluorocyclo-1-carbonyl)-3-(3-(2-((1-methyl-1H-pyrazol-4-yl)amino)pyrimidin-4-yl)-1H-pyrrol-1-yl)azetidin-3-yl)acetonitrile, as a yellow solid (19.5 mg, yield of 14.8%)

TDM-180775, which was compound 175, namely 3-(3-(cyanomethyl)-3-(3-(2-((1-methyl-1H-pyrazol-4-yl)amino)pyrimidin-4-yl)-1H-pyrrol-1-yl) azetidinpiperazin-1-yl)-3-oxypropionitrile, as a yellow solid (13.3 mg, yield of 15.9%)

TDM-180778, which was compound 178, namely 2-(3-(3-(2-((1-methyl-1H-pyrazol-4-yl)amino)pyrimidin-4-yl)-1H-pyrrol-1-yl)-1-(3,3,3-trifluoropropanyl)azetidin-3-yl)acetonitrile, as a yellow solid (40 mg, yield of 30%)

TDM-180769, which was compound 169, namely 2-(1-(2-methoxyacetyl)-3-(3-(2-((1-methyl-1H-pyrazol-4-yl)amino)pyrimidin-4-yl)-1H-pyrrol-1-yl) azetidin-3-yl)acetonitrile, as a light yellow solid (10.4 mg, yield of 12.2%)

Example 18. A reaction equation for synthesizing compound TDM-180786 was as follows:

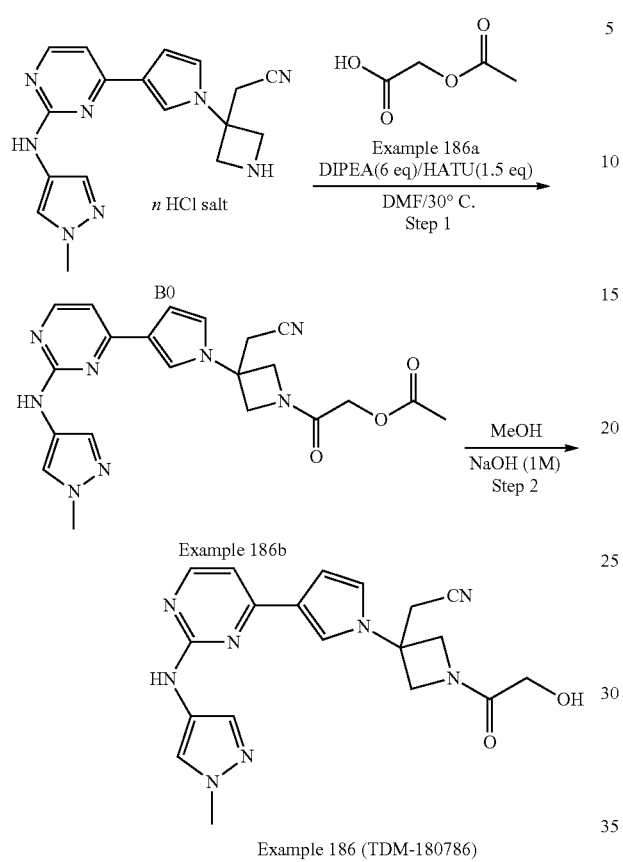

Example 186 (TDM-180786)

Step 1: Example 186b 2-(3-(cyanomethyl)-3-(3-(2-((1-methyl-1H-pyrazol-4-yl)amino)pyrimidin-4-yl)-1H-pyrrol-1-yl)azetidin-1-yl)-2-oxoethyl ester Into a mixture of DIPEA (139 mg, 1.08 mmol), DMF (6 mL) and B0 (60 mg, 0.18 mmol) added were HATU (102 mg, 0.27 mmol) and the compound 186a (42 mg, 0.36 mmol). The reaction was stirred at room temperature for 3 hours. The reaction was poured into H$_2$O and extracted with EtOAc (30 mL×3), the combined organic layers were washed with H$_2$O and saline, dried over Na$_2$SO$_4$, filtered, concentrated and purified by column chromatography (DCM/MeOH=10/1) to obtain compound 186b as colorless oil (30 mg; yield of 38%). LCMS [M+1]$^+$=435.2.

Step 2: Example 186 (TDM-180786)

2-(1-(2-hydroxyacetyl)-3-(3-(2-(1-methyl-1H-pyrazol-4-yl)amino)pyrimidin-4-yl)-1H-pyrrol-1-yl)azetidin-3-yl)acetonitrile Into a solution of the compound 186b (30 mg, 0.07 mmol) in MeOH (5 mL) added was NaOH (1 mL, 1M). The reaction was stirred at room temperature for 2.5 hours. The reaction mixture was concentrated and extracted with EtOAc (20 mL×3), and the organic layers were combined, dried over Na$_2$SO$_4$, filtered, concentrated, purified by acidic (TFA) preparation, and lyophilized. Compound 186 (5.8 mg, yield of 21%) was obtained as a light green solid.

LCMS [M+1]$^+$=393.1

$^1$H NMR (400 MHz, DMSO-d$_6$) δ 9.52 (s, 1H), 8.28 (d, J=5.2 Hz, 1H), 7.90-7.98 (m, 2H), 7.54 (s, 1H), 7.15-7.19 (m, 1H), 7.04 (d, J=5.2 Hz, 1H), 6.81-6.89 (m, 1H), 4.67-4.73 (m, 1H), 4.53-4.61 (m, 1H), 4.35-4.42 (m, 1H), 4.21-4.29 (m, 1H), 4.00 (s, 2H), 3.84 (s, 3H), 3.56 (s, 2H).

Example 19. A reaction equation for synthesizing compound TDM-180771 was as follows:

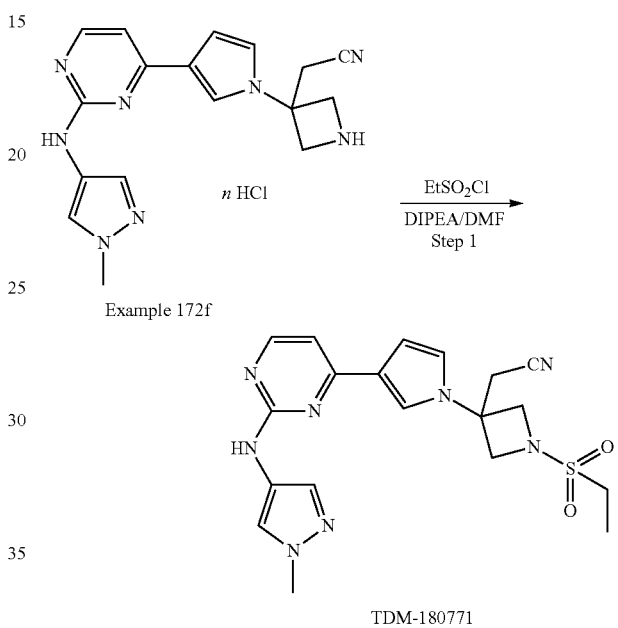

TDM-180771

Step 1: Example 171 (TDM-180771)

2-(1-(ethylsulfonyl)-3-(3-(2-((1-methyl-1H-pyrazol-4-yl)amino)pyrimidin-4-yl)-1H-pyrrol-1-yl)azetidinpyridin-3-yl)acetonitrile Into a solution of the compound 172f (80 mg, 0.24 mmol) and DIPEA (155 mg, 1.2 mmol) in DMF (8 mL added was EtSO2Cl (61 mg, 0.48 mmol) under cooling. The reaction mixture was stirred at room temperature for 2 hours. After the reaction was finished, the mixture was poured into H2O, neutralized with saturated NaHCO3, and extracted with EtOAc (25 mL×3), and the combined organic layers were washed with H2O and saline, dried over Na2SO4, filtered, concentrated, purified by column chromatography (DCM/MeOH=10/1), and lyophilized by preparation under alkaline conditions. compound 171 (9 mg; yield<10%) was obtained as a white solid.

LCMS [M+1]$^+$=427.

$^1$H NMR (400 MHz, CDCL3) δ 8.34 (d, J=5.2 Hz, 1H), 7.85 (s, 1H), 7.55 (s, 1H), 7.46 (t, J=2.0 Hz, 1H), 7.00 (s, 1H), 6.83 (d, J=5.2 Hz, 1H), 6.77-6.81 (m, 2H), 4.56 (d, J=9.2 Hz, 2H), 4.18 (d, J=9.2 Hz, 2H), 3.92 (s, 3H), 3.21 (s, 2H), 3.09 (q, J=7.6 Hz, 2H), 1.43 (t, J=7.6 Hz, 3H).

Compounds prepared by similar methods were as follows:

| Structure Structural formula | TDM No. Registration number | LCMS [M + 1]⁺ | ¹H-NMR Hydrogen nuclear magnetic resonance spectrum |
|---|---|---|---|
| | TDM-180770 | 439.2 | ¹H NMR (400 MHz, CDCl$_3$) δ 8.30 (d, J = 5.2 Hz, 1H), 7.81 (s, 1H), 7.56 (d, J = 7.9 Hz, 2H), 6.85-6.74 (m, 3H), 4.48 (d, J = 9.0 Hz, 2H), 4.18 (d, J = 9.1 Hz, 2H), 3.90 (s, 3H), 3.23 (s, 2H), 2.41 (tt, J = 7.9, 4.8 Hz, 1H), 1.25-1.05 (m, 4H). |
| | TDM-180785 | 441.1 | 1H NMR (400 MHz, DMSO-d$_6$) δ 9.26 (s, 1H), 8.29 (d, J = 5.2 Hz, 1H), 7.94 (s, 1H), 7.84 (s, 1H), 7.51 (s, 1H), 7.15 (t, J = 6.4 Hz, 1H), 6.96 (d, J = 5.2 Hz, 1H), 6.78-6.82 (m, 1H), 4.39 (d, J = 9.2 Hz, 2H), 4.21 (d, J = 9.2 Hz, 2H), 3.82 (s, 3H), 3.58 (s, 2H), 3.16-3.25 (m, 2H), 1.66-1.73 (m, 2H), 0.99 (t, J = 7.2 Hz, 3H). |
| | TDM-180854 | 459.2 | ¹H NMR (400 MHz, DMSO-d6) δ 9.56 (s, 1H), 8.29 (d, J = 5.6 Hz, 1H), 7.94 (d, J = 11.8 Hz, 2H), 7.54 (s, 1H), 7.20-7.13 (m, 1H), 7.04 (d, J = 5.6 Hz, 1H), 6.84 (s, 1H), 4.60 (t, J = 5.9 Hz, 1H), 4.48 (t, J = 5.9 Hz, 1H), 4.42 (d, J = 9.1 Hz, 2H), 4.24 (d, J = 9.1 Hz, 2H), 3.83 (s, 3H), 3.57 (s, 2H), 3.37-3.30 (m, 2H), 2.17-2.00 (m, 2H). |
| | TDM-180866 | 481.1 | ¹H NMR (400 MHz, DMSO) δ 8.29 (d, J = 5.5 Hz, 1H), 7.95 (s, 1H), 7.90 (s, 1H), 7.53 (s, 1H), 7.18 (d, J = 2.3 Hz, 1H), 7.01 (d, J = 5.3 Hz, 1H), 6.84 (s, 1H), 4.86-4.78 (m, 2H), 4.57 (d, J = 9.1 Hz, 2H), 4.38 (d, J = 9.1 Hz, 2H), 3.83 (s, 3H), 3.57 (s, 2H). |

-continued

| Structure Structural formula | TDM No. Registration number | LCMS [M + 1]+ | 1H-NMR Hydrogen nuclear magnetic resonance spectrum |
|---|---|---|---|
| 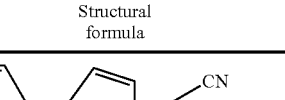 | TDM-180855 | 483.2 | 1H NMR (400 MHz, DMSO-$d_6$) δ 9.55 (s, 1H), 8.28 (d, J = 5.5 Hz, 1H), 7.93 (d, J = 16.6 Hz, 2H), 7.54 (s, 1H), 7.16 (t, J = 2.5 Hz, 1H), 7.03 (d, J = 5.4 Hz, 1H), 6.84 (s, 1H), 4.40 (d, J = 9.0 Hz, 2H), 4.21 (d, J = 9.0 Hz, 2H), 3.93 (dd, J = 11.4, 3.7 Hz, 2H), 3.83 (s, 3H), 3.57 (s, 2H), 3.47 (tt, J = 12.0, 3.7 Hz, 1H), 3.33 (dd, J = 11.7, 10.1 Hz, 2H), 1.90 (d, J = 10.4 Hz, 2H), 1.64 (qd, J =12.3, 4.6 Hz, 2H). |

TDM-180770, which was compound 170, namely 2-(1-(cyclopropylsulfonyl)-3-(3-(2-((1-methyl-1H-pyrazol-4-yl)amino)pyrimidin-4-yl)-1H-pyrrol-1-yl)azetidinpyridin-3-yl)acetonitrile, as a light yellow solid (23.3 mg, yield of 25.4%)

TDM-180785, which was compound 785, namely 2-(3-(3-(2-((1-methyl-1H-pyrazol-4-yl)amino)pyrimidin-4-yl)-1H-pyrrol-1-yl)-1-(propylsulfonyl)azetidinpyridin-3-yl)acetonitrile, as a off-white solid (49.9 mg, yield of 57%).

TDM-180854, which was compound 254, TDM-180854, namely 2-(1-((3-fluoropropyl)sulfonyl)-3-(3-(2-((1-methyl-1H-pyrazol-4-yl)amino)pyrimidin-4-yl)-1H-pyrrol-1-yl)azetidin-3-yl)acetonitrile, as ayellow solid (52.6 mg, yield of 38.4%).

TDM-180866, which was compound 266, namely 2-(3-(3-(2-((1-methyl-1H-pyrazol-4-yl)amino)pyrimidin-4-yl)-1H-pyrrol-1-yl)-1-((2,2,2-trifluoroethyl)sulfonyl)azetidin-3-yl)acetonitrile, as a yellow solid (9.3 mg, yield of 9.7%).

TDM-180855, which was compound 255, namely 2-(3-(3-(2-((1-methyl-1H-pyrazol-4-yl)amino)pyrimidin-4-yl)-1H-pyrrol-1-yl)-1-((tetrahydro-2H-pyran-4-yl)sulfonyl)azetidin-3-yl)acetonitrile, as a yellow solid (62.6 mg, yield of 43%).

Example 20. A reaction equation for synthesizing compound TDM-180858 was as follows:

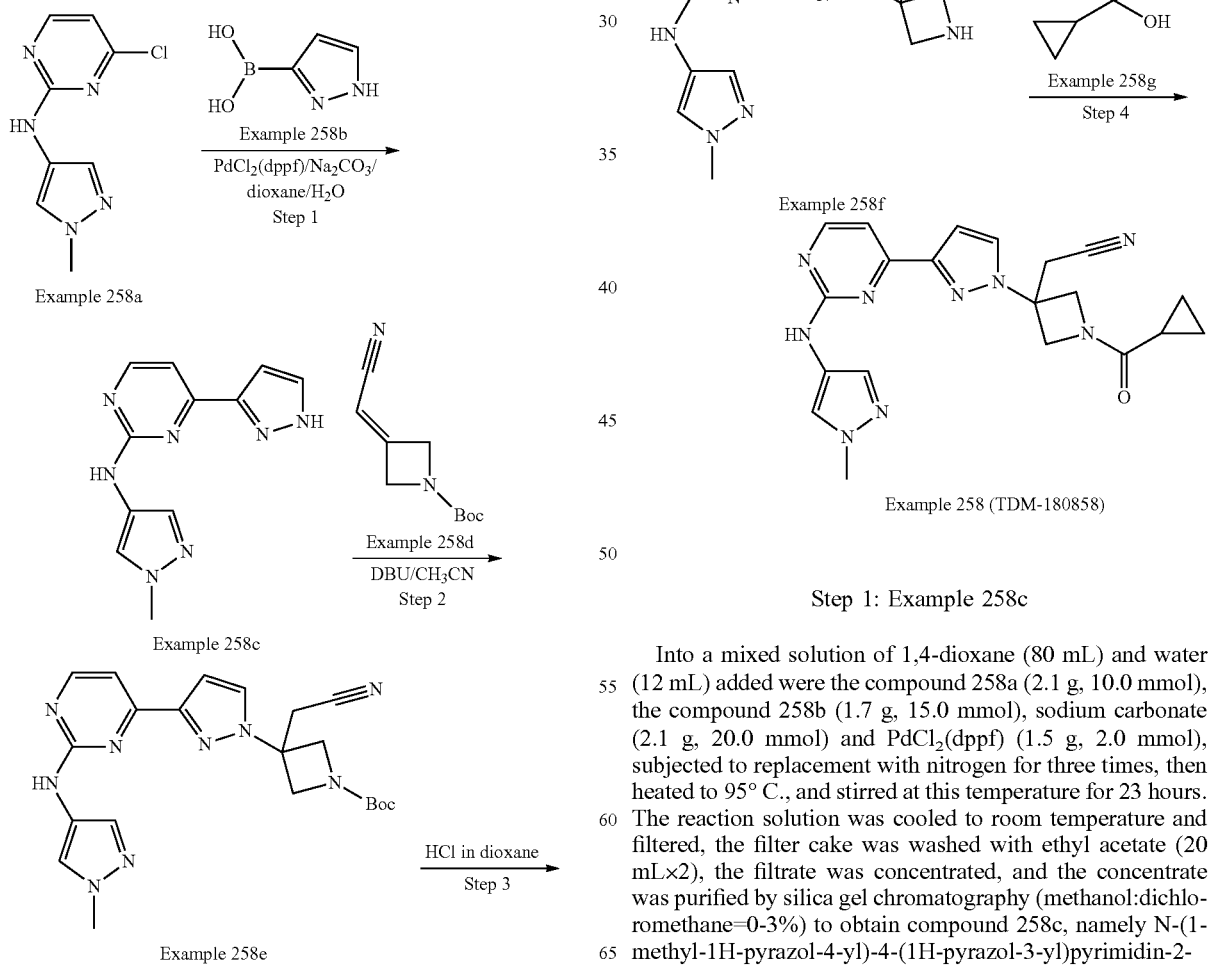

Step 1: Example 258c

Into a mixed solution of 1,4-dioxane (80 mL) and water (12 mL) added were the compound 258a (2.1 g, 10.0 mmol), the compound 258b (1.7 g, 15.0 mmol), sodium carbonate (2.1 g, 20.0 mmol) and PdCl$_2$(dppf) (1.5 g, 2.0 mmol), subjected to replacement with nitrogen for three times, then heated to 95° C., and stirred at this temperature for 23 hours. The reaction solution was cooled to room temperature and filtered, the filter cake was washed with ethyl acetate (20 mL×2), the filtrate was concentrated, and the concentrate was purified by silica gel chromatography (methanol:dichloromethane=0-3%) to obtain compound 258c, namely N-(1-methyl-1H-pyrazol-4-yl)-4-(1H-pyrazol-3-yl)pyrimidin-2-amine, as a brown solid (1.21 g, yield of 96.6%). LCMS [M+1]+=242.1.

Step 2: Example 258e

The compound 258c (1.08 g, 4.48 mmol), the compound 258d (0.96 g, 4.93 mmol) and 1,8-diazabicycloundec-7-ene (1.36 g, 8.96 mmol) were dissolved in acetonitrile (150 mL), heated to 70° C., and stirred at this temperature for 20 hours. After cooling to room temperature and removing the solvent, the concentrate was purified by silica gel chromatography (methanol:dichloromethane=0-5%) to obtain compound 258e, namely 3-(cyanomethyl)-3-(3-(2-((1-methyl-1H-pyrazol-4-yl) amino)pyrimidin-4-yl)-1H-pyrazol-1-yl) azetidin-3-pyridin-1-carboxylic acid, as a white solid (1.56 g, yield of 74.6%). LCMS [M+1]$^+$=436.1.

Step 3: Example 258f

The compound 258e (1.56 g, 3.58 mmol) was dissolved in methanol (15 mL), then slowly added with a solution of hydrogen chloride in dioxane (10 mL, 40.0 mmol), heated to 50° C., and stirred at this temperature for 16 hours. After cooling to room temperature and removing the solvent, the residue was added with N,N-dimethylformamide (10 mL) and anhydrous sodium carbonate to adjust to near neutrality, stirred for 30 minutes, and filtered. The filtrate was concentrated to obtain a liquid compound 258f, namely 2-(3-(3-(2-((1-methyl-1H-pyrazol-4-yl)amino) pyrimidin-4-yl)-1H-pyrazol-1-yl)azetidin-3-yl)acetonitrile, as yellow oil (1.2 g, crude). LCMS [M+1]$^+$=336.1.

Step 4: Example 258 (TDM-180858)

Into a solution of the compound 258f (60 mg, 0.18 mmol) in N,N-dimethylformamide (6 mL) added were 1-(3-dimethylaminopropyl)-3-ethylcarbodiimide hydrochloride (51.4 mg, 0.27 mmol), 1-hydroxybenzotriazole (36.5 mg, 0.27 mmol), triethylamine (27.1 mg, 0.27 mmol) and the compound 258g (23.1 mg, 0.27 mmol). The reaction solution was stirred at room temperature for 17 hours. After the solvent was removed, the residue was purified by preparative HPLC to obtain compound 258, namely 2-(1-(cyclopropanecarbonyl)-3-(3-(2-((1-methy 1-1H-pyrazol-4-yl)amino)pyrimidin-4-yl)-1H-pyrazol-1-yl)azetidinpyridin-3-yl)acetonitrile (59.8 mg, yield of 49.7%). LCMS[M+1]+=404.2.

$^1$H NMR (400 MHz, DMSO) δ 9.56 (s, 1H), 8.45 (d, J=5.1 Hz, 1H), 8.29 (d, J=2.4 Hz, 1H), 7.98 (s, 1H), 7.52 (s, 1H), 7.23 (d, J=5.1 Hz, 1H), 7.08 (s, 1H), 4.84 (d, J=9.3 Hz, 1H), 4.64 (d, J=9.4 Hz, 1H), 4.46 (d, J=10.4 Hz, 1H), 4.24 (d, J=10.3 Hz, 1H), 3.83 (s, 3H), 3.70 (s, 2H), 1.71-1.56 (m, 1H), 0.75 (s, 4H).

Compounds prepared by similar methods were as follows:

| Structure Structural formula | TDM No. Registration number | LCMS [M + 1]$^+$ | $^1$H-NMR Hydrogen nuclear magnetic resonance spectrum |
|---|---|---|---|
| (structure) | TDM-180859 | 440.2 | $^1$H NMR (400 MHz, DMSO) δ 9.56 (s, 1H), 8.45 (d, J = 5.0 Hz, 1H), 8.29 (s, 1H), 7.98 (s, 1H), 7.52 (s, 1H), 7.23 (d, J = 5.1 Hz, 1H), 7.09 (s, 1H), 4.87 (dd, J = 37.4, 9.6 Hz, 1H), 4.67 (dd, J = 42.5, 9.7 Hz, 1H), 4.54 (t, J = 11.2 Hz, 1H), 4.31 (t, J = 10.1 Hz, 1H), 3.83 (s, 3H), 3.71 (d, J = 4.4 Hz, 2H), 2.89-2.75 (m, 1H), 2.00-1.79 (m, 2H). |
| (structure) | TDM-180860 | 446.2 | $^1$H NMR (400 MHz, DMSO) δ 9.56 (s, 1H), 8.45 (d, J = 5.1 Hz, 1H), 8.27 (d, J = 2.4 Hz, 1H), 7.98 (s, 1H), 7.52 (s, 1H), 7.22 (d, J = 5.1 Hz, 1H), 7.08 (s, 1H), 4.79 (d, J = 9.6 Hz, 1H), 4.55 (dd, J = 16.3, 10.3 Hz, 2H), 4.30 (d, J = 10.6 Hz, 1H), 3.83 (s, 3H), 3.68 (s, 2H), 3.47 (dd, J = 11.1, 3.5 Hz, 2H). |
| (structure) | TDM-180861 | 403.2 | $^1$H NMR (400 MHz, DMSO) δ 9.56 (s, 1H), 8.45 (d, J = 5.1 Hz, 1H), 8.27 (d, J = 2.4 Hz, 1H), 7.98 (s, 1H), 7.52 (s, 1H), 7.22 (d, J = 5.1 Hz, 1H), 7.08 (s, 1H), 4.76 (d, J = 9.5 Hz, 1H), 4.54 (d, J = 9.7 Hz, 2H), 4.30 (d, J = 10.6 Hz, 1H), 3.84 (s, 3H), 3.68 (s, 2H). |

TDM-180859, which was compound 259, namely 2-(1-(2,2-difluorocyclo propanecarbonyl)-3-(3-(2-((1-methyl-1H-pyrazol-4-yl)amino)pyrimidin-4-yl)-1H-pyrazol-1-yl)azetidin-3-yl)acetonitrile, as a yellow solid (21.6 mg, yield of 16.7%).

TDM-180860, which was compound 260, namely 2-(3-(3-(2-((1-methyl-1H-pyrazol-4-yl)amino)pyrimidin-4-yl)-1H-pyrazol-1-yl)-1-(3,3,3-trifluoropropionyl)azetidin-3-yl)acetonitrile, as ayellow solid (43.1 mg, yield of 33.3%).

TDM-180861, which was compound 261, namely 3-(3-(cyanomethyl)-3-(3-(2-((1-methyl-1H-pyrazol-4-yl)amino)pyrimidin-4-yl)-1H-pyrazol-1-yl)azetidinpiperazin-1-yl)-3-oxypropionitrile, as ayellow solid (15.5 mg, yield of 22.2%)

Example 20. A reaction equation for synthesizing compound TDM-180828 was as follows:

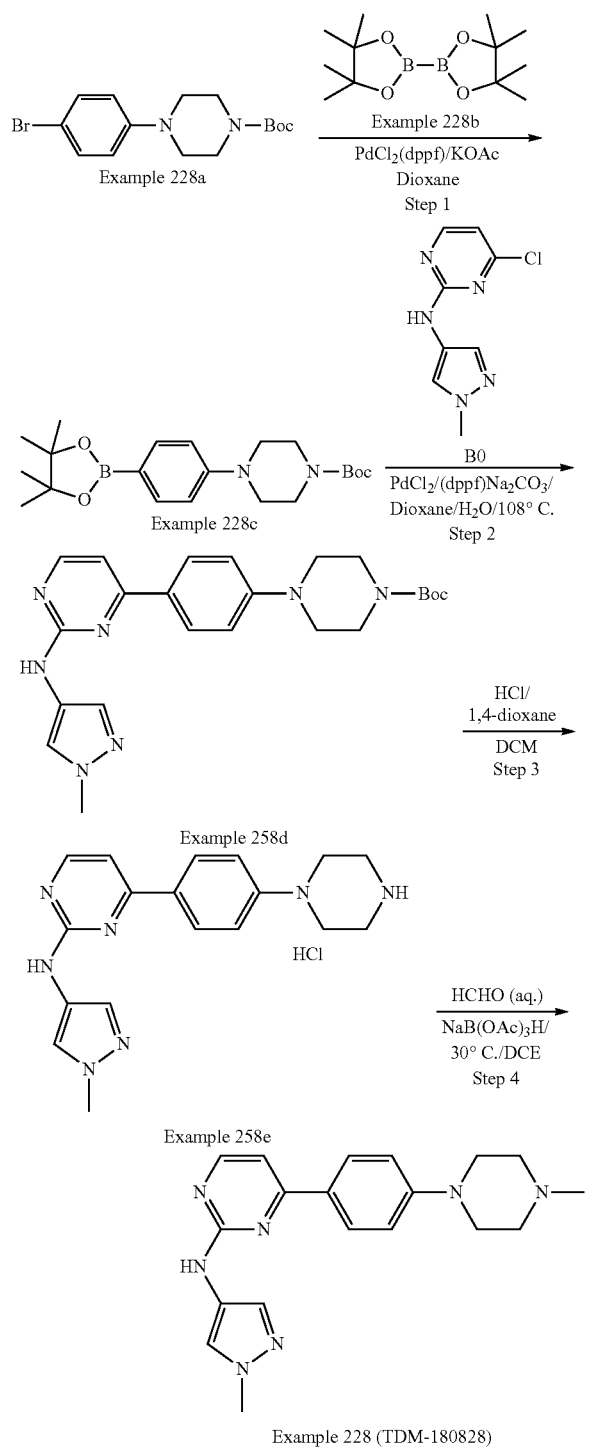

Step 1: Example 228c

Tert-butyl 4-(4-(4,4,5,5-tetramethyl-1,3,2-dioxazaborocan-2-yl)phenyl)piperazin-1-carboxylate Into a three-necked flask added were the compound 228a (680 mg, 2 mmol), the compound 228b (914 mg, 3.6 mmol), PdCl$_2$(dppf) (209 mg, 0.3 mmol), KOAc (780 mg, 8 mmol) and 1,4-dioxane (30 mL). The mixture was subjected to replacement with N$_2$ by a water pump for 3 times. The reaction was heated to 110° C. and refluxed for 3 hours. The mixture was concentrated and purified by column chromatography (petroleum ether/EtOAc=0/100, then 5% MeOH in EOAc). Compound 228 (720 mg; Yield of 92%) was obtained as a white solid. LCMS [M+1]$^+$=389.2

Step 2: Example 228d

Tert-butyl 4-(4-(2-((1-methyl-1H-pyrazol-4-yl)amino)pyrimidin-4-yl)phenyl) piperazin-1-carboxylate Into the compound 228c (720 mg, 1.85 mmol) added was B0 (323 mg, 1.54 mmol), PdCl$_2$ (100 mg), Na$_2$CO$_3$ (490 mg, 4.62 mmol), 1,4-dioxane (20 mL) and H$_2$O (4 mL). The mixture was subjected to replacement with N$_2$ by a water pump for 3 times, and heated to 108° C. to react for 4 hours. The mixture was concentrated and purified by column chromatography (petroleum ether/EtOAc=0/100, then 5% MeOH in EOAc). Compound 228d (400 mg, yield of 60%) was obtained as a light yellow solid.

LCMS [M+1]$^+$=436.2

Step 3: Example 228e

N-(1-methyl-1H-pyrazol-4-yl)-4-(4-(piperazin-1-yl)phenyl)pyrimidin-2-amine hydrochloride Into a solution of the compound 228d (150 mg, 0.34 mmol) in DCM (6 mL) added was a HCl/1,4-dioxane solution (2 mL, 4 M). The reaction was stirred at 35° C. for 3 hours. The reaction mixture was concentrated under reduced pressure to obtain compound 228e (150 mg crude product, should be HCl salt) as a yellow solid. The crude product was directly used for the next step of reaction. LCMS [M+1]$^+$=336.2

Step 4: Example 228 (TDM-180828)

N-(1-methyl-1H-pyrazol-4-yl)-4-(4-(4-methyl piperazin-1-yl)phenyl)pyrimidin-2-amine A mixture of the compound 228e (70 mg, 0.21 mmol) and HCHO (7 drops, 37% aq.) in ClCH$_2$CH$_2$Cl (8 mL) was stirred at 35° C. for 0.5 hours. Then the mixture was added with NaB(OAc)$_3$H (133 mg, 0.63 mmol). The reaction was stirred at 35° C. for 1.5 hours. After the reaction was finished, the product was added with a saturated NaHCO$_3$ (about 15 mL) solution, and extracted with DCM (15 mL×3). The combined organic layers were washed with saline (15 mL×3), dried over Na$_2$SO$_4$, filtered, and concentrated, and the crude product was pulped with EtOAC/PE (about 1:2). Compound 228 (19.9 mg; yield of 27%) was obtained as a off white solid.

LCMS [M+1]$^+$=350.2

$^1$H NMR (400 MHz, DMSO-d$_6$) δ 9.34 (s, 1H), 8.36 (d, J=5.2 Hz, 1H), 8.03 (d, J=8.8 Hz, 2H), 7.90 (s, 1H), 7.55 (s, 1H), 7.17 (d, J=5.2 Hz, 1H), 7.06 (d, J=8.8 Hz, 2H), 3.83 (s, 3H), 3.23-3.32 (m, 4H), 2.42-2.49 (m, 4H), 2.24 (s, 3H).

Example 21. A reaction equation for synthesizing compound TDM-180827 was as follows:

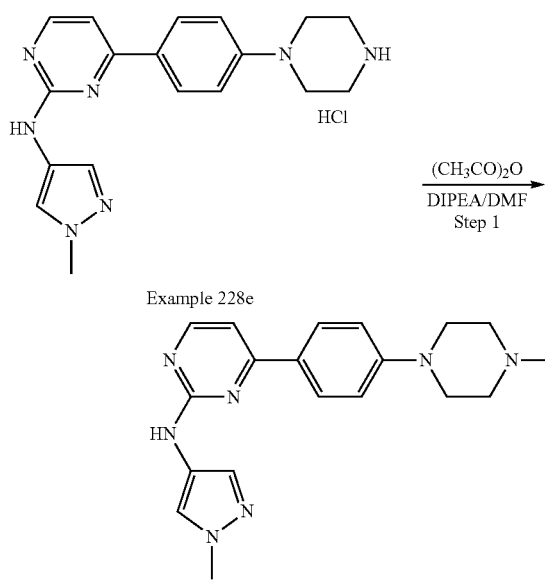

Example 228e

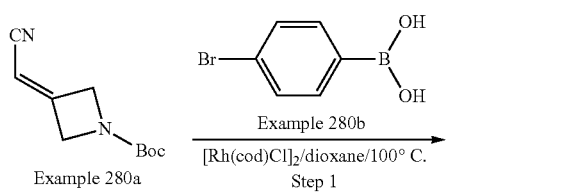

Example 827 (TDM-180827)

Step 1: Example 827 (TDM-180827)

1-(4-(4-(2-((1-methyl-1H-pyrazol-4-yl)amino)pyrimidin-4-yl)phenyl)piperazin-1-yl)ethan-1-one Into a solution of the compound 228e (50 mg, 0.15 mmol) and DIPEA (8 drops) in DMF (6 mL) added was (CH$_3$CO)$_2$O (8 drops). The reaction was stirred at room temperature for 1 hours. The mixture was concentrated under reduce pressure and purified by column chromatography (DCM/MeOH=10/1), and the resultant crude product was pulped with EtOAc/PE (about 1:2). Compound 827 (27.7 mg; yield>50%) was obtained as a light green solid.

LCMS [M+1]$^+$=378.1

1H NMR (400 MHz, DMSO-d$_6$) δ 9.35 (s, 1H), 8.37 (d, J=5.2 Hz, 1H), 8.05 (d, J=8.8 Hz, 2H), 7.91 (s, 1H), 7.56 (s, 1H), 7.18 (d, J=5.2 Hz, 1H), 7.08 (d, J=8.8 Hz, 2H), 3.83 (s, 3H), 3.57-3.64 (m, 4H), 3.34-3.38 (m, 2H), 3.25-3.31 (m, 2H), 2.06 (s, 3H).

Example 22. A reaction equation for synthesizing compound TDM-180880 was as follows:

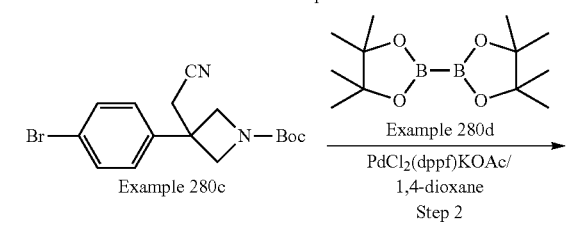

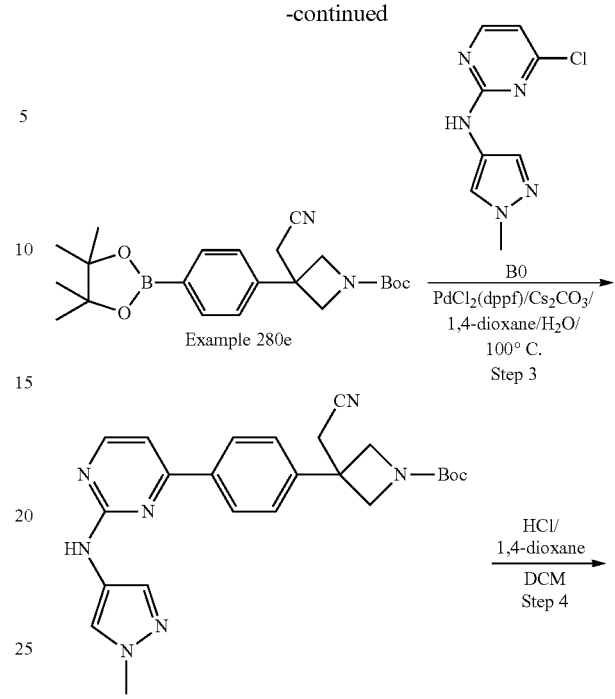

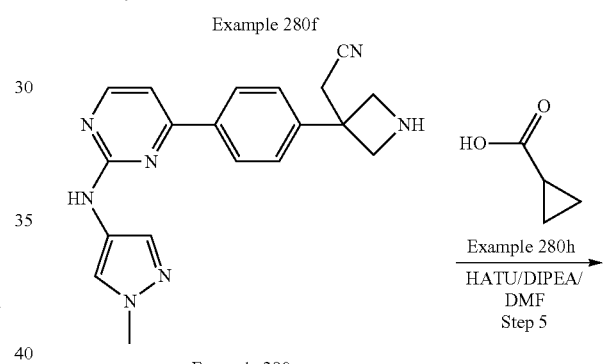

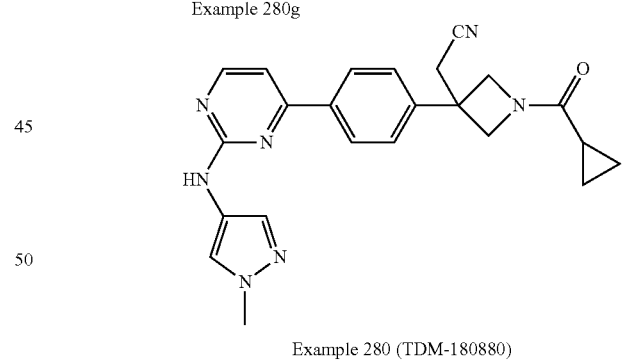

Example 280 (TDM-180880)

Step 1: Example 280c

Tert-butyl 3-(4-bromophenyl)-3-(cyanomethyl)azetidin-1-carboxylate

Into the compound 280a (400 mg, 2.1 mmol) added were the compound 280b (844 mg, 4.2 mmol), [Rh(cod)Cl]$_2$ (80 mg), K$_2$CO$_3$ (580 mg, 4.2 mmol) and 1,4-dioxane (25 mL). The mixture was subjected to replacement with nitrogen by a water pump for 3 times, and the reaction was heated to 100° C. and stirred for 60 minutes. The product was concentrated and purified by column chromatography (0-100% EtOAC/PE) to obtain compound 280c (350 mg, yield of 47%) as light green oil.
LCMS [M-t-Bu+1]$^+$=297

Step 2: Example 280e

Tert-butyl 3-(cyanomethyl)-3-(4-(4,4,5,5-tetramethyl-1,3,2-dioxazaborocan-2-yl) phenyl)azetidin-1-carboxylate Into a three-necked flask added were the compound 280c (300 mg, 0.86 mmol), the compound 280d (327 mg, 1.29 mmol), PdCl$_2$(dppf) (82 mg, 0.11 mmol), KOAC (253 mg, 2.58 mmol) and 1,4-dioxane (25 mL). The mixture was subjected to replacement with nitrogen by a water pump for 3 times. The reaction was heated to 90° C., and stirred for 1.5 hours. The reaction mixture was directly used for the next step.
LCMS [M-Boc+1]$^+$=299

Step 3: Example 280f

Tert-butyl 3-(cyanomethyl)-3-(4-(2-((1-methy 1-1H-pyrazol-4-yl)amino) pyrimidin-4-yl)phenyl)azetidin-1-carboxylate Into the compound 280e (342 mg, 0.86 mmol, mixture) added was B0 (144 mg, 0.69 mmol), PdCl$_2$ (60 mg), Cs$_2$CO$_3$ (561 mg, 1.72 mmol), 1,4-dioxane (10 mL) and H$_2$O (6 mL). The mixture was subjected to replacement with nitrogen by a water pump for 3 times, heated to 100° C., and stirred for 2 hours. The mixture was concentrated and purified by column chromatography (0-100% EtOAc/PE, EtOAC). Compound 280f (180 mg, yield of 59%) was obtained as a light green solid.
LCMS [M+1]$^+$=446.2

Step 4: Example 280g 2-(3-(4-(2-((1-methy 1-1H-pyrazol-4-yl)amino)pyrimidin-4-yl)phenyl)azetidin-3-yl)acetonitrile Into a solution of the compound 280f (60 mg, 0.14 mmol) in DCM (4 mL) added was HCl/1,4-dioxane (2 mL, 4 M). The reaction was stirred at room temperature for 1 hours. The reaction solution was concentrated under reduced pressure, and the crude product was directly used in the next step. Compound 280g (50 mg, crude product) was obtained as a light yellow solid.
LCMS [M+1]$^+$=346

Step 5: Example 280 (TDM-180880)

2-(1-(cyclopropanecarbonyl)-3-(4-(2-((1-methyl-1H-pyrazol-4-yl)amino)pyrimidin-4-yl)phenyl)azetidin-3-yl)acetonitrile Into a solution of the compound 280g (65 mg, 0.19 mmol) in DIPEA (19 mg, 0.38 mmol) and DMF (8 mL) added were HATU (110 mg, 0.29 mmol) and Example 280h (25 mg, 0.29 mmol). The reaction was stirred at room temperature for 3 hours. The mixture was poured into H$_2$O, and extracted with EtOAc (30 mL×3), and the combined organic layers were washed with H$_2$O and saline, dried over Na$_2$SO$_4$, filtered, concentrated and purified by column chromatography (DCM/MeOH=10/1). Compound 280 (28.8 mg; yield of 37%) was obtained as a white solid.
LCMS [M+1]$^+$=414.2
$^1$H NMR (400 MHz, CDCl$_3$) δ 8.48 (d, J=4.8 Hz, 1H), 8.13 (d, J=8.4 Hz, 2H), 7.89 (s, 1H), 7.60 (s, 1H), 7.39 (d, J=8.4 Hz, 2H), 7.12 (d, J=4.8 Hz, 1H), 7.55 (brs, 1H), 7.13 (d, J=5.2 Hz, 1H), 7.00 (br s, 1H), 4.65-4.76 (m, 1H), 4.40-4.57 (m, 2H), 4.20-4.30 (m, 1H), 3.95 (s, 3H), 1.43-1.51 (m, 1H), 0.96-1.11 (m, 2H), 0.79-0.89 (m, 2H).
Compounds prepared by similar methods were as follows:

| Structure Structural formula | TDM No. Registration number | LCMS [M + 1]$^+$ | $^1$H-NMR Hydrogen nuclear magnetic resonance spectrum |
|---|---|---|---|
| 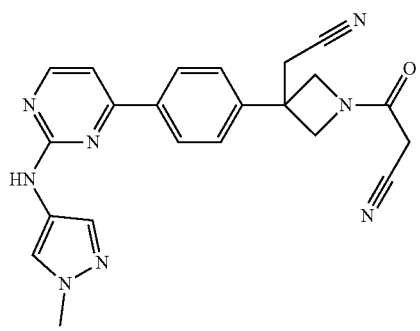 [SMILES: Cn1cc(Nc2nccc(-c3ccc(C4(CC#N)CN(C(=O)CC#N)C4)cc3)n2)cn1] | TDM-180871 | 413.2 | $^1$H NMR (400 MHz, DMSO-d$_6$) δ 9.53 (s, 1H), 8.49 (d, J = 5.2 Hz, 1H), 8.19 (d, J = 8.4 Hz, 2H), 7.92 (s, 1H), 7.55 (t, J = 9.1 Hz, 3H), 7.32 (d, J = 5.2 Hz, 1H), 4.54 (d, J = 8.9 Hz, 1H), 4.38 (d, J = 8.9 Hz, 1H), 4.26 (d, J = 10.0 Hz, 1H), 4.15 (d, J = 10.0 Hz, 1H), 3.84 (d, J = 7.0 Hz, 3H), 3.80 (d, J = 3.7 Hz, 2H), 3.33 (s, 2H). |

| Structure Structural formula | TDM No. Registration number | LCMS [M + 1]$^+$ | $^1$H-NMR Hydrogen nuclear magnetic resonance spectrum |
|---|---|---|---|
| | TDM-180872 | 450.2 | $^1$H NMR (400 MHz, DMSO-d$_6$) δ 9.54 (s, 1H), 8.50 (d, J = 5.2 Hz, 1H), 8.20 (d, J = 8.2 Hz, 2H), 7.93 (s, 1H), 7.56 (dd, J = 8.4, 2.4 Hz, 3H), 7.33 (d, J = 5.2 Hz, 1H), 4.71 (d, J = 8.9 Hz, 1H), 4.57 (s, 1H), 4.45 (d, J = 9.0 Hz, 1H), 4.27 (d, J = 10.0 Hz, 1H), 4.17 (dd, J = 10.0, 5.8 Hz, 1H), 3.83 (s, 3H), 3.42-3.29 (m, 2H), 2.85-2.71 (m, 1H), 1.91 (dd, J = 18.1, 8.4 Hz, 2H). |
| | TDM-180873 | 456.2 | $^1$H NMR (400 MHz, DMSO-d$_6$) δ 9.53 (s, 1H), 8.50 (d, J = 5.2 Hz, 1H), 8.19 (d, J = 8.4 Hz, 2H), 7.93 (s, 1H), 7.55 (t, J = 8.6 Hz, 3H), 7.32 (d, J = 5.2 Hz, 1H), 4.57 (d, J = 9.0 Hz, 1H), 4.42 (d, J = 9.0 Hz, 1H), 4.25 (d, J = 10.1 Hz, 1H), 4.15 (d, J = 10.1 Hz, 1H), 3.83 (s, 3H), 3.42 (q, J = 11.2 Hz, 2H), 3.32 (s, 2H). |

TDM-180871, which was compound 271, namely 3-(3-(cyanomethyl)-3-(4-(2-((1-methyl-1H-pyrazol-4-yl)amino)pyrimidin-4-yl)phenyl)azetidin-1-yl)-3-oxopropionitrile, as a yellow solid (11.2 mg, yield of 23.4%)

TDM-180872, which was compound 272, namely 2-(1-(2,2-difluorocyclo-1-carbonyl)-3-(4-(2-((1-methyl-1H-pyrazol-4-yl)amino)pyrimidin-4-yl)phenyl) azetidin-3-yl)acetonitrile, as a yellow solid (13.6 mg, yield of 26.1%)

TDM-180873, which was compound 273, namely 2-(3-(4-(2-((1-methyl-1H-pyrazol-4-yl)amino)pyrimidin-4-yl)phenyl)-1-(3,3,3-trifluoropropanol) azetidin-3-yl)acetonitrile, as a yellow solid (10.1 mg, yield of 18.2%)

Example 23. A reaction equation for synthesizing compound TDM-180836 was as follows:

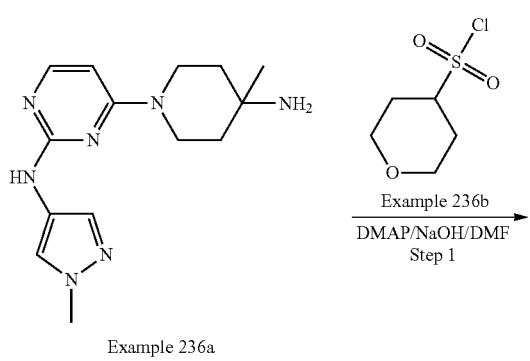

Example 236a

Example 236b

DMAP/NaOH/DMF
Step 1

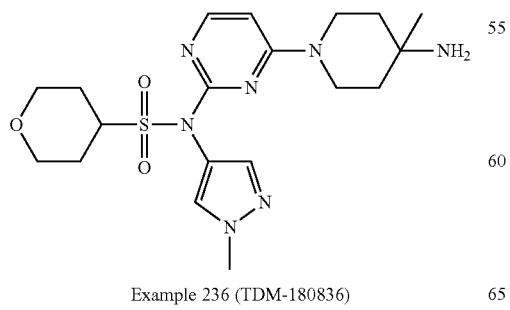

Example 236 (TDM-180836)

Step 1: Example 236 (TDM-180836)

Into a solution of the compound 236a (80 mg, 0.28 mmol) in N,N-dimethylformamide (5 mL) added were 4-dimethylaminopyridine (7.0 mg, 0.06 mmol), sodium hydroxide (16.7 mg, 0.42 mmol) and the compound 235b (77.1 mg, 0.42 mmol). The reaction solution was stirred at room temperature for 3 hours. The solvent was removed, and the concentrate was purified by preparative HPLC to obtain compound 236, namely N-(4-(4-amino-4-methylpiperidin-1-yl)pyrimidin-2-yl)-N-(1-methyl-1H-pyrazol-4-yl)tetrahydro-2H-pyran-4-sulfonamide, as a white solid (32.7 mg, yield of 26.8%). LCMS[M+1]$^+$=436.2.

$^1$H NMR (400 MHz, DMSO) δ 8.05 (d, J=6.2 Hz, 1H), 7.94 (s, 2H), 7.83 (s, 1H), 7.39 (d, J=0.5 Hz, 1H), 6.64 (d, J=6.3 Hz, 1H), 4.51 (t, J=3.7 Hz, 1H), 3.99 (dd, J=11.1, 3.7 Hz, 4H), 3.83 (s, 3H), 3.33 (dd, J=21.7, 10.3 Hz, 4H), 2.03 (d, J=10.3 Hz, 2H), 1.78-1.61 (m, 6H), 1.38 (s, 3H).

Compounds prepared by similar methods were as follows:

| Structure Structural formula | TDM No. Registration number | LCMS [M + 1]+ | 1H-NMR Hydrogen nuclear magnetic resonance spectrum |
|---|---|---|---|
| | TDM-180840 | 394.2 | 1H NMR (400 MHz, DMSO) δ 8.04 (d, J = 6.2 Hz, 1H), 7.95 (s, 3H), 7.83 (s, 1H), 7.39 (d, J = 0.6 Hz, 1H), 6.63 (d, J = 6.3 Hz, 1H), 4.00 (s, 2H), 3.82 (d, J = 2.8 Hz, 3H), 3.80 (dd, J = 5.9, 3.8 Hz, 2H), 3.32 (dd, J = 12.1, 7.8 Hz, 2H), 1.80 (dd, J = 15.3, 7.6 Hz, 2H), 1.68 (dd, J = 18.0, 8.9 Hz, 4H), 1.37 (s, 3H), 1.01 (t, J = 7.4 Hz, 3H). |
| | TDM-180841 | 380.2 | 1H NMR (400 MHz, DMSO) δ 8.05 (d, J = 6.2 Hz, 1H), 7.95 (s, 3H), 7.83 (s, 1H), 7.39 (d, J = 0.5 Hz, 1H), 6.63 (d, J = 6.3 Hz, 1H), 3.96 (s, 2H), 3.86 - 3.77 (m, 5H), 3.31 (t, J = 9.8 Hz, 2H), 1.69 (s, 5H), 1.37 (s, 3H), 1.31 (t, J = 7.4 Hz, 3H). |

TDM-180840, which was compound 240, namely N-(4-(4-amino-4-methylpiperidin-1-yl)pyrimidin-2-yl)-N-(1-methyl-1H-pyrazol-4-yl)propane-1-sulfonamide, as a white solid (34.4 mg, yield of 31.4%).
TDM-180841, which was compound 241, namely N-(4-(4-amino-4-methylpiperidin-1-yl)pyrimidin-2-yl)-N-(1-methyl-1H-pyrazol-4-yl)ethanesulfonamide, as a white solid (7.3 mg, yield of 6.9%).

Example 23: General method for synthesizing compound 337 (TDM-180937)

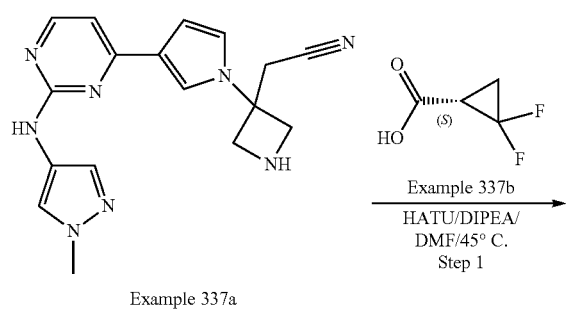

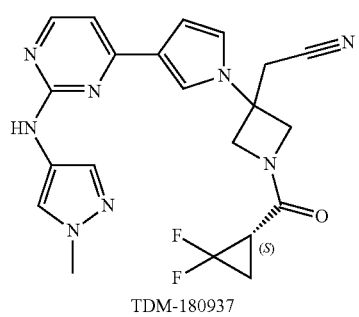

Step 1: Example 337 (TDM-180937)

Into a solution of compound 337a, namely 2-(3-(3-(2-((1-methyl-1H-pyrazol-4-yl)amino)pyrimidin-4-yl)-1H-pyrrol-1-yl)azetidin-3-yl)acetonitrile (30 mg, 0.09 mmol) in N,N-dimethylformamide (2 mL) sequentially added were the compound 337b (16.5 mg, 0.14 mmol), 2-(7-benzotriazole oxide)-N,N,N',N'-tetramethylurea hexafluorophosphate (51.4 mg, 0.14 mmol) and N,N-diisopropylethylamine (34.9 mg, 0.27 mmol). The mixture was heated to 45° C. and stirred for 1 hour, and then concentrated under reduced pressure, and the residue was purified by preparation in formic acid, and lyophilized to obtain compound 337, TDM-180937, namely (S)-2-(1-(2,2-difluorocyclopropane-1-carbonyl)-3-(3-(2-((1-methyl-1H-pyrazol-4-yl)amino)pyrimidin-4-yl)-1H-pyrrol-1-yl)azetidin-3-yl)acetonitrile, as a light yellow solid (22.8 mg, yield of 57%). LCMS [M+1]+ =439.2

1H NMR (400 MHz, DMSO-d6) δ 9.24 (s, 1H), 8.29 (d, J=5.2 Hz, 1H), 8.18 (s, 1H), 7.93 (s, 1H), 7.83 (s, 1H), 7.50 (s, 1H), 7.17-7.12 (m, 1H), 6.95 (dd, J=5.1, 4.0 Hz, 1H), 6.81 (s, 1H), 4.84 (d, J=9.3 Hz, 1H), 4.71 (dd, J=24.1, 9.7 Hz, 1H), 4.57 (d, J=9.8 Hz, 1H), 4.42 (dd, J=10.6, 4.6 Hz, 1H), 4.32-4.23 (m, 1H), 3.81 (s, 3H), 3.59 (s, 2H), 2.78 (dt, J=13.3, 8.6 Hz, 1H), 1.97-1.85 (m, 2H).

| Structure Structural formula | TDM No. Registration number | LCMS [M + 1]⁺ | ¹H-NMR Hydrogen nuclear magnetic resonance spectrum |
|---|---|---|---|
| (structure) | TDM-180938 | 439.2 | ¹H NMR (400 MHz, DMSO-d6) δ 9.37 (s, 1H), 8.28 (d, J = 5.4 Hz, 1H), 8.13 (s, 1H), 7.94 (s, 1H), 7.88 (s, 1H), 7.52 (s, 1H), 7.21-7.13 (m, 1H), 6.99 (t, J = 5.3 Hz, 1H), 6.82 (s, 1H), 4.84 (d, J = 9.6 Hz, 1H), 4.71 (dd, J = 23.7, 9.6 Hz, 1H), 4.58 (d, J = 9.5 Hz, 1H), 4.43 (dd, J = 10.7, 4.9 Hz, 1H), 4.32-4.24 (m, 1H), 3.82 (s, 3H), 3.59 (s, 2H), 2.78 (ddd, J = 19.1, 13.4, 8.7 Hz, 1H), 1.98-1.85 (m, 2H). |

TDM-180938, which was compound 338, namely (R)-2-(1-(2,2-difluorocyclopropane-1-carbonyl)-3-(3-(2-((1-methyl-1H-pyrazol-4-yl)amino) pyrimidin-4-yl)-1H-pyrrol-1-yl)azetidin-3-yl)acetonitrile, as a light yellow solid (29.0 mg, yield of 73%).

Experiment for Identifying the Inhibitory Effect of Compounds on JAK Kinase Activity Janus kinases (JAK) include JAK1, JAK2, JAK3 and Tyk2, which transduce cytokine-mediated signals through JAK-STAT pathways. The kinase is 120-140 kDa in size, and there are 7 identified homologous regions, namely JH1-JH7. JH1 is an important region of enzyme activity, which contains typical tyrosine kinase characteristics. Phosphorylation of tyrosine leads to the conformational change of a JAK protein, thereby promoting the binding to a substrate. A JAK-STAT system consists of three main parts: a receptor that passes through the cell membrane, a Janus kinase linked to the receptor, and a signal transducer and activator of transcription protein (STAT) that transmits signals to the nucleus and DNA. When a cytokine binds to the receptor, JAK phosphorylates the receptor and attracts STAT proteins. The STAT proteins are also phosphorylated and then binds with each other to form dimers, which enter the nucleus and bind with DNA, resulting in gene transcription.

EZ Reader available from PerkinElmer can be used for detecting the phosphorylation of polypeptide substrates catalyzed by kinases. This device is based on microfluidic separation technology, and can directly detect fluorescence labeled substrates and products. The separation step is achieved in a microfluidic chip by controlling the pressure and electric field intensity. In a kinase experiment, the product conversion rate is generally controlled at 20-30%. This biological assay method is used for identifying the inhibitory effect of the compounds on JAK.

1. Experimental Materials

S1.1 Compound to be tested

The compound powder was dissolved in DMSO, sealed and stored in a refrigerator at −20° C. The in-house compound Ref1 was used as a positive control for testing of JAK1, JAK2 and Tyk2, and Ref2 was used as a positive control for testing of JAK3.

2. Reagent Preparation

S2.1. 1M HEPES buffer: 0.5M HEPES free acid and 0.5M HEPES sodium salt are weighed, added into ultrapure water for dissolution, brought to a desired volume, filtered and stored in a refrigerator at 4° C.

S2.2. 40 mM ATP solution: dissolved in a 50 mM HEPES buffer solution, prepared into 40 mM, aliquoted, and cryopreserved in a refrigerator at −20° C.

S2.3. 0.5% Tween 20: 100% Tween 20 was diluted with ultrapure water, and stored in a refrigerator at 4° C.

S2.4. 35% bovine serum albumin: a 35% bovine serum albumin solution is prepared in ultrapure water, aliquoted, and stored in a refrigerator at −20° C.

S2.5. 1M dithiothreitol solution: dithiothreitol is formulated into a 1M solution with ultrapure water, aliquoted, and stored in a refrigerator at −20° C.

S2.6. 0.5 mM Jaktide Peptide substrate solution: it is dissolved in 50 mM HEPES to 0.5 mM, aliquoted, and stored in a refrigerator at −20° C.

S2.7. 0.5 mM IRStide Peptide substrate solution: it is dissolved in 50 mM HEPES to 0.5 mM, aliquoted, and stored in a refrigerator at −20° C.

S2.8. Assay Buffer: 20 mM HEPES buffer, pH 7.4, 10 mM magnesium chloride, 0.01% bovine serum albumin BSA, 0.0005% Tween-20, and a 1 mM dithiothreitol solution.

S2.9. Stop Buffer: 180 mM HEPES buffer, 20 mM ethylenediamine tetraacetic acid (EDTA), and 0.2% Coating Reagent 3.

S2.10. Separation Buffer: 100 mM HEPES buffer, 10 mM EDTA, 0.0005% Tween 20, 0.1% Coating Reagent 3, and 1% dimethyl sulfoxide.

3. Experimental Procedures

S3.1. Preparation of compound plate

The compound is dissolved in dimethyl sulfoxide to 10 mM, a certain volume is taken and diluted to 0.6 mM, 10 μl of the diluted 0.6 mM solution is taken and added into a 384 microplate or 1:3 serial dilution, with a total of 8 concentration points.

S3.2. Compound layout

|   | 1 | 2 | 3 | 4 | 5 | 6 | 7 | 8 | 9 | 10 | 11 | 12 |
|---|---|---|---|---|---|---|---|---|---|---|---|---|
| A | HPE1 | cpd1 | cpd2 | cpd3 | cpd4 | cpd5 | cpd6 | cpd7 | cpd8 | cpd9 | cpd10 | cpd11 |
| B | HPE1 | | | | | | | | | | | |
| C | HPE1 | | | | | | | | | | | |
| D | HPE1 | | | | | | | | | | | |
| E | HPE1 | | | | | | | | | | | |
| F | HPE1 | | | | | | | | | | | |

-continued

|   |      |      |      |      |      |      |      |      |      |      |      |       |
|---|------|------|------|------|------|------|------|------|------|------|------|-------|
| G | HPE1 |      |      |      |      |      |      |      |      |      |      |       |
| H | HPE1 |      |      |      |      |      |      |      |      |      |      |       |
| I | HPE2 | cpd1 | cpd2 | cpd3 | cpd4 | cpd5 | cpd6 | cpd7 | cpd8 | cpd9 | cpd10 | cpd11 |
| J | HPE2 |      |      |      |      |      |      |      |      |      |      |       |
| K | HPE2 |      |      |      |      |      |      |      |      |      |      |       |
| L | HPE2 |      |      |      |      |      |      |      |      |      |      |       |
| M | HPE2 |      |      |      |      |      |      |      |      |      |      |       |
| N | HPE2 |      |      |      |      |      |      |      |      |      |      |       |
| O | HPE2 |      |      |      |      |      |      |      |      |      |      |       |
| P | HPE2 |      |      |      |      |      |      |      |      |      |      |       |

|   | 13 | 14 | 15 | 16 | 17 | 18 | 19 | 20 | 21 | 22 | 23 | 24 |
|---|----|----|----|----|----|----|----|----|----|----|----|----|
| A | cpd12 | cpd13 | cpd14 | cpd15 | cpd16 | cpd17 | cpd18 | cpd19 | cpd20 | cpd21 | cpd22 | ZPE |
| B |    |    |    |    |    |    |    |    |    |    |    | ZPE |
| C |    |    |    |    |    |    |    |    |    |    |    | ZPE |
| D |    |    |    |    |    |    |    |    |    |    |    | ZPE |
| E |    |    |    |    |    |    |    |    |    |    |    | ZPE |
| F |    |    |    |    |    |    |    |    |    |    |    | ZPE |
| G |    |    |    |    |    |    |    |    |    |    |    | ZPE |
| H |    |    |    |    |    |    |    |    |    |    |    | ZPE |
| I | cpd12 | cpd13 | cpd14 | cpd15 | cpd16 | cpd17 | cpd18 | cpd19 | cpd20 | cpd21 | cpd22 | Ref |
| J |    |    |    |    |    |    |    |    |    |    |    | Ref |
| K |    |    |    |    |    |    |    |    |    |    |    | Ref |
| L |    |    |    |    |    |    |    |    |    |    |    | Ref |
| M |    |    |    |    |    |    |    |    |    |    |    | Ref |
| N |    |    |    |    |    |    |    |    |    |    |    | Ref |
| O |    |    |    |    |    |    |    |    |    |    |    | Ref |
| P |    |    |    |    |    |    |    |    |    |    |    | Ref | positive control (HPE1): Ref1, final concentration: 10 μM
positive control (HPE1): Ref2, final concentration: 10 μM
negative control (ZPE): DMSO, with a final concentration of 1.6%
Compound: the highest final concentration at 10 μM, 1:3 serial dilution, with 8 concentration points and in duplicates.

4. Experimental operation steps
   S4.1. the experimental plate was added with 250 nl of the compound per well with ECHO, and centrifuged at 1,000 rpm for 1 minute;
   S4.2. the precipitate was added with 5 μl of the experimental buffer, and shaken for several seconds to fully dissolve the compound;
   S4.3. the solution was added with 5 μl of a 3× substrate solution, as well as 5 μl of a 3× kinase solution, and centrifuged at 800 rpm for 1 minute;
   S4.4. The final concentrations of JAK1, JAK2, JAK3 and Tyk2 kinases in the reaction system are 20, 1, 1 and 1 nM, respectively.
   S4.5. the reaction system is incubated at room temperature, wherein the incubation time of each kinase is different, and there are differences in incubation time of different batches of kinases.
   S4.6. When the reaction reaches 20%-30%, the reaction system is added with 15 μl of the stop buffer to terminate the reaction, and centrifuged at 1,000 rpm for 2 minutes.
   S4.7. The precipitate was placed onto a EZ Reader for plate reading.
   S4.8. The readings of the EZ Reader are calculated from peak heights, and % product conversion rate=product/(product+substrate)*100.

5. Data Processing: IC50 Calculation
A concentration curve of the test compounds was made by using the mapping software Xlfit, so as to calculate the IC50 value.
IC50 values of the compounds shown in the aforementioned examples obtained by this experimental method are listed in the table below.

The IC50 values of the compounds shown in the aforementioned examples are listed in the table below. "A" represents ≥10 μM; "B" represents ≥1 μM and meanwhile <10 μM; "C" represents ≥0.1 μM and meanwhile <1 μM; and "D" represents <0.1 μM.

| No. | Tyk2/μM | JAK1/μM | JAK2/μM | JAK3/μM |
|-----|---------|---------|---------|---------|
| TDM-180726 | C | C | C | B |
| TDM-180727 | C | C | B | A |
| TDM-180728 | C | C | D | B |
| TDM-180752 | C | C | C | B |
| TDM-180753 | C | C | B | A |
| TDM-180765 | B | B |   |   |
| TDM-180766 | D | C | D | B |
| TDM-180769 | B | B |   |   |
| TDM-180770 | D | C | C | B |
| TDM-180771 | D | C | D | B |
| TDM-180772 | C | C | C | A |
| TDM-180775 | C | C | C | A |
| TDM-180776 | D | D | D | B |
| TDM-180778 | D | D | C | B |
| TDM-180785 | C | C | C | A |
| TDM-180786 | B | B |   |   |
| TDM-180794 | C | C | C | B |
| TDM-180795 | C | B | C | A |
| TDM-180796 | C | B | C | A |
| TDM-180797 | C | C | C | A |
| TDM-180798 | D | C | C | B |
| TDM-180800 | C | C | C | B |
| TDM-180807 | C | B | C | A |
| TDM-180808 | C | C | C | B |
| TDM-180810 | B | B |   |   |
| TDM-180854 | C | C | D | B |
| TDM-180855 | C | C | C | B |
| TDM-180858 | B | B |   |   |
| TDM-180859 | C | C |   |   |
| TDM-180860 | C | C |   |   |
| TDM-180861 | B | B |   |   |
| TDM-180866 | D | D |   |   |
| TDM-180871 | C | C |   |   |
| TDM-180872 | C | C |   |   |
| TDM-180873 | C | C |   |   |
| TDM-180880 | B | B |   |   |
| TDM-180636 | A | A | A | A |

-continued

| No. | Tyk2/μM | JAK1/μM | JAK2/μM | JAK3/μM |
|---|---|---|---|---|
| TDM-180637 | A | A | A | A |
| TDM-180638 | A | A | A | A |
| TDM-180639 | A | A | A | A |
| TDM-180640 | A | A | A | A |
| TDM-180641 | A | A | A | A |
| TDM-180642 | A | A | A | A |
| TDM-180643 | A | A | A | A |
| TDM-180644 | A | A | A | A |
| TDM-180645 | A | A | A | A |
| TDM-180646 | A | A | A | A |
| TDM-180647 | A | A | B | B |
| TDM-180648 | B | B | B | B |
| TDM-180649 | A | A | A | A |
| TDM-180650 | A | A | A | A |
| TDM-180651 | A | A | B | A |
| TDM-180652 | A | A | A | A |
| TDM-180653 | B | A | B | A |
| TDM-180654 | B | A | B | A |
| TDM-180655 | A | A | A | A |
| TDM-180665 | B | B | B | A |
| TDM-180666 | A | A | B | A |
| TDM-180667 | A | A | A | A |
| TDM-180668 | A | A | A | A |
| TDM-180669 | A | A | A | A |
| TDM-180670 | A | A | A | A |
| TDM-180671 | A | A | A | A |
| TDM-180672 | A | A | A | A |
| TDM-180673 | A | A | A | A |
| TDM-180674 | B | A | B | A |
| TDM-180675 | A | A | B | A |
| TDM-180676 | A | A | A | A |
| TDM-180677 | A | A | A | A |
| TDM-180678 | A | A | A | A |
| TDM-180679 | A | A | A | A |
| TDM-180680 | A | A | A | A |
| TDM-180681 | A | A | A | A |
| TDM-180731 | A | A | A | A |
| TDM-180734 | C | C | B | A |
| TDM-180827 | B | B | C | A |
| TDM-180828 | B | B | B | A |
| TDM-180912 | B | C | | |
| TDM-180915 | C | C | | |
| TDM-180916 | B | C | | |
| TDM-180918 | B | B | | |
| TDM-180922 | C | C | | |
| TDM-180925 | C | C | | |
| TDM-180927 | C | C | | |
| TDM-180928 | D | C | | |
| TDM-180930 | C | C | | |
| TDM-180931 | C | C | | |
| TDM-180932 | C | C | | |
| TDM-180937 | D | D | | |
| TDM-180938 | C | C | | |

The invention claimed is:

1. A small molecule compound of the structural formula below, or a stereoisomer, geometric isomer, tautomer, racemate, hydrate, solvate, or pharmaceutically acceptable salt or prodrug thereof:

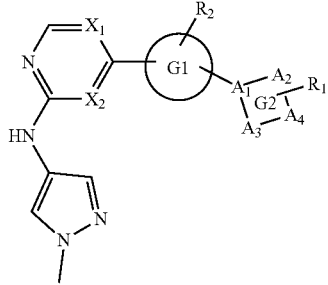

wherein the $X_1$ and $X_2$ are selected from carbon or nitrogen;
the G1 is a five or six-membered aromatic ring;
any one or more hydrogen atoms on the G1 ring are substituted by $R_2$;
the $R_2$ is selected from hydrogen, halogen, alkyl, substituted alkyl, amino, amido, substituted amido, carboxyl, amide, substituted amide, ester, substituted carbonyl, cycloalkyl, substituted cycloalkyl, heterocycloalkyl, substituted heterocycloalkyl, aryl, substituted aryl, heteroaryl, and substituted heteroaryl;
the $A_1$, $A_2$, $A_3$, and $A_4$ are selected from carbon, nitrogen, sulfur or oxygen;
the $G_2$ formed by the $A_1$, $A_2$, $A_3$ and $A_4$ is a four-membered alkyl heterocyclic ring;
any one or more hydrogen atoms on the G2 ring are substituted by $R_1$; and
the $R_1$ is selected from hydrogen, halogen, alkyl, substituted alkyl, amino, amido, substituted amido, carboxyl, amide, substituted amide, ester, substituted carbonyl, cycloalkyl, substituted cycloalkyl, heterocycloalkyl, substituted heterocycloalkyl, aryl, substituted aryl, heteroaryl, substituted heteroaryl, a sulfone group, a substituted sulfone group, a sulfoxide group, and a substituted sulfoxide group.

2. The small molecule compound of claim 1, wherein the G1 is cyclic of the structure below:

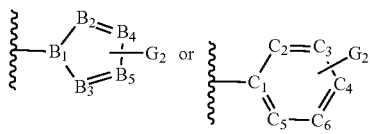

wherein, the $B_1$, $B_2$, $B_3$, $B_4$, and $B_5$ are selected from carbon, nitrogen, sulfur or oxygen; and
the $C_1$, $C_2$, $C_3$, $C_4$, $C_5$, and $C_6$ are selected from carbon, nitrogen, sulfur or oxygen.

3. The small molecule compound of claim 2, wherein when G1 is a five-membered ring, at least one of the $B_1$, $B_2$, $B_3$, $B_4$, and $B_5$ is nitrogen; and
the G2 is connected to a nitrogen atom;
or alternatively
when G1 is a six-membered ring, at least one of the $C_1$, $C_2$, $C_3$, $C_4$, $C_5$, $C_6$ is nitrogen; and
the G2 is connected to a nitrogen atom.

4. The small molecule compound of claim 1, wherein it has a structure shown by the following molecular general formula:

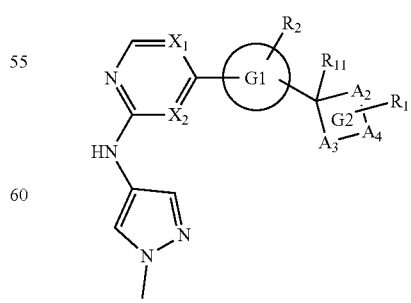

wherein the $R_{11}$ is selected from hydrogen, halogen, alkyl, substituted alkyl, amino, amido, substituted amido, carboxyl, amide, substituted amide, ester, substituted carbonyl, cycloalkyl, substituted cycloalkyl, heterocycloalkyl, substituted heterocycloalkyl, aryl, substituted aryl, heteroaryl, and substituted heteroaryl.

5. The small molecule compound of claim 4, wherein the $R_{11}$ is the alkyl or the substituted alkyl, and the end of the carbon chain of the $R_{11}$ is terminated by cyano.

6. The small molecule compound of claim 1, wherein and $A_4$ is nitrogen; and
the $R_1$ is bonded to $A_4$.

7. The small molecule compound of claim 1, wherein the $R_1$ is

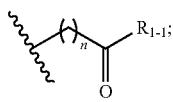

wherein the n is 0, 1, and 2; and
the $R_{1-1}$ is alkyl, substituted alkyl, cycloalkyl, substituted cycloalkyl, heterocycloalkyl, or substituted heterocycloalkyl.

8. The small molecule compound of claim 1, wherein the $R_1$ is

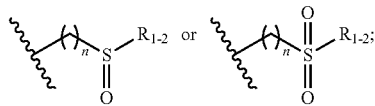

wherein $R_{1-2}$ is alkyl, substituted alkyl, cycloalkyl, substituted cycloalkyl, heterocycloalkyl, substituted heterocycloalkyl, alkenyl, substituted alkenyl, alkynyl, substituted alkynyl, heterocycloalkyl, or substituted heterocycloalkyl.

9. A method for treating, preventing or relieving an inflammatory skin diseases related to autoimmunity of a subject, comprising administering the small molecule compound of claim 1 to the subject.

* * * * *